(12) United States Patent
Kato et al.

(10) Patent No.: US 7,729,425 B2
(45) Date of Patent: Jun. 1, 2010

(54) IMAGE PROCESSING APPARATUS AND METHOD, PROGRAM, AND RECORDING MEDIUM

(75) Inventors: Goro Kato, Kanagawa (JP); Shojiro Shibata, Kanagawa (JP); Hiromichi Ueno, Kanagawa (JP)

(73) Assignee: Sony Corporation, Tokyo (JP)

( * ) Notice: Subject to any disclaimer, the term of this patent is extended or adjusted under 35 U.S.C. 154(b) by 1277 days.

(21) Appl. No.: 10/944,594

(22) Filed: Sep. 17, 2004

(65) Prior Publication Data
US 2005/0105624 A1 May 19, 2005

(30) Foreign Application Priority Data
Sep. 19, 2003 (JP) ............................ 2003-327257

(51) Int. Cl.
H04N 7/12 (2006.01)
H04N 11/02 (2006.01)
H04N 11/04 (2006.01)
H04N 5/91 (2006.01)
G11B 27/00 (2006.01)

(52) U.S. Cl. .................................. 375/240.26; 386/52
(58) Field of Classification Search ............ 375/240.26; 386/52
See application file for complete search history.

(56) References Cited
U.S. PATENT DOCUMENTS
5,319,453 A 6/1994 Copriviza et al.

5,960,148 A * 9/1999 Miyazawa ................ 386/52
(Continued)

FOREIGN PATENT DOCUMENTS
EP 0 694 921 1/1996
(Continued)

OTHER PUBLICATIONS

N.D. Wells and N.H.C Gilchrist: "Atlantic: Preserving video and audio quality in an MPEG-code environment." IBC98, 'Online! 1998, XP002307582 Retrieved from the Internet: URL:http://www.bbc.co.uk/atlantic/pdf-files/ibc98ndwnhcg.pdf> 'retrieved on Nov. 24, 2004! *p. 1-p. 5* & BBC Research & Development: "Initial proposal for video Mole standardisation" WWW.BBC.CO.UK, 'Online ! Dec. 1997, XP002307583 Retrieved from the internet: URL:http://www.bbc.co.uk/atlantic/pdf-files/169audio.pdf> 'retrieved on Nov. 24, 2004!*p. 549-p. 551 * & Brightwell et al.:"Flexible Switching and Editing of MPEG-2 Video Bitstreams" International Broadcasting Convention London, GB, Sep. 12, 1997, pp. 547-552, XP002098561.

*Primary Examiner*—Andy S Rao
*Assistant Examiner*—Chikaodili E Anyikire
(74) *Attorney, Agent, or Firm*—Frommer Lawrence & Haug LLP; William S. Frommer; Thomas F. Presson

(57) ABSTRACT

An apparatus and method of detecting editing points of image data in order to select items of information that can be reused according to the status of the image data including the detected editing points is provided. Accordingly, an image processing apparatus may include a data converter for performing at least part of coding processing on the image data, a detector for detecting an editing point of the image data, and a controller for determining, based on the editing point detected by the detector. A reuse disable period is a period in which information concerning previous coding processing performed on the image data is not reusable.

27 Claims, 34 Drawing Sheets

U.S. PATENT DOCUMENTS

| | | | | |
|---|---|---|---|---|
| 6,148,031 A * | 11/2000 | Kato | ................... | 375/240.13 |
| 6,414,999 B1 * | 7/2002 | Igi et al. | ................ | 375/240.26 |
| 6,529,555 B1 * | 3/2003 | Saunders et al. | ....... | 375/240.26 |
| 6,556,627 B2 * | 4/2003 | Kitamura et al. | ....... | 375/240.26 |
| 6,700,932 B2 * | 3/2004 | Shen et al. | ............ | 375/240.12 |
| 2004/0105499 A1 * | 6/2004 | Kawa et al. | ............ | 375/240.25 |

FOREIGN PATENT DOCUMENTS

| | | |
|---|---|---|
| EP | 1 069 779 | 1/2001 |
| EP | 1 079 631 | 2/2001 |
| JP | 10 248056 | 9/1998 |
| JP | 2000 308052 | 11/2000 |
| JP | 2001 169278 | 6/2001 |

\* cited by examiner

FIG. 10

| compressed_stream_format_of_MPEG_2_re_coding_set(){ | No. of bits | Mnemonic |
|---|---|---|
| next_start_code() | | |
| sequence_header() | | |
| sequence_extension() | | |
| extension_and_user_data(0) | | |
| if (nextbits() == group_start_code){ | | |
| group_of_pictures_header() | | |
| extension_and_user_data(1) | | |
| } | | |
| picture_header() | | |
| picture_coding_extension() | | |
| re_coding_stream_info() | | |
| extensions_and_user_data(2) | | |
| if (! red_bw_flag || (red_bw_indicator <=2)) | | |
| picture_data() | | |
| sequence_end_code | 32 | bslbf |
| } | | |

FIG. 11

| Stream_Information_Header |||||||||
|---|---|---|---|---|---|---|---|---|
| Encoder_Serial_Number ||| 1 | Encoder_ID |||||
| 1 | 0x00 || 1 | Time_Second | 1 | Time_Minute | 1 | Time_Hour |
| 1 | 0x00 || 1 | Time_Day | 1 | Time_Month | 1 | Time_Year |
| 1 | Rsv | GenC | 1 1 | Continuity_Counter |||||
| 1 | pic_type | temporal_reference || 1 | reuse_level || error_f | 1 1 1 1 |
| A | extension_start_code_flags ||| 1 | other || Reserved ||
| 1 1 | B | C | 1 1 | num_of_picture_bytes(22) |||| 1 1 |
| bit_rate_extension(12) |||| 1 | bit_rate_value(18) |||| 1 |

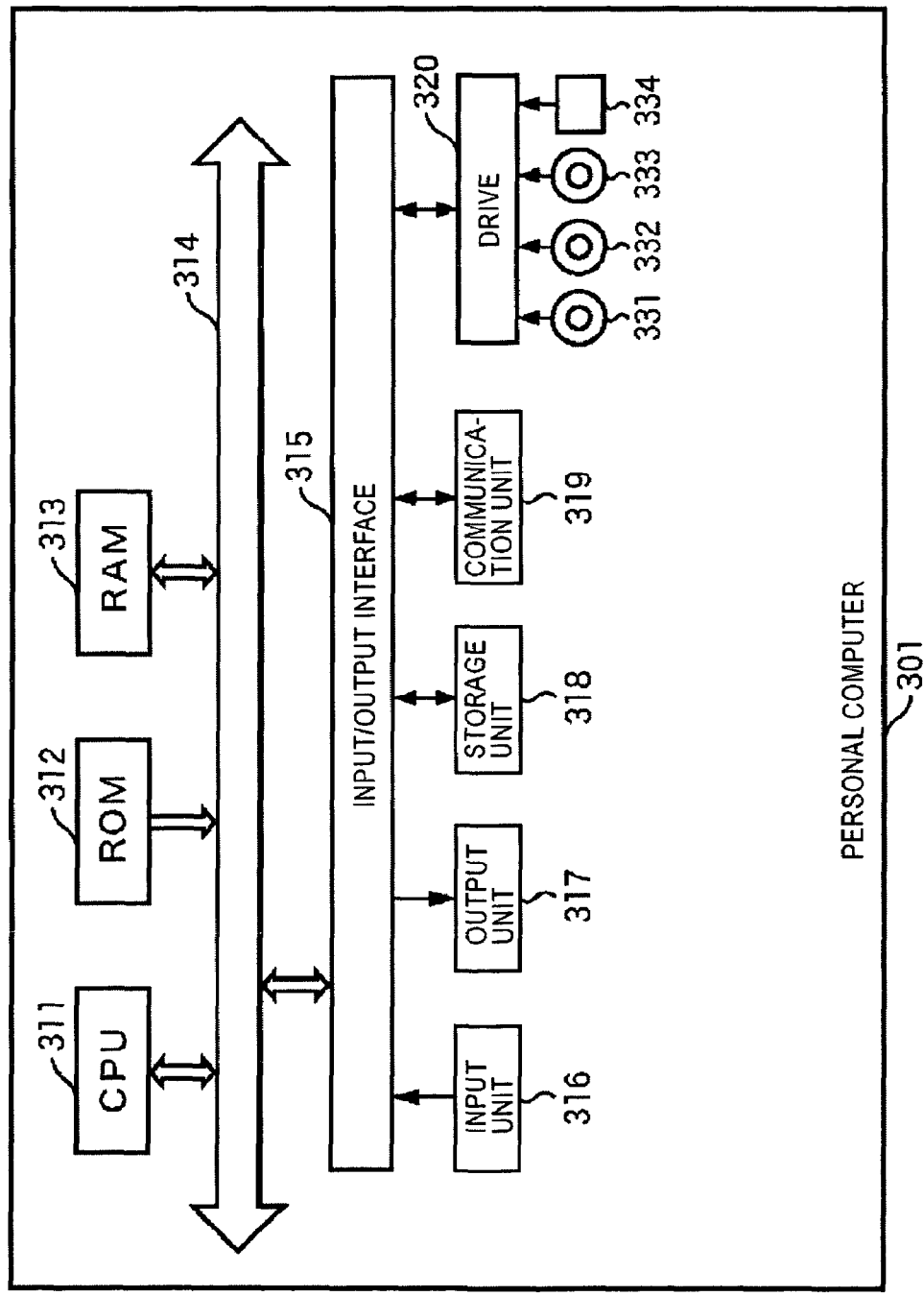

US 7,729,425 B2

IMAGE PROCESSING APPARATUS AND METHOD, PROGRAM, AND RECORDING MEDIUM

BACKGROUND OF THE INVENTION

1. Field of the Invention

The present invention relates to image processing apparatuses and methods, programs, and recording media. More particularly, the invention relates to an image processing apparatus and method, a program, and a recording medium in which recoding can be performed by using information concerning coding previously performed on corresponding data.

2. Description of the Related Art

In a system for transmitting moving picture signals to remote places, such as in a videoconference system or a videophone system, image signals are coded by being compressed according to line correlation or inter-frame correlation in order to efficiently utilize transmission channels.

When compressing an image signal, the image signal is coded so that a bit stream to be generated has a predetermined bit rate. In practical use, however, because of the situation of the transmission channel, it may be necessary to change the bit rate of the bit stream.

When editing a transmitted image signal in a broadcasting station, editing is performed in units of frames, and thus, information concerning each frame of the image signal should be independent of information concerning the other frames of the image signal. A long group of pictures (GOP) consisting of a large number of frames to be transferred with a low bit rate (for example, 3 to 9 Mbps) should be convertible to a short GOP consisting of a small number of frames to be transferred with a high bit rate (18 to 50 Mbps) and vice versa. In the long GOP, information is closely correlated so that the image quality is not deteriorated even if it is transferred with a low bit rate.

With reference to FIG. 1, a description is now given of a system in which frames can be edited after stream data consisting of long GOPs transmitted and received via a transmission channel is recoded into all intra-stream data having short GOPs.

Upon receiving a non-compressed original image, a coding device 1 codes it into long GOPs according to the MPEG method and transmits the stream data to a transcoder 2 via a transmission channel 11. In the transmission channel 11, stream data consisting of long GOPs, which are suitable for transmission, are transmitted.

In the transcoder 2, after the MPEG long GOP stream data supplied via the transmission channel 11 is decoded in a decoder 21, it is recoded to all intra-stream frames in a coder 22, and the coded all intra-stream data (serial data transport interface contents package (SDTI CP) stream) is output to a frame editing device 3 of an SDTI CP interface.

The stream data edited in the frame editing device 3 is supplied to a transcoder 4. In the transcoder 4, after the supplied all intra-stream data is decoded in a decoder 31, it is recoded into MPEG long GOPs in a coder 32, and the coded MPEG long GOP stream data is output to a predetermined data receiver via the transmission channel 11.

With reference to FIG. 2, a description is now given of a system for coding an input image into MPEG long GOPs with a high bit rate and for decoding the MPEG long GOPs and recoding them into low-bit-rate MPEG long GOPs.

The coding device 1 codes a non-compressed input image into high-bit-rate MPEG long GOPs and outputs the coded MPEG long GOP stream data. A transcoder 51 decodes the high-bit-rate MPEG long GOPs in a decoder 71 and then recodes them into the low-bit-rate MPEG long GOPs in a coder 72. The transcoder 51 then outputs the coded low-bit-rate MPEG long GOPs to a predetermined data receiver via the transmission channel 11.

In this manner, when repeatedly coding and decoding image information, the image quality becomes lower if coding parameters are changed every time coding is performed. To overcome this drawback, a technique for suppressing the deterioration of the image quality caused by recoding by using coding history information, which is inserted into the user data area of the picture layer of a bit stream, is disclosed in, for example, Japanese Unexamined Patent Application Publication No. 2000-059788.

For example, in a system in which MPEG long GOPs can be converted into short GOPs, which can be edited in units of frames, recoding is performed by using coding history information. The configuration of this system is described below with reference to FIG. 3. In FIG. 3, elements corresponding to those of FIG. 1 are indicated by like reference numerals, and an explanation thereof is thus omitted.

A transcoder 101 receives MPEG long GOPs from the coding device 1 via the transmission channel 11.

An MPEG long GOP consists of three types of pictures having different characteristics, i.e., intra-coded (I) pictures, predictive-coded (P) pictures, and bidirectionally predictive-coded (B) pictures. Accordingly, video data decoded from such an MPEG long GOP also consists of I pictures, P pictures, and B pictures. Thus, when recoding the video data into the MPEG long GOPs, if the I pictures, P pictures, and B pictures of the video data are recoded with different types of pictures, the image quality may be decreased. For example, if a B picture, which is more susceptible to distortions than I pictures or P pictures, is recoded as an I picture, the preceding or upcoming pictures obtain predictions from this distorted I picture, thereby decreasing the image quality.

To prevent the deterioration of the image quality caused by recoding, upon receiving, via the transmission channel 11, stream data that was previously coded in another transcoder or a coding device, a transcoder 101 performs the following operation. After decoding the supplied MPEG long GOP stream data in a decoder 111, when recoding the decoded MPEG long GOP stream data into all intra-stream frames in a coder 112, the transcoder 101 adds parameters, such as the picture types and quantizing levels, of the coded stream supplied to the decoder 111 to the all intra-coded stream as Society of Motion Picture and Television Engineers (SMPTE) 328M history information, and supplies the all intra-coded stream to the frame editing device 3.

The stream data edited in the frame editing device 3 is supplied to a transcoder 102. The transcoder 102 decodes the all intra-stream data with history information in a decoder 121. A coder 122 recodes the all intra-stream data into long GOPs by using parameters, such as the picture types and quantizing levels, contained in the decoded history information.

There is a system in which non-compressed data is coded into MPEG long GOPs with a high bit rate and the MPEG long GOPs are decoded, and the decoded data is recoded into low-bit-rate MPEG long GOPs. In this system, the deterioration of the image quality caused by recoding is suppressed. The configuration of this system is described below with reference to FIG. 4. In FIG. 4, elements corresponding to those in FIG. 2 are designated with like reference numerals, and an explanation thereof is thus omitted.

Upon receiving an MPEG long GOP stream coded in the coding device 1, a transcoder 131 obtains required coding parameters when decoding the high-bit-rate MPEG long GOP in a decoder 141, and supplies the decoded video data and the obtained coding parameters to a coder 142. The coder 142 recodes the video data into low-bit-rate MPEG long GOPs by using the supplied coding parameters, and outputs the coded low-bit-rate MPEG long GOP stream.

When using history information and coding parameters obtained during the decoding operation so as to prevent the deterioration of the image quality, the image data of a coded stream that is edited in the frame editing device 3 becomes discontinuous, thereby making the information indicating the correlation between frames meaningless. Accordingly, when using history information and coding parameters, the editing points of the stream data must be detected, and at the editing points, recoding must be performed without using the history information and coding parameters.

The following technique is disclosed in Japanese Unexamined Patent Application Publication No. 2003-143607. In editing code sequences in units of GOPs, the image types (I, P, B) are determined from the headers of input code sequences A and B to be edited, and codes (flags) indicating editing points are inserted or rewritten based on the image types of input code sequences A and B and externally input editing information, thereby indicating the editing points of the stream data.

The following technique disclosed in Japanese Unexamined Patent Application Publication No. 2001-169278 is also available. Information indicating a count number for counting frames or fields is added to stream data. When recoding images, discontinuous points of images generated by splicing, inserting, and removing the images are detected according to whether the count number is continuous.

As described above, the image quality can be maintained by performing recoding by reusing previous coding information, such as history information or coding parameters (parameters inserted into the picture layer and the macroblock layer, such as picture types, motion vectors, and quantizing levels). However, for example, during editing, streams having a bit rate, an image frame, or a chroma format that are different from that used in the previous coding may be disposed or inserted instead of the streams used in the previous coding. In this case, parameter information used in the previous coding cannot be reused for performing recoding.

As discussed above, there is one technique in which codes (flags) indicating editing points are inserted for detecting editing points. In this case, in the entire system for sending and receiving coded streams, all editing devices should be able to insert predetermined codes (flags) indicating editing points, and all coding devices should be able to detect such codes (flags). If there is one editing device that does not have a function of inserting codes (flags) indicating editing points in the system, a coded stream may include editing points without predetermined codes (flags).

As discussed above, there is another technique in which information indicating the count number for counting frames or fields is added to stream data. With this technique, even if there is an editing device without a function of inserting codes (flags) indicating editing points in the system, the editing points can be detected from the continuity of the count number. However, since the counter cannot infinitely count the number, the count number may become continuous at an editing point. Additionally, when a plurality of cameras are used to start imaging and images are time-sequentially edited by switching the cameras, the count number becomes continuous at editing points. More specifically, for example, in broadcasting a baseball game using a plurality of cameras, if camera A at a backstop and camera B at a bleacher start imaging at the same time and if a pitcher imaged by camera A and a batter imaged by camera B are time-sequentially switched, such a switching point becomes an editing point. However, the count number contained in a frame or field becomes continuous.

SUMMARY OF THE INVENTION

Accordingly, in view of the above background, it is an object of the present invention to detect editing points of image data and to select items of information that can be reused according to the status of the image data including the detected editing points.

In order to achieve the above object, according to one aspect of the present invention, there is provided an image processing apparatus including: a data converter for performing at least part of coding processing on image data; a detector for detecting an editing point of the image data; and a controller for determining, based on the editing point detected by the detector, a reuse disable period in which information concerning previous coding processing performed on the image data is not reusable when the data converter performs at least part of the coding processing.

According to another aspect of the present invention, there is provided an image processing method including: a detection step of detecting an editing point of image data; and a control step of determining, based on the editing point detected in the detection step, a reuse disable period in which information concerning previous coding processing is not reusable when at least part of coding processing is performed.

According to still another aspect of the present invention, there is provided a program for allowing a computer to execute an image processing method including: a detection step of detecting an editing point of image data; and a control step of determining, based on the editing point detected in the detection step, a reuse disable period in which information concerning previous coding processing is not reusable when at least part of coding processing is performed.

According to a further aspect of the present invention, there is provided a recording medium storing therein a program for allowing a computer to execute an image processing method including: a detection step of detecting an editing point of image data; and a control step of determining, based on the editing point detected in the detection step, a reuse disable period in which information concerning previous coding processing is not reusable when at least part of coding processing is performed.

According to the image processing apparatus and method, the program, and the recording medium of the present invention, an editing point of image data is detected. Based on this editing point, a reuse disable period in which information concerning previous coding processing performed on the image data cannot be reused when at least part of the coding processing is performed is determined.

With this configuration, the overflow or underflow of a VBV buffer and the deterioration of the image quality can be prevented.

BRIEF DESCRIPTION OF THE DRAWINGS

FIG. 10 illustrates the syntax of compressed_stream_format_of_MPEG_2_re_coding_set ( ) defined in SMPTE 329M;

FIG. 11 illustrates information indicated in user_data (2) of extension_and_user_data (2);

FIG. 35 is a block diagram illustrating the configuration of a personal computer.

DESCRIPTION OF THE PREFERRED EMBODIMENTS

The relationship between the present invention disclosed in this specification and preferred embodiments of the present invention is described below. The subsequent embodiments are described for supporting the present invention. While the present invention is described with reference to what are presently considered to be the preferred embodiments, it is to be understood that the invention is not limited to the disclosed embodiments. On the contrary, the invention is intended to cover other embodiments. Conversely, the embodiments disclosed in this specification are not restricted to the present invention and may be applied to other inventions.

This description is not restricted to the present invention. In other words, this description encompasses the aspects of the invention that are disclosed in this specification and that are not claimed in this application, i.e., aspects of the invention that may be divisionally filed or may appear or added by amendments in the future.

The present invention is described in detail below with reference to the accompanying drawings through illustration of preferred embodiments.

A system in which MPEG long GOPs can be converted into short GOPs, which can be edited in units of frames, using coding history information is discussed below with reference to FIG. 5.

Figure 1:
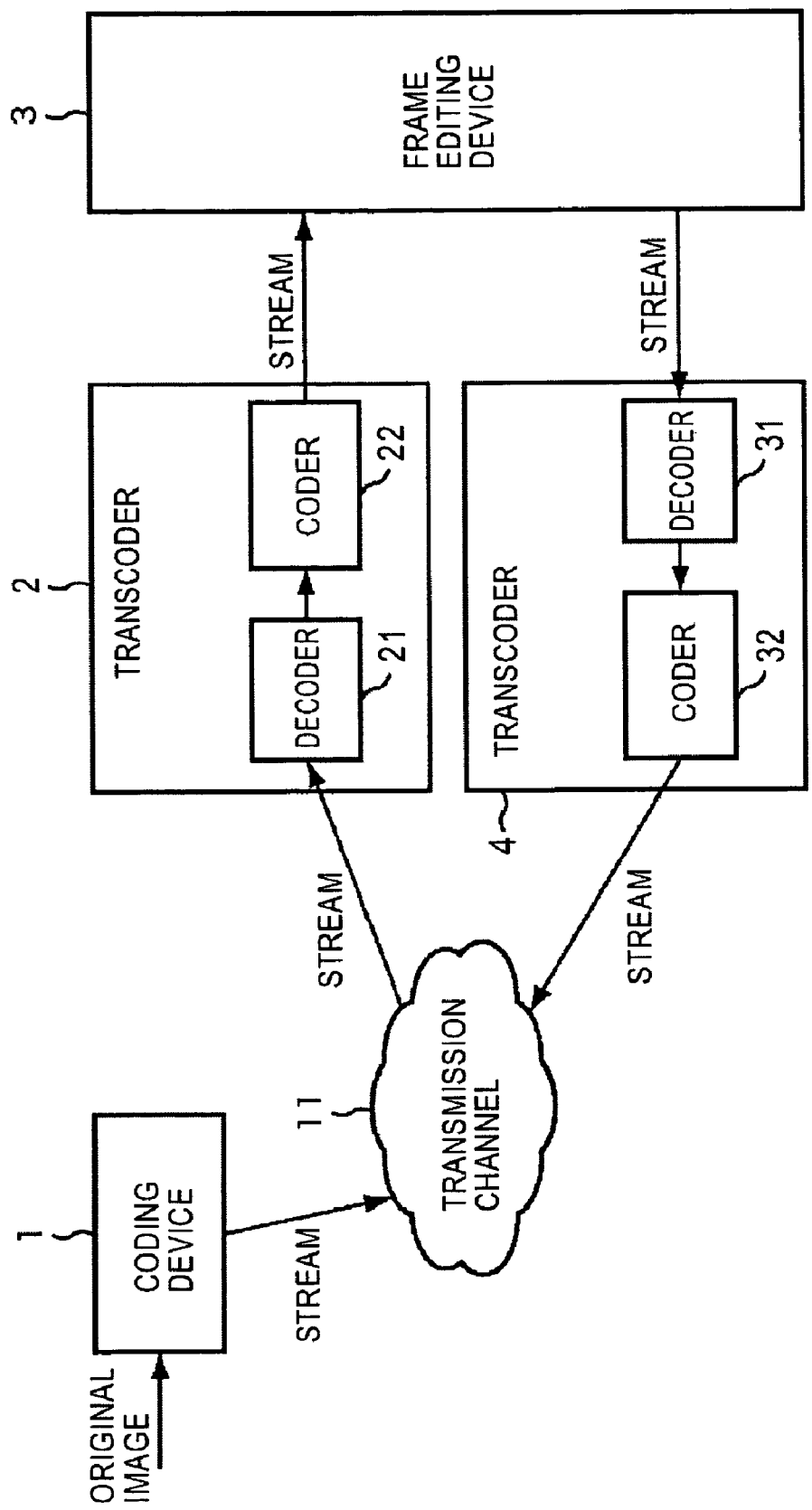
FIG. 1 is a block diagram illustrating a known system in which recoding is performed after editing data in units of frames.
Figure 2:
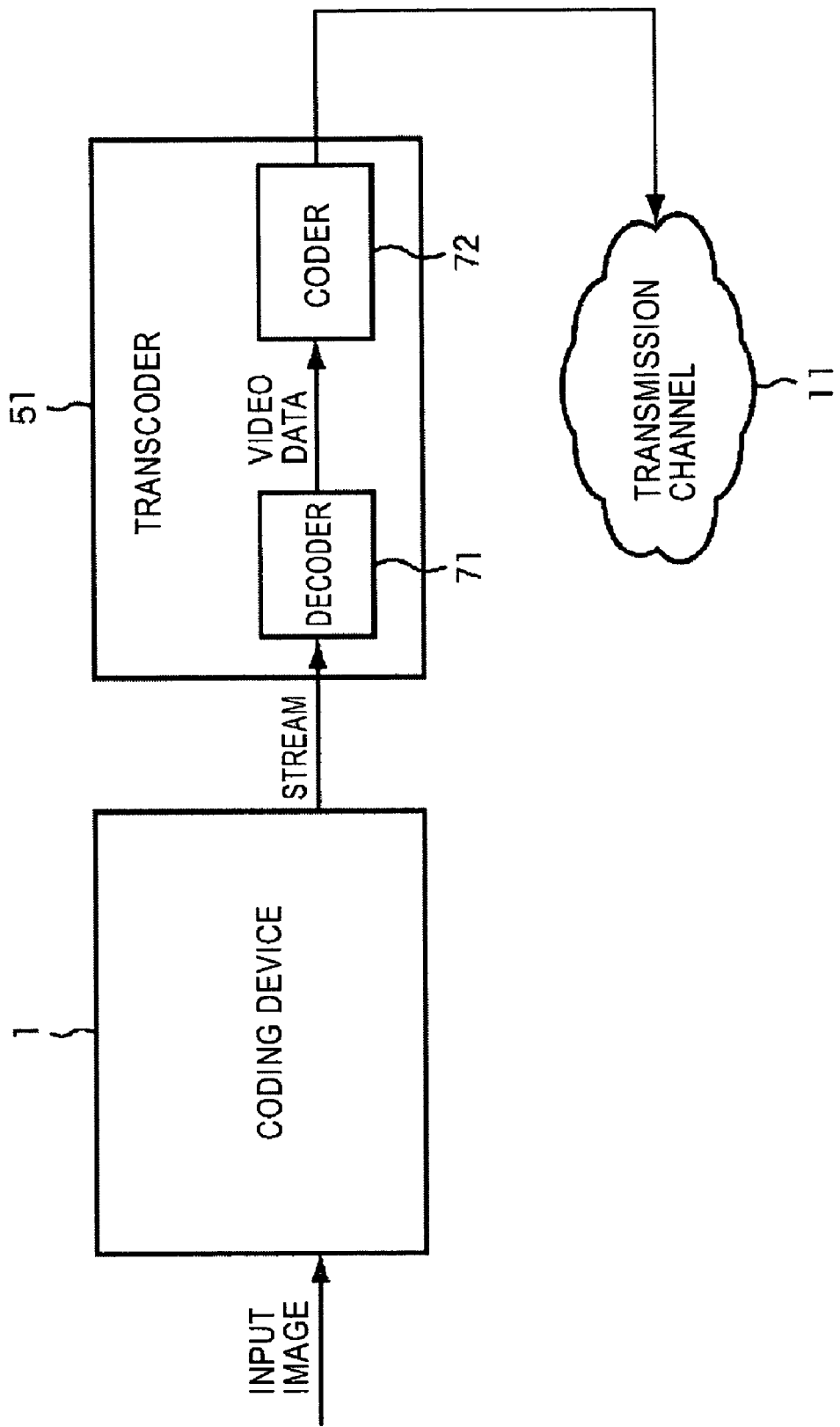
FIG. 2 is a block diagram illustrating a known system in which recoding can be performed by changing the bit rate of MPEG long GOPs.
Figure 3:
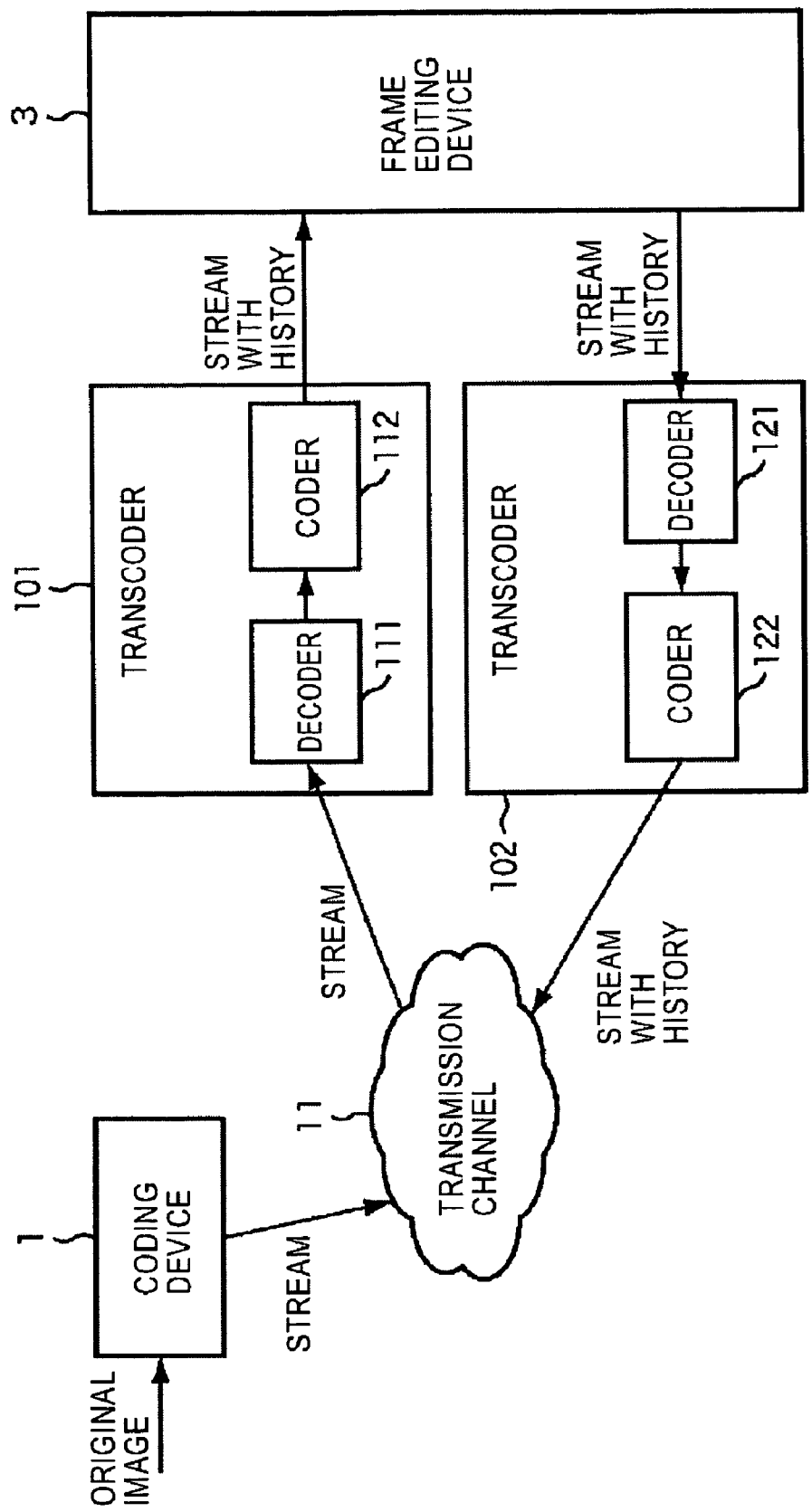
FIG. 3 is a block diagram illustrating the known system shown in FIG. 1 in which coding history information is used.
Figure 5:
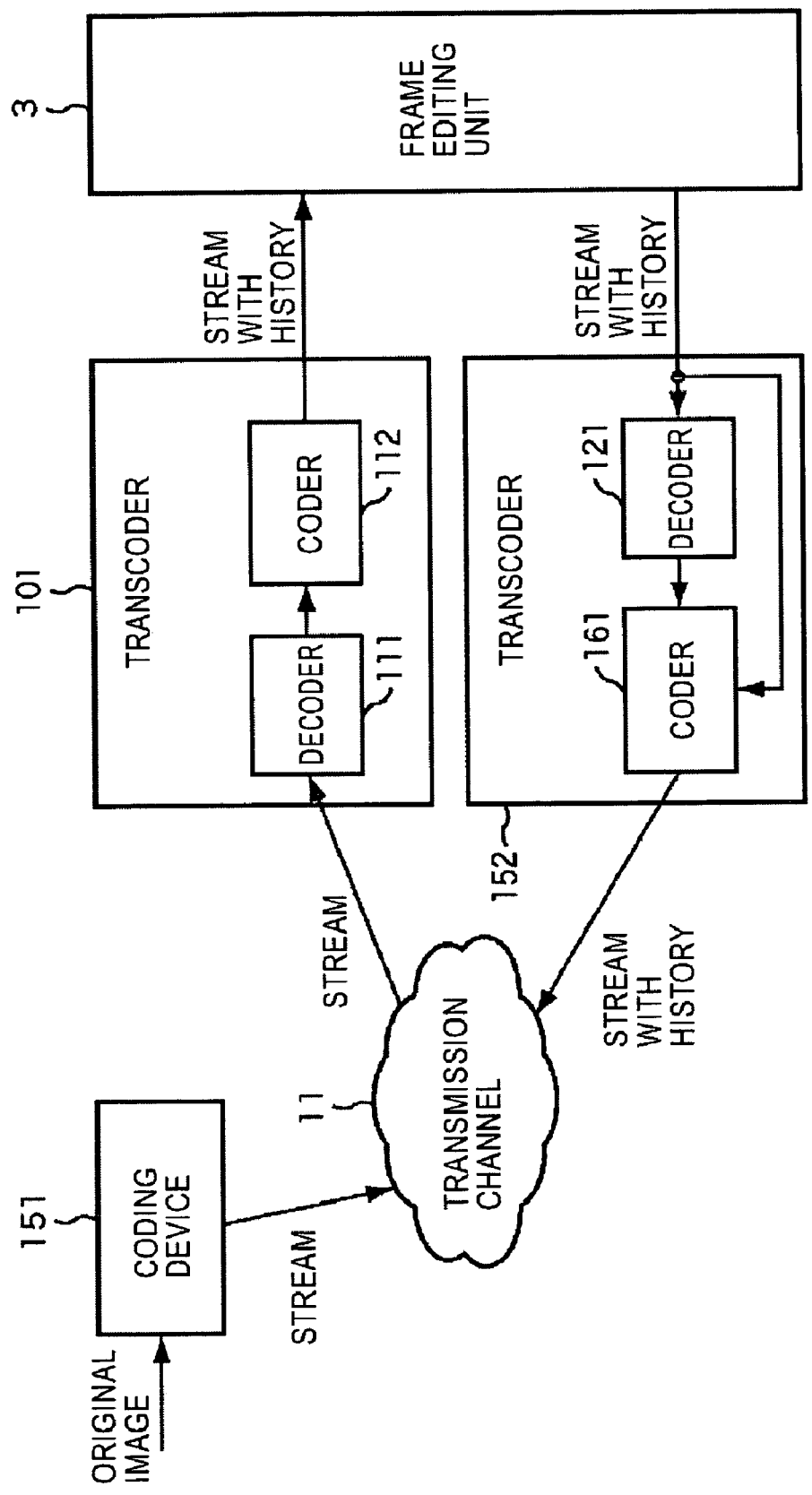
FIG. 5 is a block diagram illustrating a system in which recoding is performed after editing data in units of frames according to the present invention.

In FIG. 5, elements corresponding to those in FIG. 3 are designated with like reference numerals. The structure of the system shown in FIG. 5 is basically similar to that shown in FIG. 3, except that a coding device 151 and a transcoder 152 are provided instead of the coding device 1 and the transcoder 102, respectively. The transcoder 152 includes a coder 161 that can select history information that can be reused according to the conditions of a supplied stream. The structure of the coder 161 is similar to the coder 122 of the transcoder 102 in FIG. 3, except that, not only is a decoded signal output from the decoder 121, but also stream data input into the decoder 121 is also supplied to the coder 161.

The coding device 151 receives a non-compressed original image and codes it. The coding device 151 generates additional coding information and adds it to a coded stream so that the coder 161 of the transcoder 152 can detect editing points after the image data is edited in the frame editing device 3.

Figure 6:
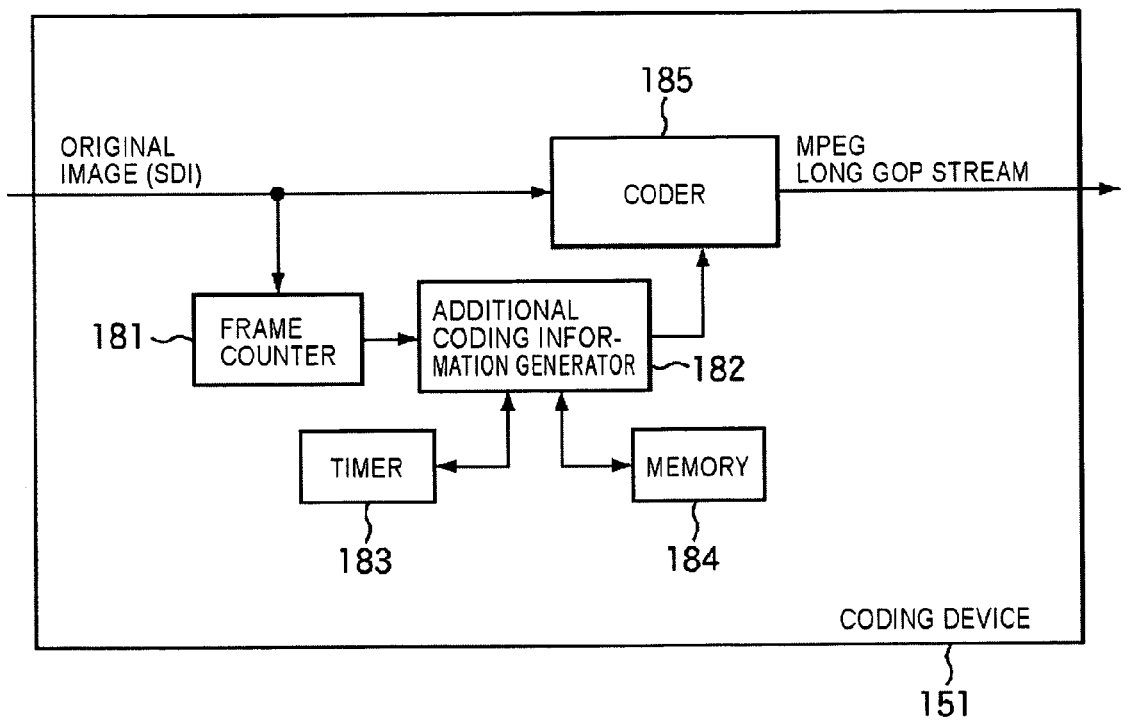
FIG. 6 is a block diagram illustrating the configuration of a coding device in the system shown in FIG. 5.

FIG. 6 is a block diagram illustrating the configuration of the coding device 151. A frame counter 181 detects a frame sync when an original image is input and counts up the count number for each frame so as to supply the count number to an additional coding information generator 182. The frame counter 181 has a predetermined upper limit, for example, 65535, and thus, when the count number reaches the upper limit, it restarts counting from 0. That is, in the processing described below, when recoding is performed, the upper limit and 0 are recognized as continuous frames.

In this embodiment, the frame counter 181 counts up or counts down by one. Alternatively, it may count up or count down by a predetermined number, for example, 2, for each frame, and outputs the count number to the additional coding information generator 182.

In a memory 184, Encoder_ID indicating the type of the coding device 151 and Encoder_Serial_Number indicating the serial number of this encoder are stored. In other words, Encoder_ID and Encoder_Serial_Number are identification information for uniquely identifying the coding device 151.

The additional coding information generator 182 sets the count number supplied from the frame counter 181 as Continuity_Counter, and reads the Encoder_ID and Encoder_Serial_Number from the memory 184. The additional coding information generator 182 then supplies the Encoder_ID and Encoder_Serial_Number together with the Continuity_Counter to a coder 185 in units of frames.

The coder 185 codes an original image of, for example, a serial digital interface (SDI) format, into MPEG long GOPs by a known coding method, and also adds the information indicating the Continuity_Counter, Encoder_ID and Encoder_Serial_Number supplied from the additional coding information generator 182 to each frame of a long GOP as additional coding information.

That is, the additional coding information added to a coded stream by the coder 185 indicates Continuity_Counter, Encoder_ID, and Encoder_Serial_Number. Accordingly, even if the count number becomes continuous at an editing point or indicates continuous frames, it can be found during recoding processing that a different coding device has coded the frame based on the Encoder_ID or Encoder_Serial_Number, thereby detecting the presence of editing points.

To specify the coding device 151, Encoder_ID, which is information indicating the type of coding device, and Encoder_Serial_Number, which indicates the serial number, are used. Generally, the serial number is represented by several digits and, if necessary, several alphabetic letters. If alphabetic letters indicating the type of coding device are not added to the serial number, it is possible that there may be more than one coding device of different types having the same serial number. Accordingly, to specify the coding device 151, both the Encoder_ID indicating the type of coding device and Encoder_Serial_Number indicating the serial number are preferably used so that coding devices of different types having the same serial number cannot be recognized as the same coding device. If, however, several alphabetic letters indicating the type of coding device are contained in the serial number, it is not possible for other coding devices of different types to have the same serial number, in other words, the coding device can be specified only by the serial number. In this case, only the Encoder_Serial_Number indicating the serial number can be stored in the memory 184 as information for specifying the coding device 151 and is added to the stream coded by the coder 185 as additional coding information.

Even if the Continuity_Counter is not contained in the additional coding information, it can be found that a different coding device has coded a stream if the Encoder_ID and Encoder_Serial_Number are added. Thus, editing points can be detected.

Instead of the information for specifying the coding device 151, information indicating the time point at which the coding device 151 started coding may be used as the additional coding information.

Upon receiving the input of the count number of frames supplied from the frame counter 181, the additional coding information generator 182 obtains the current time or the current time and date from a timer 183 as time information indicating the start time of the first frame, and supplies such information to the memory 184. The memory 184 receives the information indicating the coding start time or coding start time and date supplied from the additional coding information generator 182, and stores the information as Encoding_Start_Time_Code.

In the Encoding_Start_Time_Code, information indicating the start time or start time and date is included as the information indicating the coding start time. This information may be a combination of "second, minute, hour, day, month, and year", "second, minute, hour, day, and month", "second, minute, hour, and day", "second, minute, and hour", or "minute and hour". Alternatively, the information may be one item of "second, minute, hour, day, month, and year". Any item of information may be used as long as it can be found that, if the Encoding_Start_Time_Code of one data stream is different from that of another data stream, they are not a series of coded streams in which coding started at the same time point.

The additional coding information generator 182 sets the count number supplied from the frame counter as Continuity_Counter and reads Encoding_Start_Time_Code from the memory 184 so as to supply them for each frame to the coder 185.

The coder 185 codes an original image of, for example, the SDI format, into MPEG long GOPs by a known coding method, and also adds information of the Continuity_Counter and Encoding_Start_Time_Code supplied from the additional coding information generator 182 as the additional coding information to each frame the MPEG long GOPs, and outputs the resulting MPEG long GOPs.

With this configuration, even if count numbers become continuous at an editing point, the editing point can be detected if the time and date at which coding started is different between data streams by checking the Encoding_Start_Time_Code. Accordingly, editing points can be reliably detected even if count numbers become continuous.

Even if the Continuity_Counter is not contained in the additional coding information, it can be found that the time and date at which coding started is different between data streams if the Encoding_Start_Time_Code is added. Thus, editing points can be detected.

In the coding device 151, the additional coding information to be added to a coded stream may contain Continuity_Counter, Encoding_Start_Time_Code, Encoder_ID, and Encoder_Serial_Number.

More specifically, upon receiving the input of the frame count number supplied from the frame counter 181, the additional coding information generator 182 obtains information indicating the current time and date from the timer 183 as time information at which the coding of the first frame started, and supplies the information to the memory 184. The memory 184 also receives information indicating the coding start time supplied from the additional coding information generator 182 and stores it as Encoding_Start_Time_Code.

The memory 184 also stores Encoder_ID, which is information indicating the type of coding device 151, and Encoder_Serial_Number indicating the serial number of the coding device 151. The additional coding information generator 182 sets the count number supplied from the memory 184 as Continuity_Counter and reads Encoding_Start_Time_Code, Encoder_ID, and Encoder_Serial_Number from the memory 184 so as to supply them for each frame to the coder 185.

The coder 185 codes an original image of, for example, the SDI format, into MPEG long GOPs by a known coding method, and adds information of Continuity_Counter, Encoding_Start_Time_Code, Encoder_ID, and Encoder_Serial_Number, which are additional coding information supplied from the additional coding information generator 182, to each frame of the MPEG long GOPs.

In the coding device 151 shown in FIG. 6, the additional coding information generated by the additional coding information generator 182 is added to each frame of a coded stream, and the resulting coded stream is output. However, if the additional coding information is correctly linked to each frame of the coded stream, the coded stream and the additional coding information may be separately output. The coded stream and the additional coding information are transmitted to the transcoder 101 via the transmission channel 11, as discussed above. Alternatively, they may be recorded on a recording medium and supplied to the transcoder 101. In this case, if the additional coding information is correctly linked to each frame of the coded stream, the coded stream and the additional coding information may be recorded in different recording media and supplied.

Figure 7:
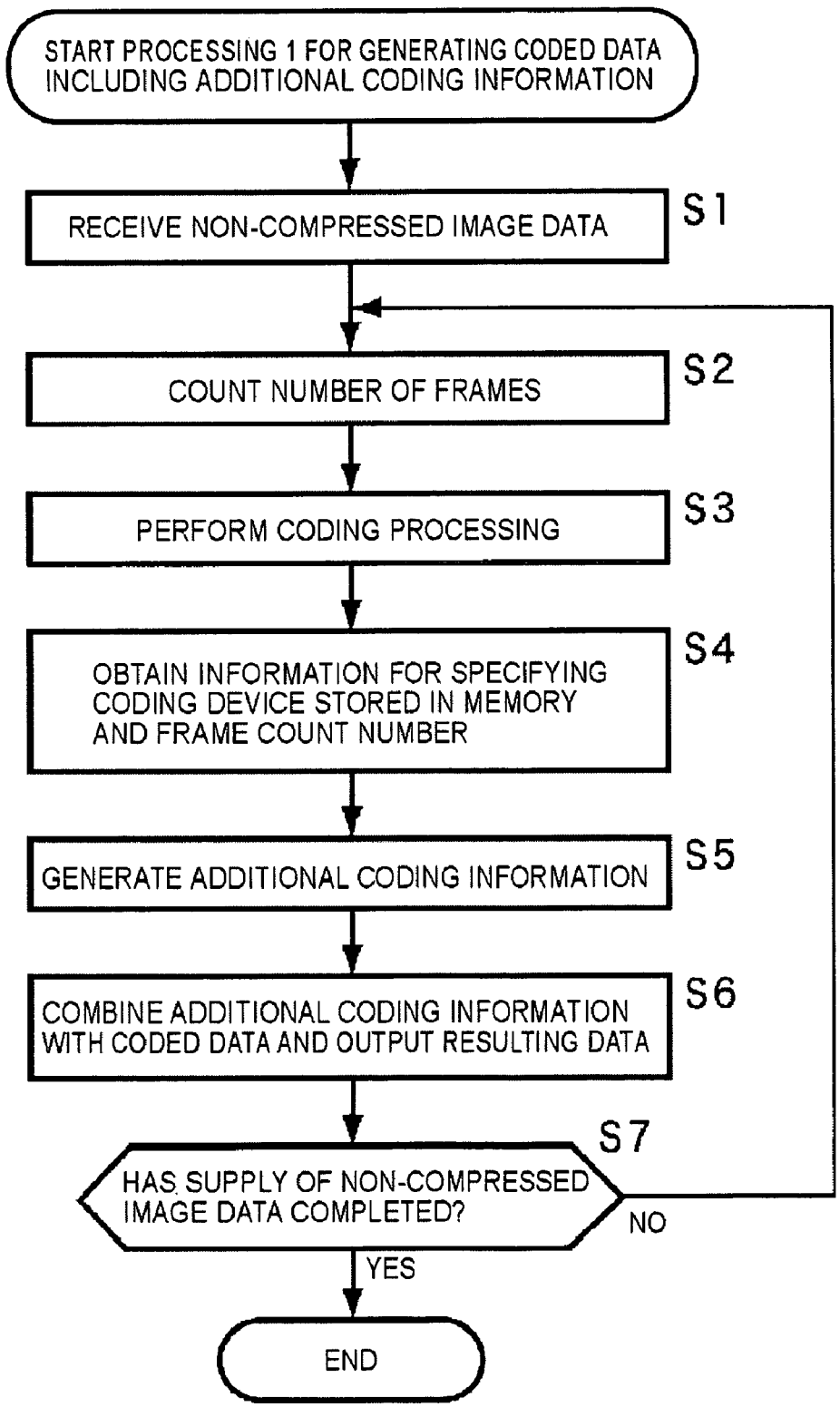
FIG. 7 is a flowchart illustrating processing 1 for generating coded data including additional coding information.

With reference to FIG. 7, a description is given below of processing 1 for generating coded data including coding information. In the following processing, it is now assumed that information for specifying the coding device 151 has been stored in the memory 184.

In step S1, the coding device 151 receives non-compressed image data and supplies it to the coder 185.

In step S2, the frame counter 181 detects a frame sync of the non-compressed data supplied to the coder 185 and counts the number of frames.

In step S3, the coder 185 codes the supplied non-compressed image data.

In step S4, the additional coding information generator 182 obtains information for specifying the coding device (that is, Encoder_ID and Encoder_Serial_Number) stored in the memory 184 and the frame count number (Continuity_Counter) counted by the frame counter 181. If the coding device 151 can be specified only by the Encoder_Serial_Number, it suffices that only Encoder_Serial_Number be stored in the memory 184 and obtained by the additional coding information generator 182.

In step S5, the additional coding information generator 182 generates additional coding information based on the information for specifying the coding device (Encoder_ID and Encoder_Serial_Number) and the frame count number (Continuity_Counter), and supplies the additional coding information to the coder 185.

In step S6, the coder 185 combines the additional coding information with the coded data and outputs the resulting data.

In step S7, the coder 185 determines whether the supply of the non-compressed image data is finished. If not, the process returns to step S2, and step S2 and the subsequent steps are repeated. If it is determined that the supply of the non-compressed image data is finished, the process is completed.

According to this processing, the information for specifying the coding device (Encoder_ID and Encoder_Serial_Number) and the frame count number (Continuity_Counter) are added to the coded data as the additional coding information. Thus, when recoding this coded data, editing points can be detected.

Figure 8:
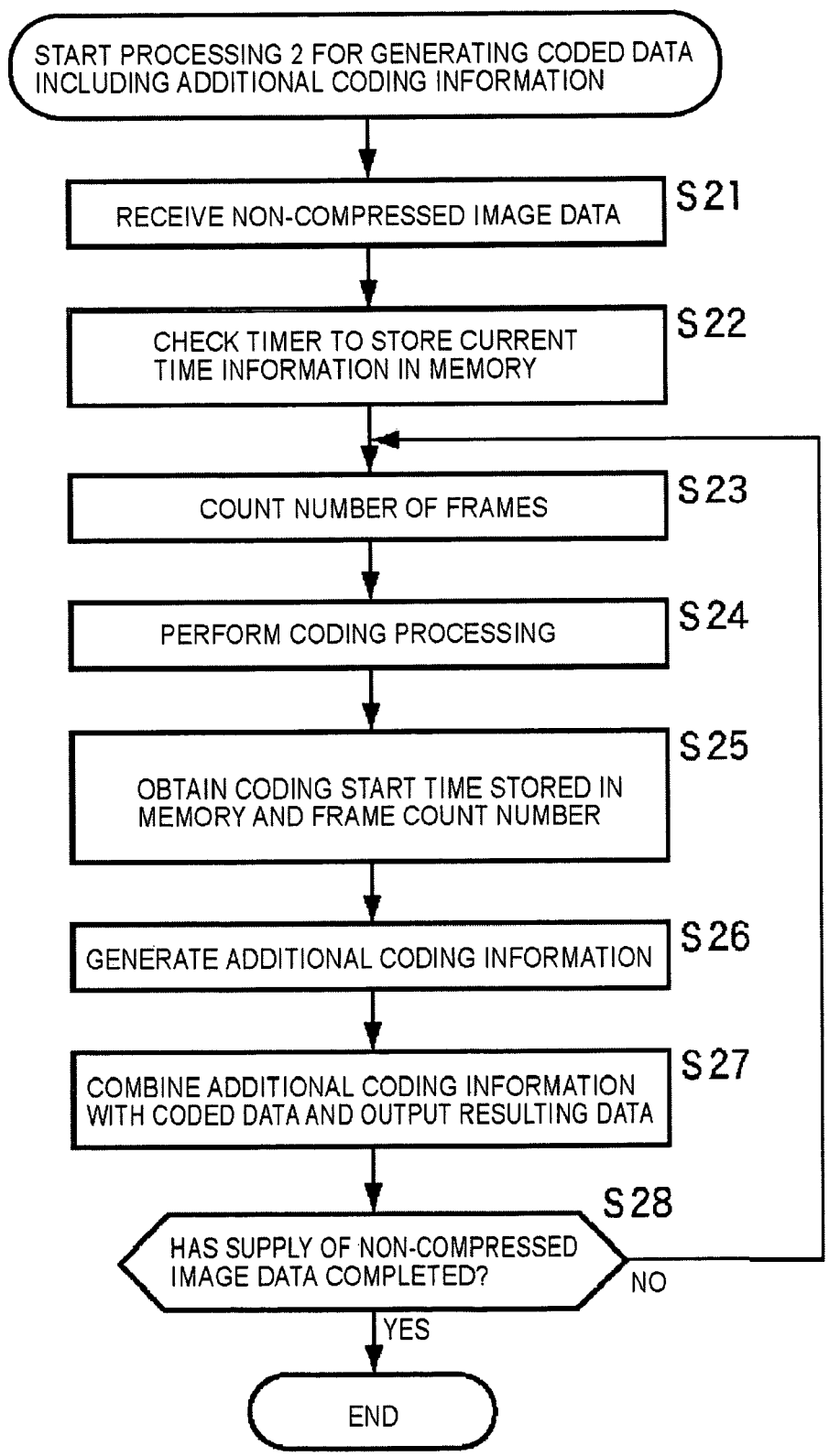
FIG. 8 is a flowchart illustrating processing 2 for generating coded data including additional coding information.

With reference to the flowchart of FIG. 8, a description is now given of processing 2 for generating coded data containing coding information. In this processing, it is not necessary that information for specifying the coding device 151 be stored in the memory 184 in advance.

In step S21, the coding device 151 receives non-compressed image data and supplies it to the coder 185.

In step S22, the additional coding information generator 182 obtains current time information indicating the current time, such as second, minute, hour, day, month, and year, by checking the timer 183, and stores the current time information in the memory 184 as the coding start time (Encoding_Start_Time_Code).

Steps S23 and S24 are similar to steps S2 and S3, respectively, of FIG. 7. That is, in step S23, the frame numbers of the supplied non-compressed image data are counted, and in step S24, coding is performed.

In step S25, the additional coding information generator 182 obtains the coding start time (Encoding_Start_Time_Code) stored in the memory 184 and the frame count number (Continuity_Counter) counted by the frame counter 181.

In step S26, the additional coding information generator 182 generates additional coding information based on the obtained coding start time (Encoding_Start_Time_Code) and the frame count number (Continuity_Counter) and supplies the generated additional coding information to the coder 185.

Steps S27 and S28 are similar to steps S6 and S7, respectively, of FIG. 7. That is, in step S27, the additional coding information is combined with the coded data, and it is determined in step S28 whether the supply of the non-compressed image data is finished. If not, the process returns to step S23, and step S23 and the subsequent steps are repeated. If it is determined in step S28 that the supply of the non-compressed image data is finished, the process is completed.

According to this processing, the coding start time (Encoding_Start Time_Code) and the frame count number (Continuity_Counter) are added to the coded data as the additional coding information. Thus, in recoding processing, which is described below, editing points can be detected.

Figure 9:
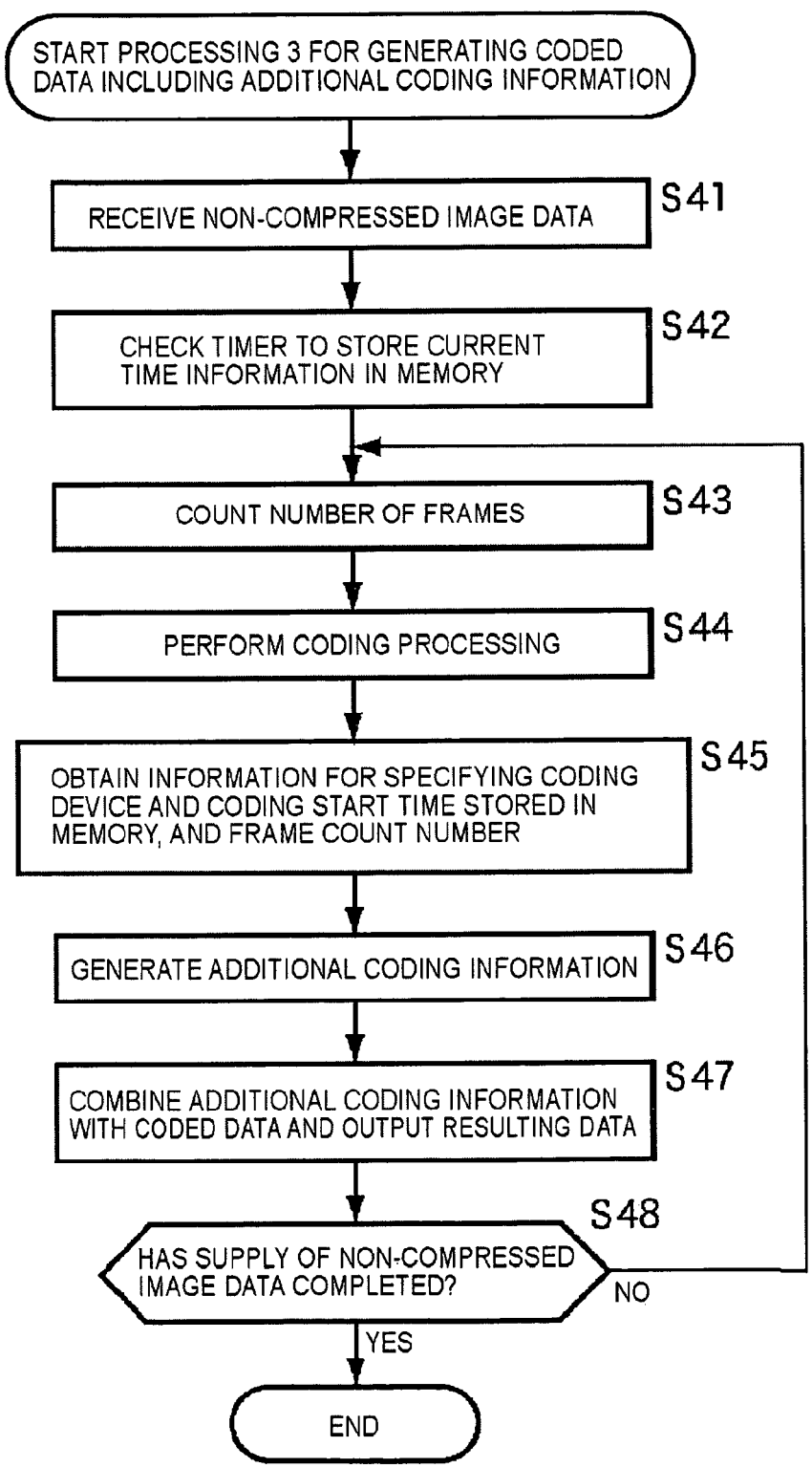
FIG. 9 is a flowchart illustrating processing 3 for generating coded data including additional coding information.

With reference to the flowchart of FIG. 9, a description is now given of processing 3 for generating coded data containing coding information. In this processing, information for specifying the coding device 151 is stored in the memory 184 in advance.

In step S41, the coding device 151 receives non-compressed image data and supplies it to the coder 185.

In step S42, the additional coding information generator 182 obtains current time information by checking the timer 183, and stores it in the memory 184 as the coding start time (Encoding_Start_Time_Code).

Steps S43 and S44 are similar to steps S2 and S3, respectively, of FIG. 7. That is, in step S43, the frame numbers of the non-compressed image data are counted, and in step S44, coding processing is performed.

In step S45, the additional coding information generator 182 obtains the information for specifying the coding device (i.e., Encoder_ID and Encoder_Serial_Number) and the coding start time (Encoding_Start_Time_Code) stored in the memory 184, and the frame count number (Continuity_Counter) counted by the frame counter 181. If the coding device 151 can be specified only by the Encoder_Serial_Number, it suffices that only the Encoder_Serial_Number is stored in the memory 184 and obtained by the additional coding information generator 182.

In step S46, the additional coding information generator 182 generates additional coding information based on the information for specifying the coding device (i.e., Encoder_ID and Encoder_Serial_Number), the coding start time (Encoding_Start_Time_Code), and the frame count number (Continuity_Counter), and supplies the generated additional coding information to the coder 185.

Steps S47 and S48 are similar to steps S6 and S7, respectively, of FIG. 7. That is, in step S47, the additional coding information is added to the coded data and the resulting data is output. In step S48, it is determined whether the supply of the non-compressed image data is finished, and if not, the process returns to step S43, and step S43 and the subsequent steps are repeated. If it is determined in step S48 that the supply of the non-compressed image data is finished, the process is completed.

According to this processing, the information for specifying the coding device (i.e., Encoder_ID and Encoder_Serial_Number), the coding start time (Encoding_Start_Time_Code), and the frame count number (Continuity_Counter) is added to the coded data as the additional coding information. Thus, in recoding processing, which is discussed below, editing points can be detected with higher precision than the processing described with reference to FIG. 7 or 8.

The additional coding information generated by the processing described with reference to FIG. 7, 8, or 9, may be used as IDs or key numbers when creating a database of stream data or forming stream data into a library. The additional coding information may also be used, not only for determining a period for which history data or coding parameters cannot be reused during the recoding operation, but also for locating the start of frames during the playback operation (for example, the start points and end points of chapters in, for example, a DVD and the start points and end points for the repeat-playback operation) or for detecting scene changes. By detecting scene changes, the quantizing level during coding can be optimally controlled. When stream data concerning commercials is contained in program streams of, for example, television broadcasting, the portions into which the commercials are inserted can be detected. When thumbnail images are automatically generated by using stream data and are provided to the user, the partitioning position of the stream data can be determined.

Referring back to FIG. 5, the transcoder 101 receives MPEG long GOPs with the additional coding information via the transmission channel 11.

The MPEG long GOP is formed of three types of pictures (I pictures, P pictures, and B pictures). In the transcoder 101, the decoder 111 decodes the MPEG long GOPs. Then, when the coder 112 codes the MPEG long GOPs into all intra-stream frames, coding parameters (parameters inserted into the picture layer or macroblock layer, such as the picture types, motion vectors, and quantizing levels for previous coding) used in the coding device that has transmitted the MPEG long GOP stream to the transcoder 101 via the transmission channel 11 are added to the all intra-stream (SDTI CP stream) as history information defined in the SMPTE (SMPTE 328M or SMPTE 329M). By adding the coding parameters to the all intra-stream, when the stream data is recoded into long GOPs in the subsequent processing, the I pictures, P pictures, and B pictures of the video data can be prevented from being recoded with different types of pictures. The coder 112 then supplies the coded data to the editing device 3 of the SDTI CP interface.

The syntax (SMPTE 329M) of compressed_stream_format_of_MPEG_2_re_coding_set ( ) is described below with reference to FIG. 10.

The compressed_stream_format_of_MPEG_2_re_coding_set ( ) of SMPTE 329M includes data elements defined by the next_start_code ( ) function, sequence_header ( ) function, sequence_extension ( ) function, extension_and_user_data (0) function, group_of_picture_header ( ) function, extension_and_user_data (1) function, picture_header ( ) function, picture_coding_extension ( ) function, re_coding_stream_info ( ) function, extension_and_user_data (2) function, and picture_data ( ) function.

The next_start_code ( ) function is a function for searching for the start code contained in a bit stream. The data elements defined by the sequence_header ( ) function includes horizontal_size_value indicating the lower 12 bits of the number of pixels of an image in the horizontal direction, vertical_size_value indicating the lower 12 bits of the number of lines of the image in the vertical direction, VBV_buffer_size_value indicating the lower 10 bits for determining the size of a virtual buffer (video buffer verifier (VBV)) for controlling the amount of code to be generated. The data elements defined by the sequence_extension ( ) function include progressive_sequence, which indicates that video data is sequential scanning, chroma_format for specifying the chroma format of the video data, and low_delay, which indicates that the video data does not contain B pictures.

For the extension_and_user_data (i) function, when i is other than two, the data element defined by the extension_data ( ) function is not indicated, and only the data element defined by the user_data ( ) function is indicated as a history stream. Accordingly, for the extension_and_user_data (0) function, only the data element defined by the user_data ( ) function is indicated as the history stream. Then, only when the group_start_code representing the start code of the GOP layer is indicated in the history stream, the data element defined by the group_of_picture_header ( ) function and the data element defined by the extension_and_user_data (1) function are indicated.

The data elements defined by the picture_header ( ) function include picture_start_code representing the start synchronizing code of the picture layer and temporal_reference representing the display order of pictures and being reset at the head of a GOP. The data elements defined by the picture_coding_extension ( ) function includes picture_structure, which indicates whether the data has a frame structure or a field structure, and also indicates, if the data has a field structure, whether the field is the upper or lower field. The data elements defined by the picture_coding_extension ( ) function also include top_field_first, which indicates, if the data has a frame structure, whether the first field is the upper or lower field, q_scale_type representing whether the linear quantizing scale or the nonlinear quantizing scale is used, and repeat_firt_field used when 2-3 pull-down is performed.

The data elements defined by the re_coding_stream_info ( ) function are defined by SMPTE 327M. The extension_and_user_data (2) function is discussed later with reference to FIG. 11. The data elements defined by the picture_data ( ) function are defined by the slice ( ) function. The slice ( ) function defines macroblock ( ), and motion_vectors information is indicated in the macroblock ( ).

Information indicated in the user_data (2) in the extension_and_user_data (2) of the compressed_stream_format_of_MPEG_2_re_coding_set ( ) described with reference to FIG. 10 is discussed below with reference to FIG. 11.

The Stream_Information_Header is 32-bit data consisting of 16-bit Stream_Information_Header in which the header number for identifying the user_data of the picture_layer is indicated, 8-bit Length indicating the byte length of the Stream_Information ( ), and marker_bits.

The Encoder_Serial_Number is 16-bit information indicating the number (serial number) unique to the encoder (coder or coding device). The Encoder_ID is 15-bit information indicating the ID of the type of encoder.

The subsequent Encoding_Start_Time_Code is 8-byte information indicating the time at which the generation of this stream started, and the MSB of each byte is set to marker_bit=1. In this case, 6 bytes of the 8 bytes are used, and the year (Time_Year), month (Time_Month), day (Time_Day), hour (Time_Hour), minute (Time_Minute), and second (Time_Second) at which the generation of the stream data started are indicated. These values become constant in one stream.

The Encoder_Serial_Number, Encoder_ID, or Encoding_Start_Time_Code can also be used as IDs and key numbers for creating a database of stream data or forming the stream data into a library.

The Generation_Counter (GenC) is 4-bit information indicating the count number representing the coding generation. The counting of the coding generation is started when SDI data is encoded into asynchronous serial interface (ASI) data (the first generation), and when the ASI data is recoded into the ASI data or when the SDTI CP data is recoded into the ASI data, the count number is incremented.

SDTI CP is world standards standardized by SMPTE 326M recommended by the Pro-MPEG forum and is used for transmitting (synchronously transferring) MPEG data in real time. SDTI CP is a transmission method when data is all intra-frames. SDI is a point-to-point transmission method for transmitting non-compressed digital video/audio data and is defined in ANSI/SMPTE 259M. ASI is a transmission method for transmitting stream data of coded MPEG long GOPs.

The Continuity_Counter is a counter incremented in units of frames. When the counter reaches the maximum value, it starts recounting from 0. If necessary, the Continuity_Counter may count the number of fields or the number of pictures, the number of units of adjacent frames having the same coding type of picture (i.e.: I picture, B picture, or P picture) or the number of GOPs rather than the number of frames.

The Continuity_Counter can also be used as IDs or key numbers for creating a database of the stream data or for forming the stream data into a library.

The following items of information are to be extracted from parameters generated when the data is decoded in a decoder (decoding device) and are to be inserted. Accordingly, only areas for such items of information are reserved before they are inserted.

The picture_coding_type is 3-bit information compliant with the MPEG2 standards, indicating the coding type of picture, for example, whether the picture is an I picture, B picture, or P picture. The temporal_reference is 10-bit information compliant with the MPEG2 standards, indicating the order of pictures of a GOP. This information is counted up for each picture.

The reuse_level is 7-bit information for defining the reuse of parameters. The error_flag is a flag for informing various errors.

The header_present_flag (A) is 2-bit flag information consisting of the sequence header present flag and GOP header preset flag.

The extension_start_code_flags is 16-bit flag information defined in SMPTE 327M, indicating whether various extended IDs are contained. If the extension_start_code_flags indicates 0, it means that extended IDs are not contained. If the extension_start_code_flags indicates 1, it means that extended IDs are contained. Extended IDs include sequence extension ID, sequence display extension ID, quant matrix extension ID, copyright extension ID, sequence scalable extension ID, picture display extension ID, picture coding extension ID, picture spatial scalable extension ID, and picture temporal scalable extension ID.

The other_start_codes (indicated by "other" in FIG. 11) is 5-bit flag information indicating in which layer the start code of the user data is contained, or whether the sequence error code or sequence end code is contained.

B in FIG. 11 is 1-bit information representing reduced_bandwidth_flag (B), and C is 2-bit information representing reduced_bandwidth_indicator (C). The num_of_picture_bytes is 22-bit information indicating the number of pictures generated, and is used for rate control.

The bit_rate_extension is 12-bit extended information area concerning the bit rate. The bit_rate_value is 18-bit information. In the format defined in the SMPTE, since information concerning the bit rate is subjected to statistical multiplexing, it is often represented by a specific value (for example, "ff") and it cannot be used for recoding. In contrast, the bit_rate_extension is an area where the actual bit rate in the previous coding is indicated so that it can be used for recoding.

The all intra-coded stream provided with history data, described with reference to FIGS. 10 and 11, by the coder 112 of the transcoder 101 shown in FIG. 5 is edited in units of frames in the frame editing device 3. The all intra-coded stream data with the history information is then supplied to the transcoder 152. In the transcoder 152, the decoder 121 decodes all the intra-stream data with the history information. The coder 161 recodes the information decoded by the decoder 121 into long GOPs by using, if necessary, parameters inserted into the picture layer and the macroblock layer, such as the picture types, motion vectors, and quantizing levels, used for previous coding contained in the decoded history information.

Figure 12:
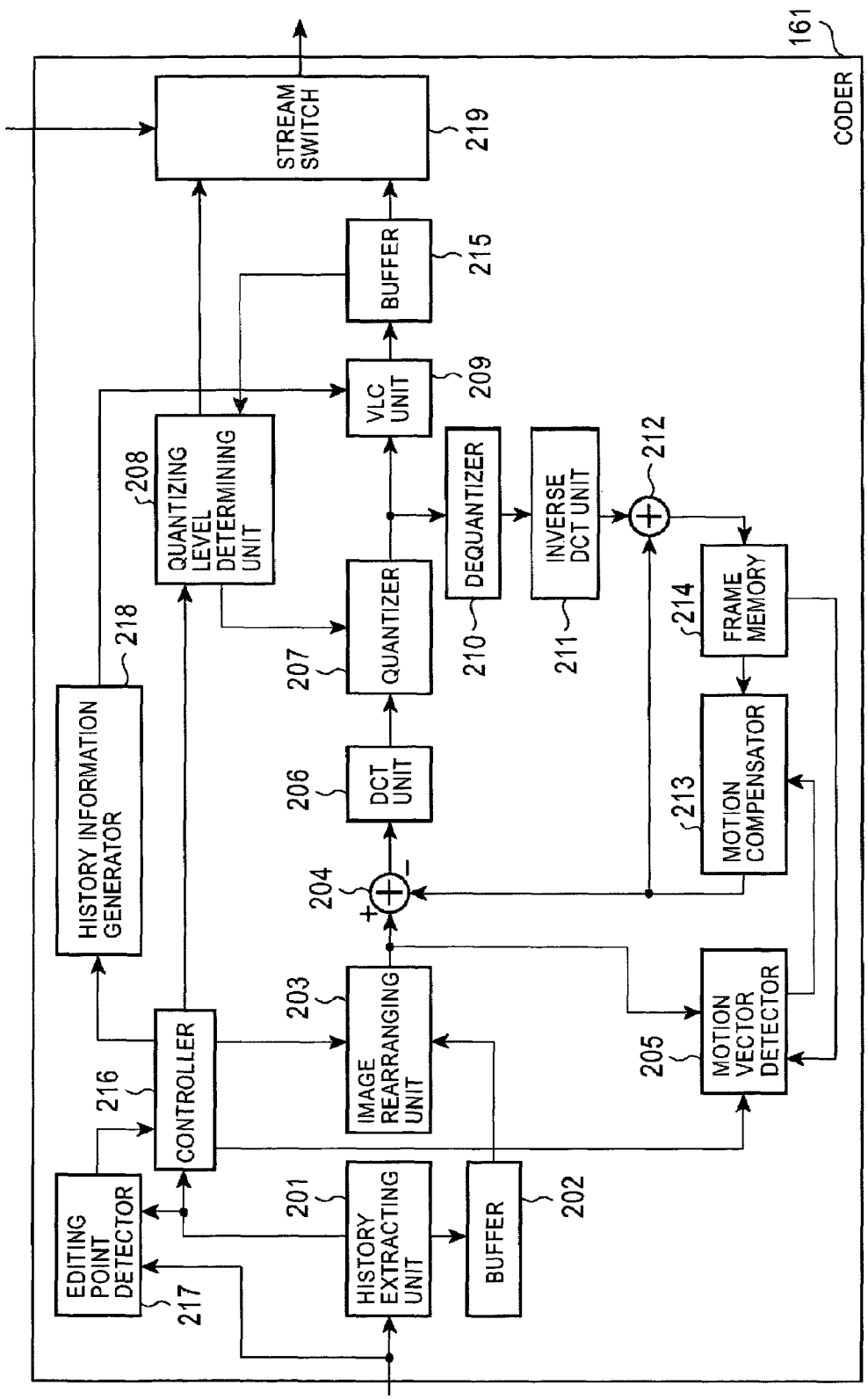
FIG. 12 is a block diagram illustrating the configuration of a coder in the system shown in FIG. 5.

FIG. 12 is a block diagram illustrating the configuration of the coder 161.

A history extracting unit 201 extracts the history information from all the intra-stream decoded by the decoder 121, and supplies the extracted history information to a controller 216 and also supplies the video stream to a buffer 202. The history information extracted by the history extracting unit 201 is designated in the format of the compressed_stream_format_of_MPEG_2_re_coding_set ( ) defined by SMPTE 329M, as discussed with reference to FIGS. 10 and 11, and includes information concerning previous coding, such as picture types, quantizing levels, motion vectors, or quantizing matrix. The buffer 202 buffers the supplied stream data for a predetermined period (at least a period longer than the P picture interval) and then supplies the video stream to an image rearranging unit 203.

Figure 13:
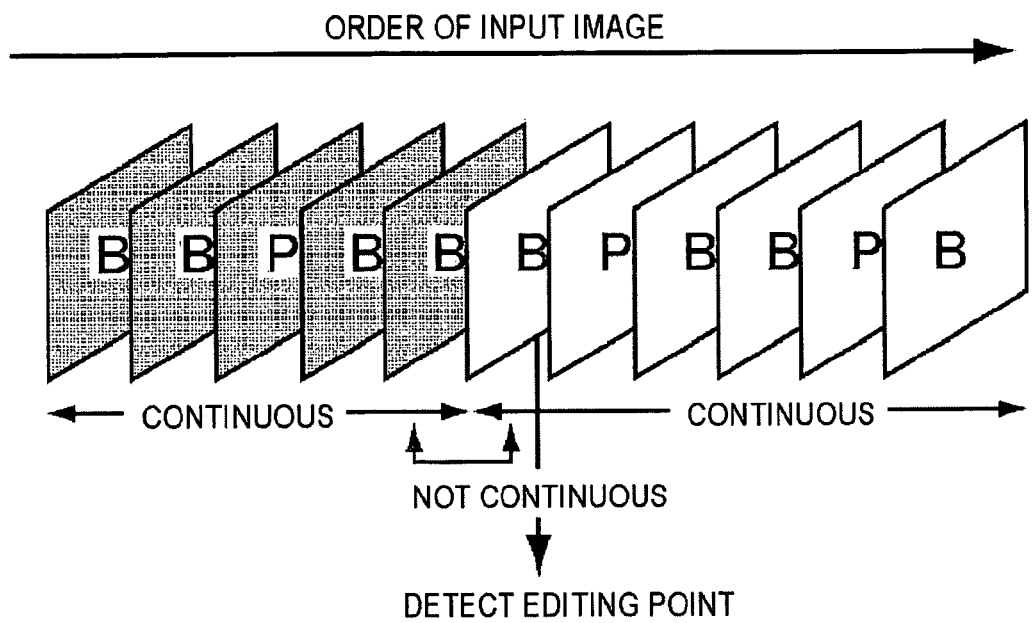
FIG. 13 illustrates the detection of editing points.

An editing point detector 217 detects editing points based on the stream data supplied to the coder 161 or the history information extracted by the history extracting unit 201. That is, the editing point detector 217 stores in a built-in memory the additional coding information of the previous frame (for example, Encoding_Start_Time_Code, Encoder_Serial_Number, Encoder_ID, and Continuity_Counter as Prev_Encoding_Start_Time_Code, Prev_Encoder_Serial_Number, Prev_Encoder_ID, and Prev_Continuity_Counter, respectively). The editing point detector 217 compares such information with the additional coding information of the current frame, as shown in FIG. 13, and detects for editing points according to whether there is an item of information which is not continuous from that of the current frame. Instead of the additional coding information, the editing point detector 217 may detect editing points by checking flag information which indicates editing points added to the stream data.

Figure 14:
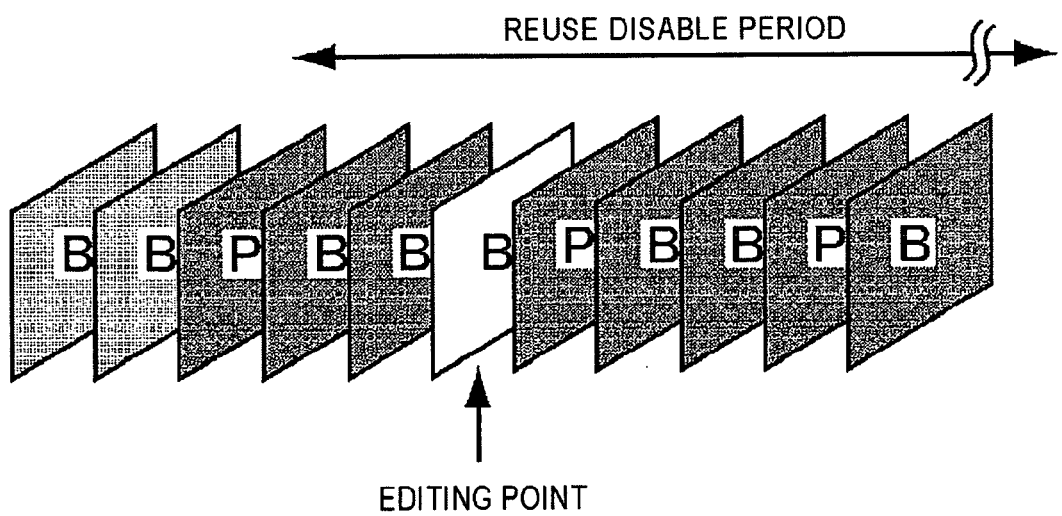
FIG. 14 illustrates the start point of a reuse disable period.

Upon receiving a signal indicating that an editing point has been detected from the editing point detector 217, the controller 216 sets a parameter reuse disable period starting from the P picture before the editing point to a predetermined picture after the editing point, as shown in FIG. 14, and controls the image rearranging unit 203, a motion vector detector 205, or a quantizing level determining unit 208 to perform coding without using the previous coding parameters contained in the history information and extracted from the history extracting unit 201. Details of the parameter reuse disable period are given below. The controller 216 also controls the image rearranging unit 203, the motion vector detector 205, or the quantizing level determining unit 208 to perform coding based on the previous coding parameters contained in the history information and extracted by the history extracting unit 201 in periods other than the parameter reuse disable period, which is discussed with reference to FIG. 14.

When a parameter reuse disable period is set, the controller 216 supplies setting information to a history information generator 218. The history information generator 218 generates history information containing the setting information concerning the parameter reuse disable period supplied from the controller 216, and adds the history information to stream data to be coded in a variable length code (VLC) unit 209.

Figure 15:
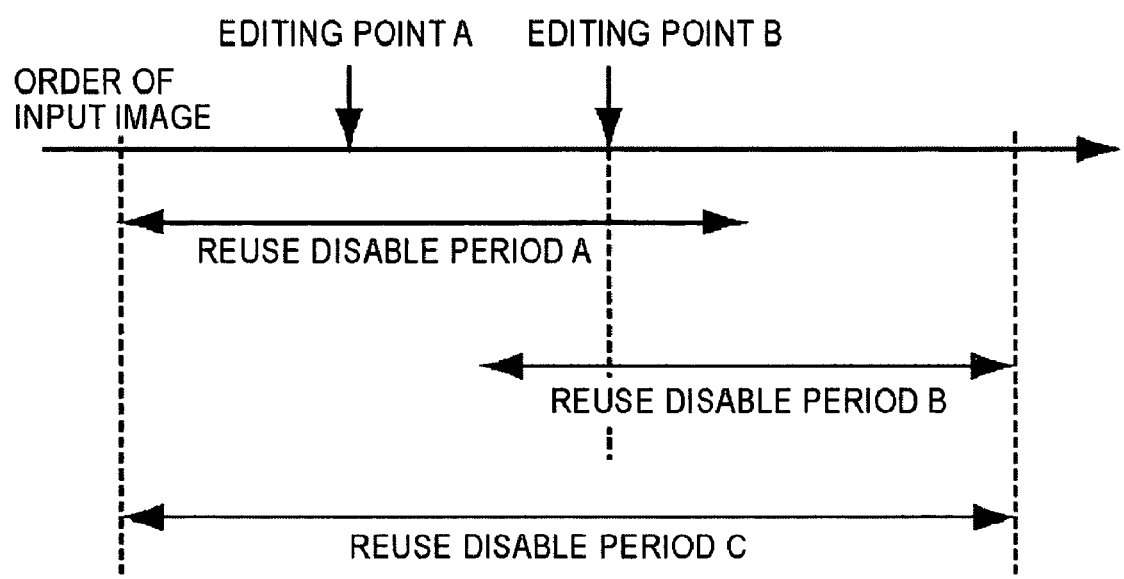
FIG. 15 illustrates reuse disable periods when an editing point is re-detected during a reuse disable period.

The controller 216 is provided with an editing point detection flag and a reuse stop flag in a built-in register. Accordingly, even if, during the parameter reuse disable period, the controller 216 receives a signal indicating that an editing point has been detected from the editing point detector 217, as shown in FIG. 15, it can set the end point of the parameter reuse disable period based on the position of the second editing point. When an editing point is detected, the editing point detection flag is turned ON, and then, the P picture, which indicates the start of the reuse disable period, immediately before the editing point, is detected, and the reuse stop flag is turned ON. Then, the counting of the number of pictures or number of P pictures for setting the reuse disable period is started, and also, the editing point detection flag is turned OFF. If an editing point is again detected while the reuse stop flag is ON, the editing point detection flag is turned ON, and the counting of the number of pictures or number of P pictures for setting the reuse disable period is reset while the reuse stop flag remains ON, and is then restarted.

Upon receiving the history information discussed with reference to FIGS. 10 and 11 from the history extracting unit 201, the controller 216 controls the entire or part of processing of the image rearranging unit 203, the motion vector detector 205, the quantizing level determining unit 208, and a stream switch 219 based on whether the history information matches predetermined conditions during the periods other than the parameter reuse disable period.

More specifically, the controller 216 determines whether the delay mode, picture configuration, and pull-down mode in the previous coding coincide with those of the current coding in the periods other than the parameter reuse disable period. If the parameters of the previous coding are found to be different from those of the current coding, the controller 216 determines that normal coding, which is discussed below, is performed without reusing the previous parameters. The delay mode is information indicated in the low_delay of the sequence_extension ( ) function of SMPTE 329M, and the picture configuration and the pull-down mode are information indicated in each of the picture_structure, top_field_first and repeat_firt_field of the picture_coding_extension ( ) function of SMPTE 329M.

If the delay mode, picture configuration, and pull-down mode of the previous coding coincide with those of the current coding, the controller 216 determines whether the image frame to be subsequently coded coincides with the image frame indicated in the history information. If the image frames are found to be different, only information concerning the picture type (picture_coding_type indicated in the user_data (2) of the extension_and_user_data (2) described with reference to FIG. 11) is reused. A determination as to whether the image frames coincide with each other can be made by comparing the horizontal_size_value and vertical_size_value of SMPTE 329M and the v_phase and h_phase of SMPTE 329M indicated in the sequence_header ( ) function of SMPTE 329M.

When it is determined that the picture types used in the previous coding are reused, the image rearranging unit 203 rearranges the images based on the picture types contained in the history information according to a control signal supplied from the controller 216.

If the image frames are found to be the same, the controller 216 determines whether the bit rate of the previous coding is smaller than that of the current coding and whether the chroma format of the previous coding is greater than or equal to that of the current coding. If either of the conditions is not satisfied, motion vector information (motion_vectors information indicated in the slice ( ) function of the picture_data ( ) function) is reused in addition to the picture type. The bit rate information is designated in the bit_rate_value of the user_data (2) in the extension_and_user_data (2) of SMPTE 329M. The chroma format information is indicated in the chroma_format of the sequence_header ( ) function of SMPTE 329M.

The motion vector detector 205 reuses motion vector information of the previous coding as motion vectors based on the control signal supplied from the controller 216.

If the bit rate of the previous coding is smaller than that of the current coding and if the chroma format of the previous coding is greater than or equal to that of the current coding, the controller 216 reuses the quantizing levels (q_scale) in addition to the picture types and motion vectors.

If necessary, the quantizing level determining unit 208 supplies the quantizing levels to be reused to a quantizer 207 based on the control signal supplied from the controller 216, and controls the quantizer 207 to perform quantization.

Under the control of the controller 216, the image rearranging unit 203 rearranges each frame image of the sequentially input image data, if necessary. The image rearranging unit 203 also generates macroblock data consisting of macroblocks, each consisting of a 16×16 luminance signal or chrominance signal corresponding to the luminance signal, and supplies the macroblock data to a computation unit 204 and the motion vector detector 205.

Upon receiving the input of the macroblock data, under the control of the controller 216, the motion vector detector 205 calculates motion vectors of each macroblock based on the macroblock data and reference image data stored in a frame memory 214, and supplies the calculated motion vectors to a motion compensator 213 as motion vector data, or reuses the motion vectors of the previous coding supplied from the controller 216 and supplies them to the motion compensator 213.

The computation unit 204 performs motion compensation on the macroblock data supplied from the image rearranging unit 203 based on the image types of each macroblock. More specifically, the computation unit 204 performs motion compensation on the I pictures in the intra mode, on the P pictures in the forward predictive mode, on the B pictures in the bidirectionally predictive mode.

In the intra mode, frame images to be coded are directly set as transmission data. In the forward predictive mode, the predictive residual between a frame image to be coded and a preceding reference image is set as transmission data. In the bidirectionally predictive mode, the predictive residual between a frame image to be coded and each of a preceding reference image and an upcoming reference image is set as transmission data.

When the macroblock data is an I picture, it is processed in the intra mode. More specifically, the computation unit 204 sends the input macroblock data to a discrete cosine transform (DCT) unit 206 as computation data. The DCT unit 206 performs DCT on the input computation data and sends the resulting data to the quantizer 207 as DCT coefficient data.

The quantizer 207 quantizes the input DCT coefficient data based on the quantizing level Q supplied from the quantizing level determining unit 208, and supplies the resulting data to the VLC unit 209 and a dequantizer 210 as the quantized DCT coefficient data. In this case, the quantizer 207 controls the amount of code to be generated by adjusting the quantizing step size in the quantization processing according to the quantizing level Q supplied from the quantizing level determining unit 208.

The quantized DCT coefficient data supplied to the dequantizer 210 is subjected to dequantization processing with the same step size as that used in the quantization processing in the quantizer 207, and is supplied to an inverse DCT unit 211 as DCT coefficient data. The inverse DCT unit 211 performs inverse DCT processing on the supplied DCT coefficient data, and supplies the generated computation data to a computation unit 212. The computation data is then stored in the frame memory 214 as reference image data.

When the macroblock data is a P picture, the computation unit 204 performs motion compensation on the macroblock data in the forward predictive mode. When the macroblock data is a B picture, the computation unit 204 performs motion compensation on the macroblock data in the bidirectionally predictive mode.

The motion compensator 213 performs motion compensation on the reference image data stored in the frame memory 214 according to the motion vectors so as to calculate forward predictive image data or bidirectionally predictive image data. The computation unit 204 performs subtraction processing on the macroblock data by using the forward predictive image data or the bidirectionally predictive image data supplied from the motion compensator 213.

More specifically, in the forward predictive mode, the motion compensator 213 shifts the read address in the frame memory 214 according to the motion vector data so as to read the reference image data, and supplies it to the computation unit 204 and the computation unit 212 as the forward predictive image data. The computation unit 204 subtracts the forward predictive image data from the supplied macroblock data so as to obtain difference data as the predictive residual. The computation unit 204 then supplies the difference data to the DCT unit 206.

The forward predictive image data is supplied to the computation unit 212 from the motion compensator 213. The computation unit 212 adds the forward predictive image data to the computation data supplied from the inverse DCT unit 211 so as to locally play back the reference image data, and outputs the reference image data to the frame memory 214 and stores it.

In the bidirectionally predictive mode, the motion compensator 213 shifts the read address in the frame memory 214 according to the motion vector data so as to read the reference image data, and supplies it to the computation unit 204 and the computation unit 212 as the bidirectionally predictive image data. The computation unit 204 subtracts the bidirectionally predictive image data from the supplied macroblock data so as to obtain difference data as the predictive residual data. The computation unit 204 then outputs the difference data to the DCT unit 206.

The bidirectionally predictive image data is supplied to the computation unit 212 from the motion compensator 213. The computation unit 212 adds the bidirectionally predictive image data to the computation data supplied from the inverse DCT unit 211 so as to locally play back the reference image data, and outputs it to the frame memory 214 and stores it.

As described above, the image data input into the coder 161 is subjected to motion compensation predictive processing, DCT processing, and quantization processing, and is supplied to the VLC unit 209 as the quantized DCT coefficient data. The VLC unit 209 performs variable length coding on the quantized DCT coefficient data based on a predetermined conversion table, and outputs the resulting variable length coded data to a buffer 215. The buffer 215 buffers the supplied variable length coded data and then outputs it to a stream switch 219.

The stream switch 219 outputs the variable length coded data supplied from the buffer 215 under the control of the controller 216.

The quantizing level determining unit 208 always monitors the storage state of the variable length coded data in the buffer 215. Under the control of the controller 216, the quantizing level determining unit 208 determines the quantizing step size based on buffer-occupation information indicating the storage state of the variable length coded data or the quantizing level Q contained in the previous coding parameters supplied from the controller 216.

As stated above, the quantizing level determining unit 208 receives the quantizing level Q contained in the previous coding parameters from the controller 216, and if the quantizing level of the previous coding can be reused, the quantizing level determining unit 208 can determine the quantizing step size based on the quantizing level Q.

If the quantizing step size is not determined based on the history information, the quantizing level determining unit 208 increases the quantizing step size to decrease the amount of code when the amount of code of the macroblocks is greater than the target amount of code. Conversely, if the amount of code is smaller than the target amount of code, the quantizing level determining unit 208 decreases the quantizing step size to increase the amount of code.

That is, by assuming the storage state of the variable length coded data in the VBV buffer provided for the decoder, the quantizing level determining unit 208 determines the variable length coded data occupied in the virtual buffer so as to calculate the quantizing level Q, and supplies it to the quantizer 207.

The amount d(j) of code of the j-th macroblock occupied in the virtual buffer is expressed by the following equation $$d(j)=d(0)+B(j-1)-\{T\times(j-1)/MBcnt\} \quad (1)$$

where d(0) indicates the initial buffer capacity, B(j) represents the number of bits generated in the j-th macroblock, MBcnt designates the number of macroblocks in the picture, and T indicates the target amount of code to be generated in each picture.

The amount d(j+1) of code of the (j+1)-th macroblock occupied in the virtual buffer is expressed by the following equation (2).

$$d(j+1)=d(0)+B(j)-(T\times j)/MBcnt \quad (2)$$

By subtracting equation (2) from equation (1), the amount d(j+1) of code of the (j+1)-th macroblock occupied in the virtual buffer is expressed by the following equation (3).

$$d(j+1)=d(j)+\{B(j)-B(j-1)\}-T/MBcnt \quad (3)$$

If the macroblocks in the picture contain intra-slice macroblocks and inter-slice macroblocks, the quantizing level determining unit 208 separately sets the target amounts of code Tpi and Tpp assigned to the intra-slice macroblocks and inter-slice macroblocks, respectively.

Accordingly, the quantizing level determining unit 208 substitutes the amount of code d(j+1) occupied in the buffer and the constant r indicated in equation (4) into equation (5) so as to calculate the quantizing index data Q(j+1) of the macroblock (j+1), and supplies it to the quantizer 207.

$$r=(2\times br)/pr \quad (4)$$

where br indicates the bit rate and pr designates the picture rate.

$$Q(j+1)=d(j+1)\times(31/r) \quad (5)$$

The quantizer 207 determines the quantizing step size in the subsequent macroblock based on the quantizing level Q and quantizes the DCT coefficient data based on the determined quantizing step size.

Accordingly, the quantizer 207 can quantize the DCT coefficient data with a quantizing step size, which has been calculated based on the actual amount of code of the previous picture and which is optimal for the target amount of code for the subsequent picture.

Thus, according to the data amount occupied in the buffer 215, the quantizer 207 can generate quantized DCT coefficient data which does not cause overflow or underflow in the buffer 215 or does not cause overflow or underflow in the VBV buffer provided for the decoder.

Although a description has been given of the case in which the coding processing is performed in units of pictures, it may be performed in units of slices or macroblocks.

Figure 4:
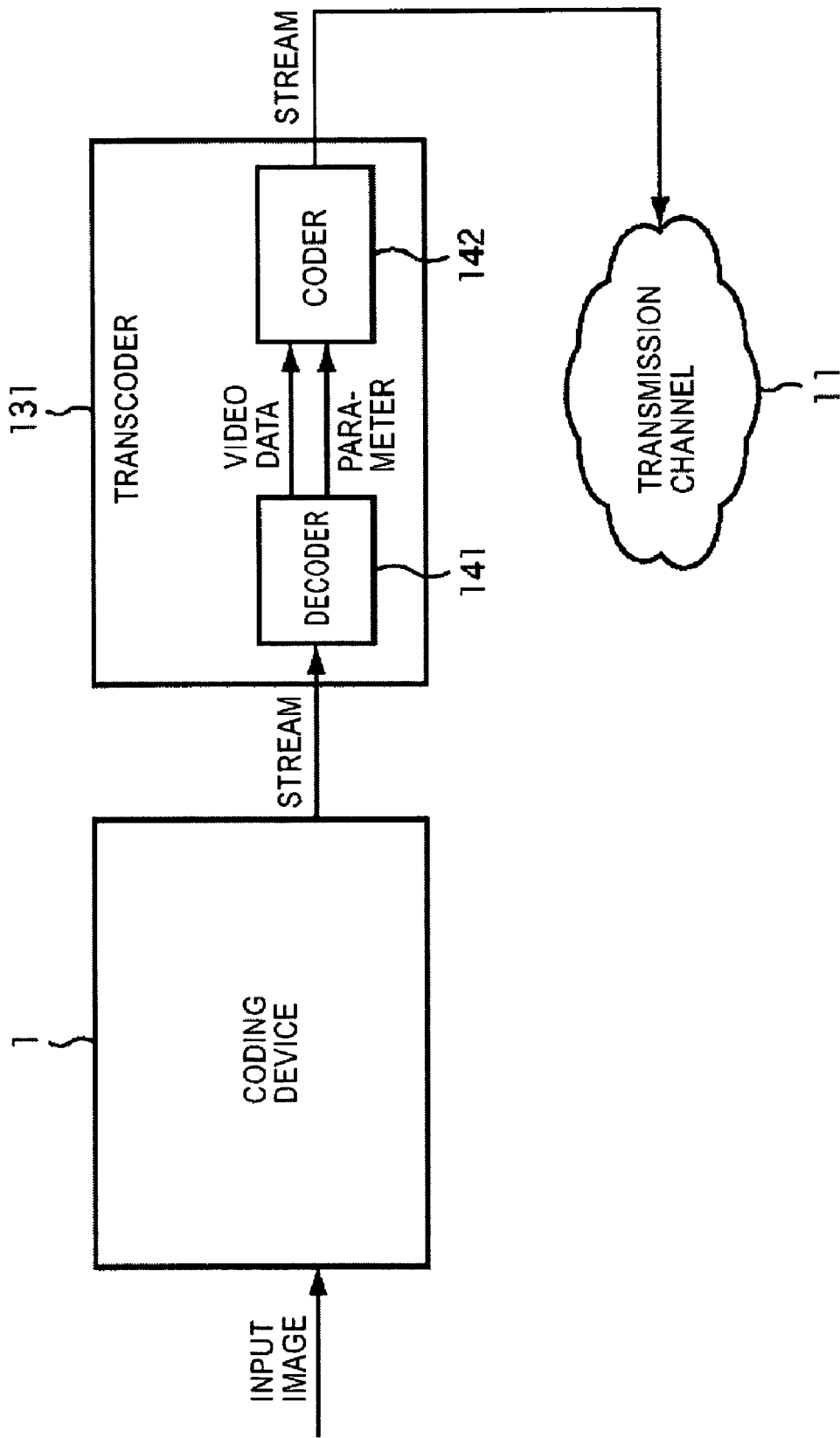
FIG. 4 is a block diagram illustrating the known system shown in FIG. 2 in which coding history information is used.
Figure 16:
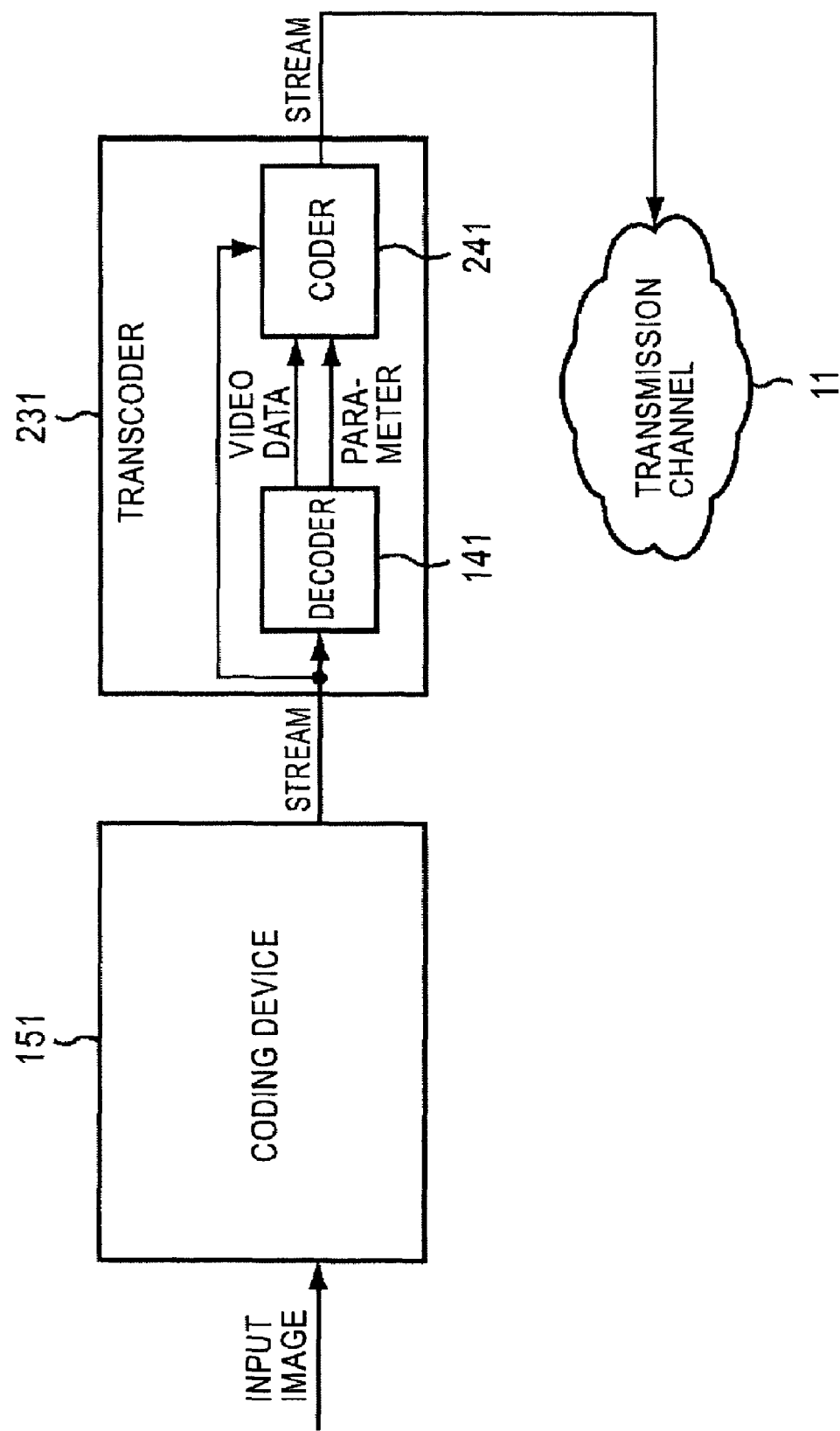
FIG. 16 is a block diagram illustrating the configuration of a system in which recoding can be performed by changing the bit rate of MPEG long GOPs according to the present invention.

The present invention can also be applied to the system shown in FIG. 4. In this system, an input image is coded into MPEG long GOPs with a high bit rate and the MPEG long GOPs are decoded, and the decoded MPEG long GOPs are then recoded into low-bit-rate long GOPs. The deterioration of the image quality caused by recoding can be suppressed. FIG. 16 is a block diagram illustrating the configuration of a system incorporating the present invention in which an input image is coded into MPEG long GOPs with a high bit rate and the MPEG long GOPs are decoded, and the decoded MPEG long GOPs are then recoded into low-bit-rate MPEG long GOPs. When recoding the MPEG long GOPs, the deterioration of the image quality can be suppressed while preventing the overflow or underflow in the VBV buffer. Elements corresponding to those in FIGS. 4 and 5 are designated with like reference numerals, and an explanation thereof is thus omitted.

In the system shown in FIG. 16, instead of the coding device 1, the coding device 151 shown in FIGS. 5 and 6 are provided, and instead of the transcoder 131, a transcoder 231 is provided. In the transcoder 231, instead of the coder 142, a coder 241 is disposed. In the coder 241, according to conditions of a supplied stream, history information (parameter information) that can be reused in the periods other than a predetermined reuse disable period around an editing point can be selected and are used for coding. The configuration of the transcoder 231 is similar to the transcoder 131, except that the coder 241 receives not only is a signal decoded by the decoder 141, but also stream data input into the decoder 141.

Upon receiving an MPEG long GOP stream (ASI stream) coded by the coding device 151, the transcoder 231 obtains required coding parameters when decoding the high-bit-rate MPEG long GOPs in the decoder 141, and supplies the decoded video data and the obtained coding parameters to the coder 241. The coder 241 codes the video data into low-bit-rate MPEG long GOPs by using the coding parameters, and outputs the low-bit-rate MPEG long GOP stream (ASI stream).

Figure 17:
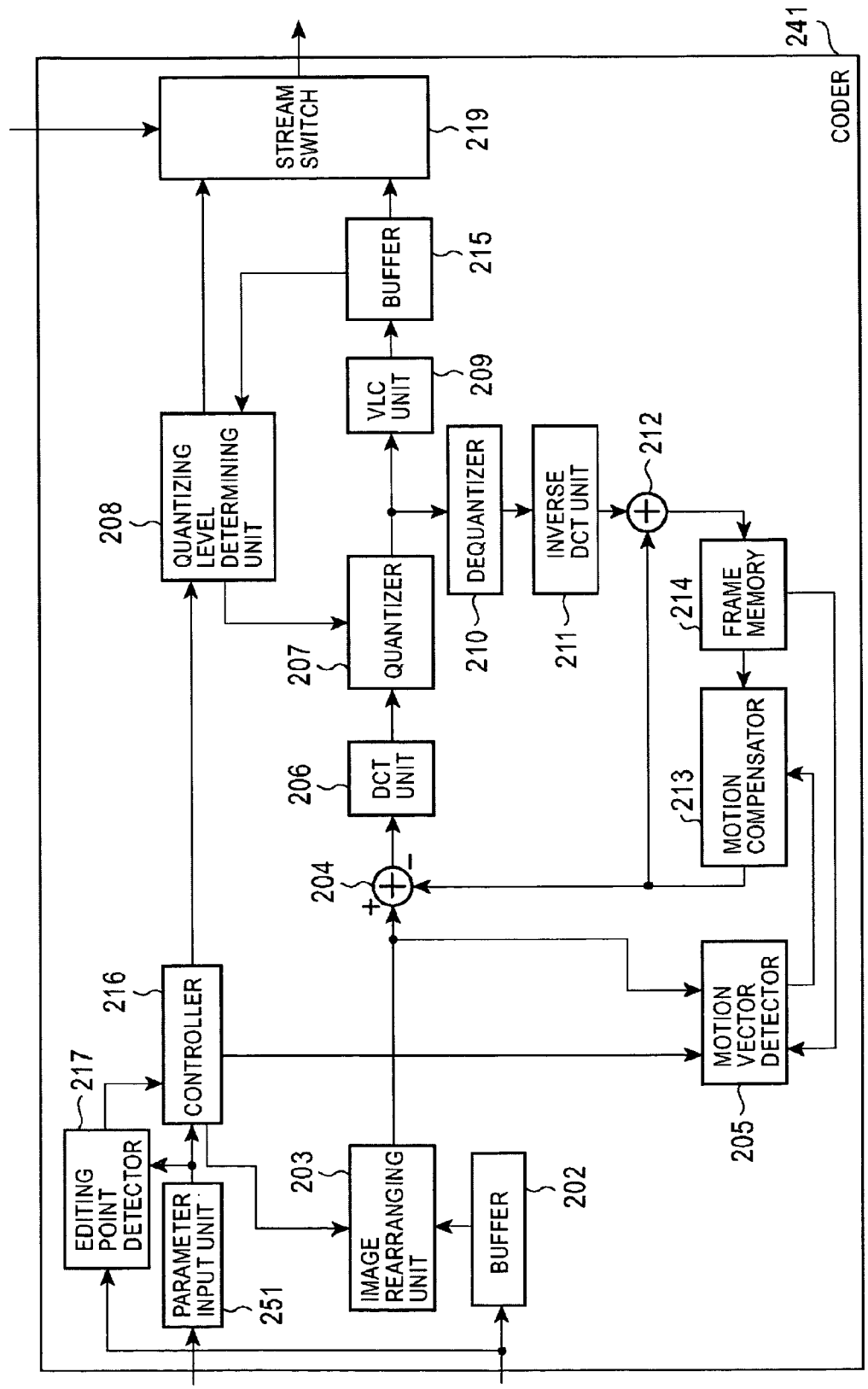
FIG. 17 is a block diagram illustrating the configuration of a coder in the system shown in FIG. 16.

FIG. 17 is a block diagram illustrating the configuration of the coder 241. In FIG. 17, elements corresponding to those of the coder 161 shown in FIG. 12 are indicated by like reference numerals, and an explanation thereof is thus omitted.

The configuration of the coder 241 is similar to that of the coder 161 shown in FIG. 12, except that the history extracting unit 201 and the history information generator 218 are omitted, and that a parameter input unit 251 for receiving parameters supplied from the decoder 141 and outputting them to the controller 216 is provided.

The editing point detector 217 detects editing points based on the stream data supplied to the coder 161 or the parameter information obtained by the parameter input unit 251. That is, the editing point detector 217 stores in a built-in memory the additional coding information of the previous frame (for example, Encoding_Start_Time_Code, Encoder_Serial_Number, Encoder_ID, and Continuity_Counter as Prev_Encoding_Start_Time_Code, Prev_Encoder_Serial_Number, Prev_Encoder_ID, and Prev_Continuity_Counter, respectively). The editing point detector 217 compares such information with the additional coding information of the current frame, as shown in FIG. 13, and detects for editing points according to whether there is a factor which indicates discontinuity between the previous frame and the current frame. Instead of the additional coding information, the editing point detector 217 may detect editing points by checking flag information which indicates editing points added to the stream data.

Upon receiving a signal indicating that an editing point has been detected from the editing point detector 217, the controller 216 sets a parameter reuse disable period, as shown in FIG. 14, and controls the image rearranging unit 203, the motion vector detector 205, or the quantizing level determining unit 208 to perform coding without using the previous coding parameters contained in the coding parameter information extracted by the parameter input unit 251. The controller 216 receives from the parameter input unit 251 parameter information containing information similar to the history information discussed with reference to FIGS. 10 and 11 during the periods other than the parameter reuse disable period, and controls the entire or part of the processing of the image rearranging unit 203, the motion vector detector 205, the quantizing level determining unit 208, and the stream switch 219 according to whether the factors indicated in the parameter information coincide with predetermined conditions.

More specifically, the controller 216 determines whether the delay mode, picture configuration, and pull-down mode of the previous coding coincide with those of the current coding in the periods other than the parameter reuse disable period. If the parameters of the previous coding are found to be different from those of the current coding, the controller 216 determines that normal coding, which is discussed below, is performed without reusing the previous parameters. The delay mode is information indicated in the parameter information in a manner similar to the low_delay of the sequence_extension ( ) function of SMPTE 329M, and the picture configuration and the pull-down mode are information indicated in the parameter information in a manner similar to each of the picture_structure, top_field_first, and repeat_firt_field of the picture_coding_extension ( ) function of SMPTE 329M.

If the delay mode, picture configuration, and pull-down mode of the previous coding coincide with those of the current coding, the controller 216 determines whether the image frame to be subsequently coded coincides with the image frame indicated in the parameter information. If the image frames are found to be different, only information concerning the picture types (information indicated in the parameter information in a manner similar to the picture_coding_type indicated in the user_data (2) of the extension_and_user_data (2) described with reference to FIG. 11) is reused. A determination as to whether the image frames coincide with each other can be made by comparing items indicated in the parameter information in a manner similar to the horizontal_size_value and vertical_size_value of SMPTE 329M and the v_phase and h_phase of SMPTE 329M indicated in the sequence_header ( ) function of SMPTE 329M.

If it is determined that the picture types of the previous coding are reused, the image rearranging unit 203 rearranges images based on the picture types contained in the parameter information according to the control signal supplied from the controller 216.

If the image frames are found to be the same, the controller 216 determines whether the bit rate of the previous coding is smaller than that of the current coding and whether the chroma format of the previous coding is greater than or equal to that of the current coding. If either of the conditions is not satisfied, motion vector information (items indicated in the parameter information in a manner similar to the motion_vectors information indicated in the slice ( ) function of the picture_data ( ) function) is reused in addition to the picture type. The bit rate information is designated in the parameter information in a manner similar to the bit_rate_value of the user_data (2) in the extension_and_user_data (2) of SMPTE 329M. The chroma format information is indicated in the parameter information in a manner similar to the chroma_format of the sequence_header ( ) function of SMPTE 329M.

The motion vector detector 205 receives motion vector information of the previous coding from the controller 216 and reuses it as motion vectors.

If the bit rate of the previous coding is smaller than that of the current coding and if the chroma format of the previous coding is greater than or equal to that of the current coding, the controller 216 determines whether the chroma format indicated in the parameter information coincides with that of the current coding. If the chroma format is found to be different from that of the current coding, the controller 216 reuses the quantizing levels (q_scale) in addition to the picture types and motion vectors.

If necessary, the quantizing level determining unit 208 supplies the quantizing levels used in the previous coding to the quantizer 207 based on the control signal supplied from the controller 216, and controls the quantizer 207 to perform quantization.

If the chroma format of the previous coding is found to be the same as that of the current coding, the controller 216 controls the stream switch 219 to output the stream data input into the decoder 141.

In the coder 241 shown in FIG. 17, normal coding processing, other than the processing of the controller 216 to determine whether information concerning the previous coding contained in the parameter information is to be reused, is similar to that of the coder 161 shown in FIG. 12, and a detailed explanation is thus omitted.

In the coder 161 shown in FIG. 12 or the coder 241 shown in FIG. 17, if history information or parameter information is not reused, normal coding is performed. If picture types are reused, the picture_coding_type of SMPTE 329M contained in the history information or a similar item of information contained in the parameter information is reused. If motion vectors are reused, information obtained by subtracting the q_scale_code from the red_bw_indicator=0 contained in the history information or a similar item of information contained in the parameter information is reused. If quantizing levels are reused, the red_bw_indicator=0 contained in the history information or a similar item of information contained in the parameter information is reused. If a stream input into the coder 161 or 241 is output, the stream switch 219 is controlled to output the stream data input into the decoder 141.

Figure 18:
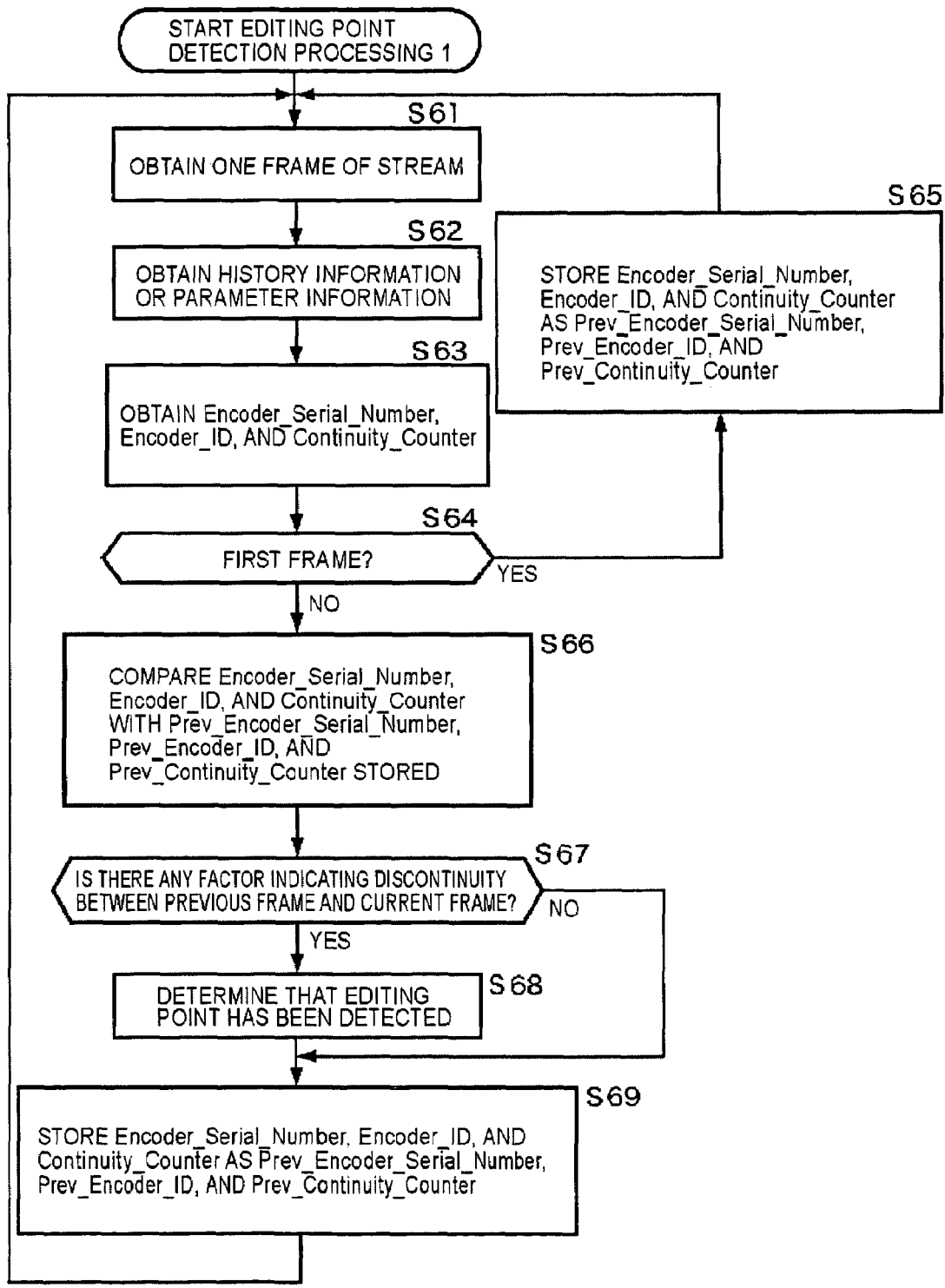
FIG. 18 is a flowchart illustrating editing point detection processing 1.

With reference to the flowchart of FIG. 18, a description is given below of processing 1 for detecting editing points by the editing point detector 217 of the coder 161 shown in FIG. 12 or the coder 241 shown in FIG. 17 by using additional coding information added to coded stream data.

In this processing, editing points of the coded stream data containing additional coding information generated in the coded data generating processing 1 discussed with reference to FIG. 7 are detected.

In step S61, the coder 161 shown in FIG. 12 or the coder 241 shown in FIG. 17 obtains one frame of the coded stream.

In step S62, the editing point detector 217 of the coder 161 shown in FIG. 12 or the coder 241 shown in FIG. 17 obtains history information extracted by the history extracting portion 201 or parameter information obtained by the parameter input unit 251, respectively.

In step S63, the editing point detector 217 obtains Encoder_Serial_Number, Encoder_ID, and Continuity_Counter from the history information or the parameter information.

In step S64, the editing point detector 217 determines whether the obtained frame is the first frame of the coded stream.

If the outcome of step S64 is YES, the process proceeds to step S65. In step S65, the editing point detector 217 stores in a built-in memory the obtained Encoder_Serial_Number, Encoder_ID, and Continuity_Counter as Prev_Encoder_Serial_Number, Prev_Encoder_ID, and Prev_Continuity_Counter, respectively. The process then returns to step S61 and the subsequent steps are repeated.

If it is determined in step S64 that the obtained frame is not the first frame of the coded stream, the process proceeds to step S66. In step S66, the editing point detector 217 compares the Encoder_Serial_Number, Encoder_ID, and Continuity_Counter obtained in step S63 with the Prev_Encoder_Serial_Number, Prev_Encoder_ID, and Prev_Continuity_ Counter, respectively, stored in the built-in memory.

In step S67, the editing point detector 217 determines from a comparison result in step S66 whether there is a factor indicating the discontinuity between the previous frame and the current frame. More specifically, the editing point detector 217 determines whether the Encoder_Serial_Number is different from Prev_Encoder_Serial_Number, whether Encoder_ID is different from Prev_Encoder_ID, or whether Continuity_Counter is not continuous from Prev_Continuity_ Counter.

If the result of step S67 is YES, the editing point 217 determines in step S68 that an editing point has been detected, and reports to the detection of an editing point to the controller 216.

If it is determined in step S67 that there is no factor indicating that there is no continuity between the previous frame and the current frame, or after step S68, the process proceeds to step S69. In step S69, the editing point detector 217 stores in the built-in memory the obtained Encoder_Serial_Number, Encoder_ID, and Continuity_Counter as Prev_Encoder_Serial_Number, Prev_Encoder_ID, and Prev_Continuity_Counter, respectively. The process then returns to step S61, and the subsequent steps are repeated.

According to this processing, it can be determined whether there is an editing point based on whether the frame count numbers are continuous and whether the coding device that has coded the previous frame is the same as the coding device that has coded the current frame.

Figure 19:
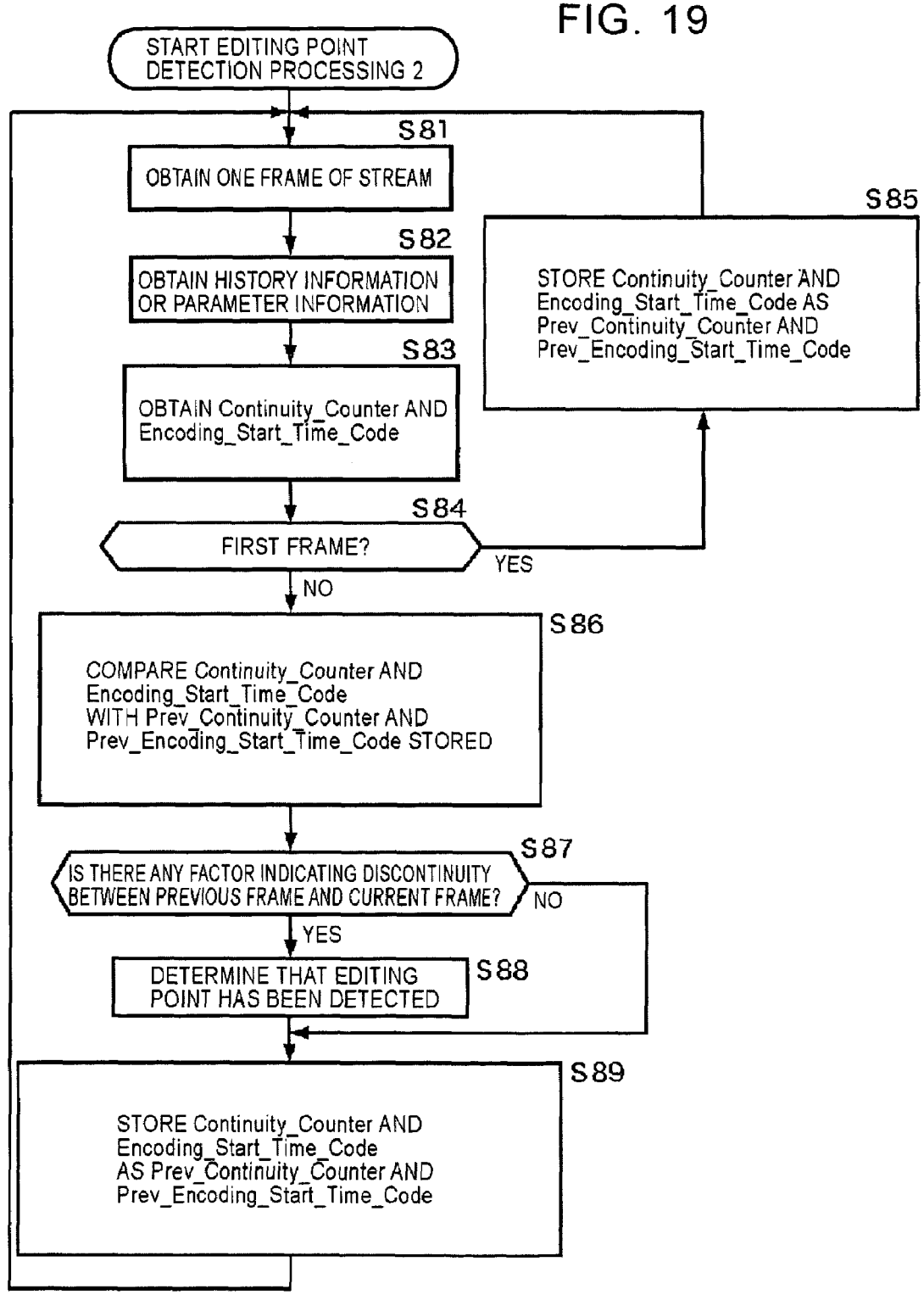
FIG. 19 is a flowchart illustrating editing point detection processing 2.

With reference to FIG. 19, a description is now given of processing 2 for detecting editing points by the editing point detector 217 of the coder 161 shown in FIG. 12 or the coder 241 shown in FIG. 17 by using additional coding information added to coded stream data.

In this processing, editing points of the coded stream data containing additional coding information generated by the coded data generating processing 2 discussed with reference to FIG. 8 are detected.

In step S81, the coder 161 shown in FIG. 12 or the coder 241 shown in FIG. 17 obtains one frame of the coded stream.

In step S82, the editing point detector 217 of the coder 161 shown in FIG. 12 or the coder 241 shown in FIG. 17 obtains history information extracted by the history extracting portion 201 or parameter information obtained by the parameter input unit 251, respectively.

In step S83, the editing point detector 217 obtains the Continuity_Counter or Encoding_Start_Time_Code from the history information or the parameter information.

In step S84, the editing point detector 217 determines whether the obtained frame is the first frame of the coded stream.

If the outcome of step S84 is YES, the process proceeds to step S85. In step S85, the editing point detector 217 stores in a built-in memory the obtained Continuity_Counter and Encoding_Start_Time_Code as Prev_Continuity_Counter and Prev_Encoding_Start_Time_Code, respectively. The process then returns to step S81 and the subsequent steps are repeated.

If it is determined in step S84 that the obtained frame is not the first frame of the coded stream, the process proceeds to step S86. In step S86, the editing point detector 217 compares the Continuity_Counter and Encoding_Start_Time_Code obtained in step S83 with Prev_Continuity_Counter and Prev_Encoding_Start_Time_Code, respectively, stored in the built-in memory.

In step S87, the editing point detector 217 determines from a comparison result in step S86 whether there is a factor indicating the discontinuity between the previous frame and the current frame. More specifically, the editing point detector 217 determines whether the Continuity_Counter is not continuous from Prev_Continuity_Counter or whether Encoding_Start_Time_Code is different from Prev_Encoding_Start_Time_Code.

If the result of step S87 is YES, the editing point 217 determines in step S88 that an editing point has been detected, and reports to the detection of an editing point to the controller 216.

If it is determined in step S87 that there is no factor indicating that there is no continuity between the previous frame and the current frame, or after step S88, the process proceeds to step S89. In step S89, the editing point detector 217 stores in the built-in memory the obtained Continuity_Counter and Encoding_Start_Time_Code as Prev_Continuity_Counter and Prev_Encoding_Start_Time_Code, respectively. The process then returns to step S81, and the subsequent steps are repeated.

According to this processing, it can be determined whether there is an editing point based on whether the frame count numbers are continuous and whether the coding start time of the previous frame is different from that of the current frame.

Figure 20:
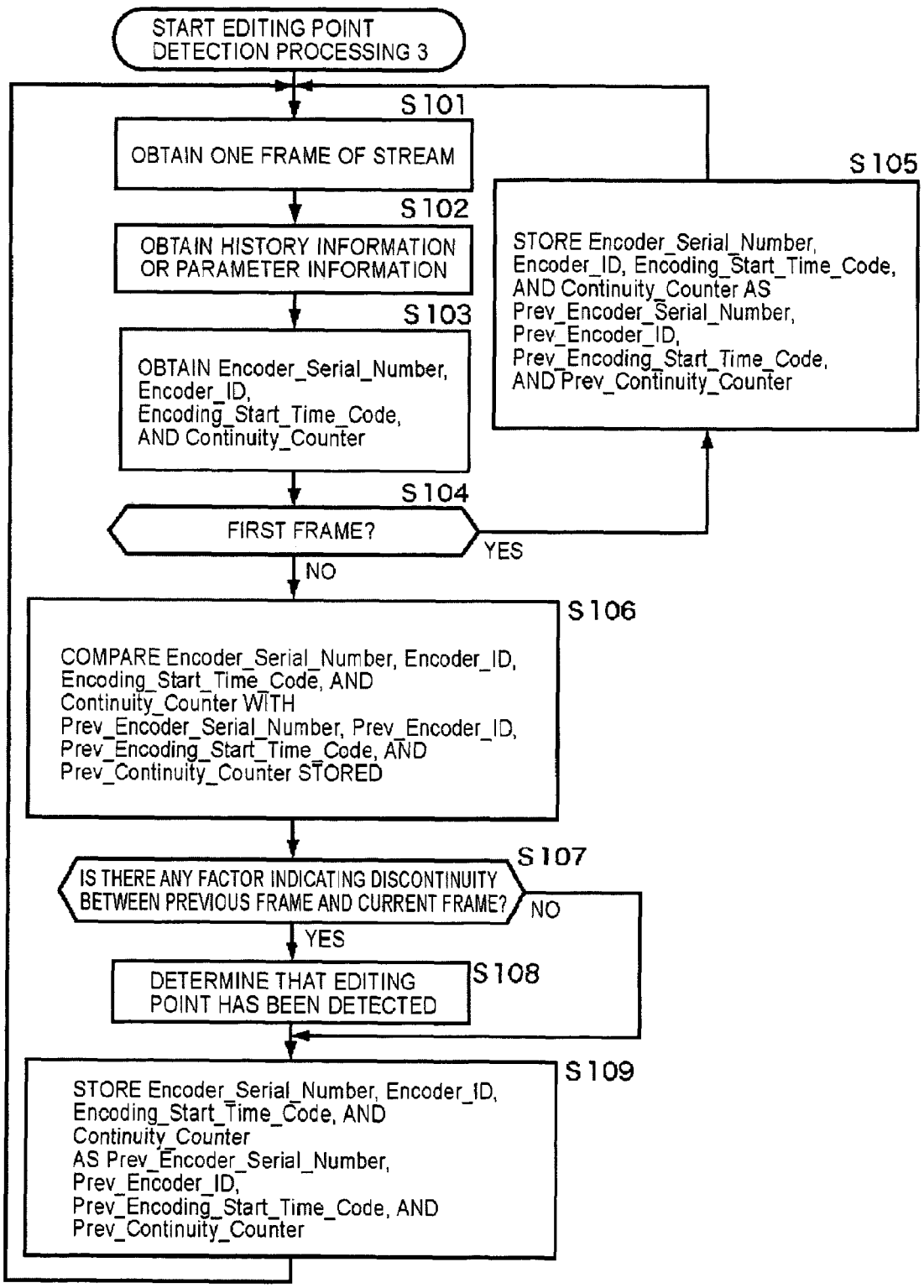
FIG. 20 is a flowchart illustrating editing point detection processing 3.

With reference to the flowchart of FIG. 20, a description is now given of processing 3 for detecting editing points by the editing point detector 217 of the coder 161 shown in FIG. 12 or the coder 241 shown in FIG. 17 by using additional coding information added to coded stream data.

In this processing, editing points of the coded stream data containing additional coding information generated in the coded data generating processing 3 discussed with reference to FIG. 9 are detected.

In step S101, the coder 161 shown in FIG. 12 or the coder 241 shown in FIG. 17 obtains one frame of the coded stream.

In step S102, the editing point detector 217 of the coder 161 shown in FIG. 12 or the coder 241 shown in FIG. 17 obtains history information extracted by the history extracting portion 201 or parameter information obtained by the parameter input unit 251, respectively.

In step S103, the editing point detector 217 obtains the Encoder_Serial_Number, Encoder_ID, Encoder_Start_Time_Code, and Continuity_Counter from the history information or the parameter information.

In step S104, the editing point detector 217 determines whether the obtained frame is the first frame of the coded stream.

If the outcome of step S104 is YES, the process proceeds to step S105. In step S105, the editing point detector 217 stores in a built-in memory the obtained Encoder_Serial_Number, Encoder_ID, Encoder_Start_Time_Code, and Continuity_Counter as Prev_Encoder_Serial_Number, Prev_Encoder_ID, Prev_Encoder_Start Time_Code, and Prev_Continuity_Counter, respectively. The process then returns to step S101 and the subsequent steps are repeated.

If it is determined in step S104 that the obtained frame is not the first frame of the coded stream, the process proceeds to step S106. In step S106, the editing point detector 217 compares the Encoder_Serial_Number, Encoder_ID, Encoder_Start_Time_Code, and Continuity_Counter obtained in step S103 with the Prev_Encoder_Serial_Number, Prev_Encoder_ID, Prev_Encoder_Start_Time_Code, and Prev_Continuity_Counter, respectively, stored in the built-in memory.

In step S107, the editing point detector 217 determines from a comparison result in step S106 whether there is a factor indicating the discontinuity between the previous frame and the current frame. More specifically, the editing point detector 217 determines whether Encoder_Serial_Number is different from Prev_Encoder_Serial_Number, whether Encoder_ID is different from Prev_Encoder_ID, whether Encoder_Start_Time_Code is different from Prev_Encoder_Start_Time_Code, or whether Continuity_Counter is not continuous from Prev_Continuity_Counter.

If the result of step S107 is YES, the editing point 217 determines in step S108 that an editing point has been detected, and reports to the detection of an editing point to the controller 216.

If it is determined in step S107 that there is no factor indicating that there is no continuity between the previous frame and the current frame, or after step S108, the process proceeds to step S109. In step S109, the editing point detector 217 stores in the built-in memory the obtained Encoder_Serial_Number, Encoder_ID, Encoder_Start_Time_Code, and Continuity_Counter as Prev_Encoder_Serial_Number, Prev_Encoder_ID, Prev_Encoder_Start_Time_Code, and Prev_Continuity_Counter, respectively. The process then returns to step S101, and the subsequent steps are repeated.

According to this processing, it can be determined with high precision whether there is an editing point based on whether the frame count numbers are continuous, whether the coding device that has coded the previous frame is the same as the coding device that has coded the current frame, and whether the coding start time of the previous frame is the same as that of the current frame.

Editing points detected by the processing described with reference to FIG. 18, 19, or 20 can be used, not only for setting a reuse disable period during coding processing, but also for detecting the heads of frames or scene changes during the playback operation.

With reference to the flowchart of FIG. 21, a description is given below of coding processing 1 for performing coding without using history information or parameter information during a predetermined period before and after an editing point (zone before and after an editing point for a predetermined number of frames), namely, during a reuse disable period, based on an editing point detected by the coder 161 shown in FIG. 12 or the coder 241 shown in FIG. 17.

In step S131, the coder 161 shown in FIG. 12 or the coder 241 shown in FIG. 17 obtains frame image data and accompanying information, that is, history information or parameter information.

In step S132, the controller 216 of the coder 161 or the coder 241 determines whether an editing point has been detected based on a signal supplied from the editing point detector 217.

If the outcome of step S132 is YES, the controller 216 turns ON the editing point detection flag in step S133.

If it is determined in step S132 that an editing point has not been detected or after step S133, the controller 216 determines in step S134 whether the editing point detection flag is OFF by checking the built-in register.

If the result of step S134 is NO, the process proceeds to step S135. In step S135, the controller 216 detects the P picture immediately before the editing point from the stream data stored in the buffer 202, and sets a period from this P picture to a picture before the picture, which is to be determined to be started as a reuse able period in the processing described below, as a reuse disable period.

For example, if an image having coding information indicating a B picture is an editing point, normally, the B picture refers to the P pictures before and after the B picture. Accordingly, if history information or parameter information is reused to code a range from the P picture immediately before the editing point to the picture at the editing point, the overflow or underflow of the VBV buffer may occur. Similarly, since some pictures even after the editing point may refer to the adjacent pictures, it is necessary that, during a period which may be influenced by the discontinuity at the editing point, the history information or the parameter information should not be used.

In step S136, the controller 216 turns ON the reuse stop flag and the turns OFF the editing point detection flag in the built-in register.

In step S137, the controller 216 resets the variable Pic_cont for counting the number of pictures and the variable P_Pic_cont for counting the number of P pictures to be 0 in the built-in register.

In step S138, the buffer 202 buffers the supplied pictures for a predetermined period (a period at least longer than the P picture interval), and then outputs them.

In step S139, the controller 216 controls the elements of the coder 161 shown in FIG. 12 or the coder 241 shown in FIG. 17 to perform coding without reusing the history information or the parameter information. The process then returns to step S132 and the subsequent steps are repeated.

If it is determined in step S134 that the editing point detection flag is OFF, the controller 216 determines in step S140 whether the reuse stop flag is OFF, i.e., whether the frame is in a period other than the reuse disable period by checking the built-in register. If it is determined in step S140 that the reuse stop flag is OFF, namely, the frame is during a period other than the reuse disable period, the process proceeds to step S144.

Figure 22:
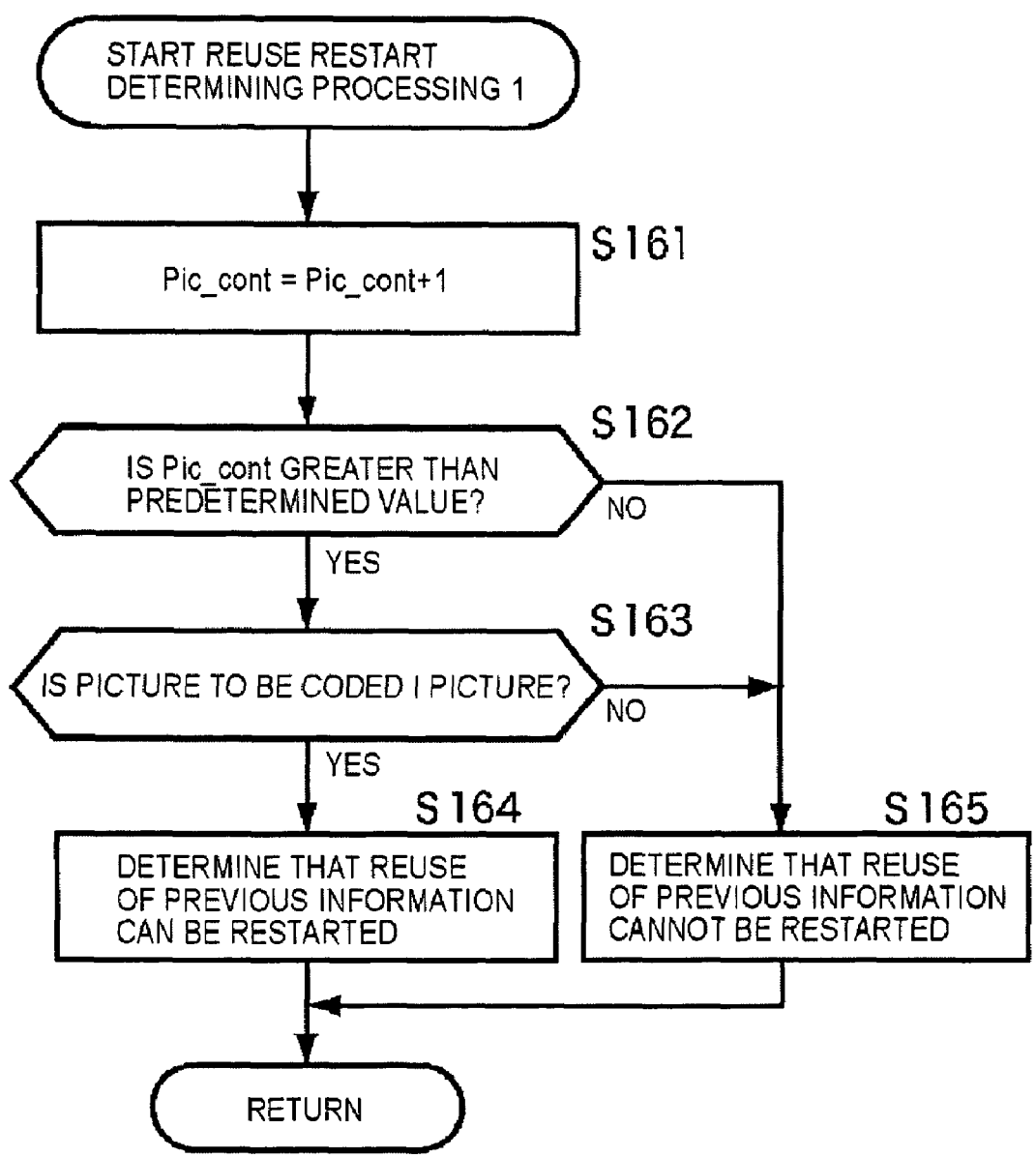
FIG. 22 is a flowchart illustrating reuse restart determining processing 1.
Figure 24:
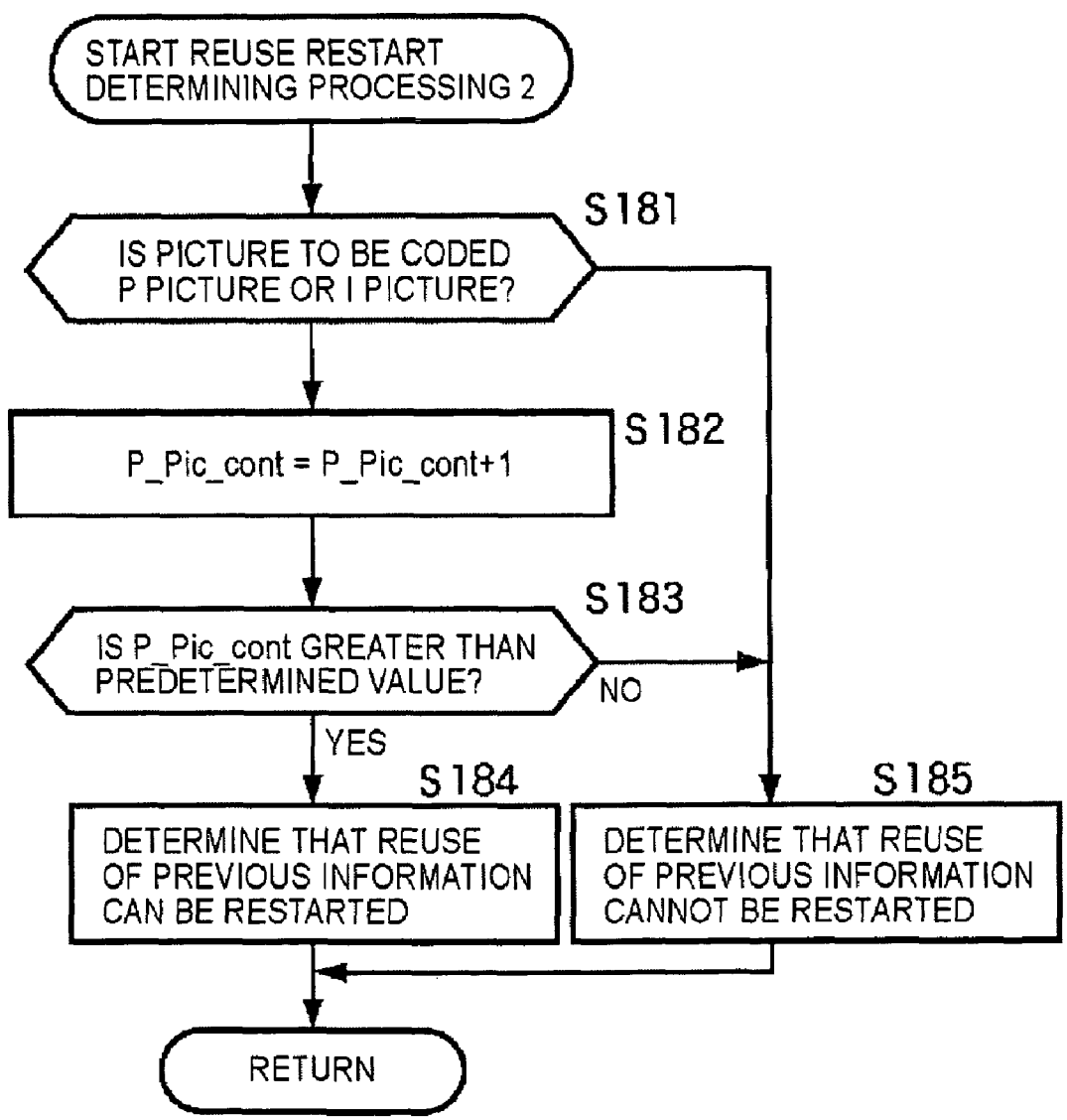
FIG. 24 is a flowchart illustrating reuse restart determining processing 2.
Figure 26:
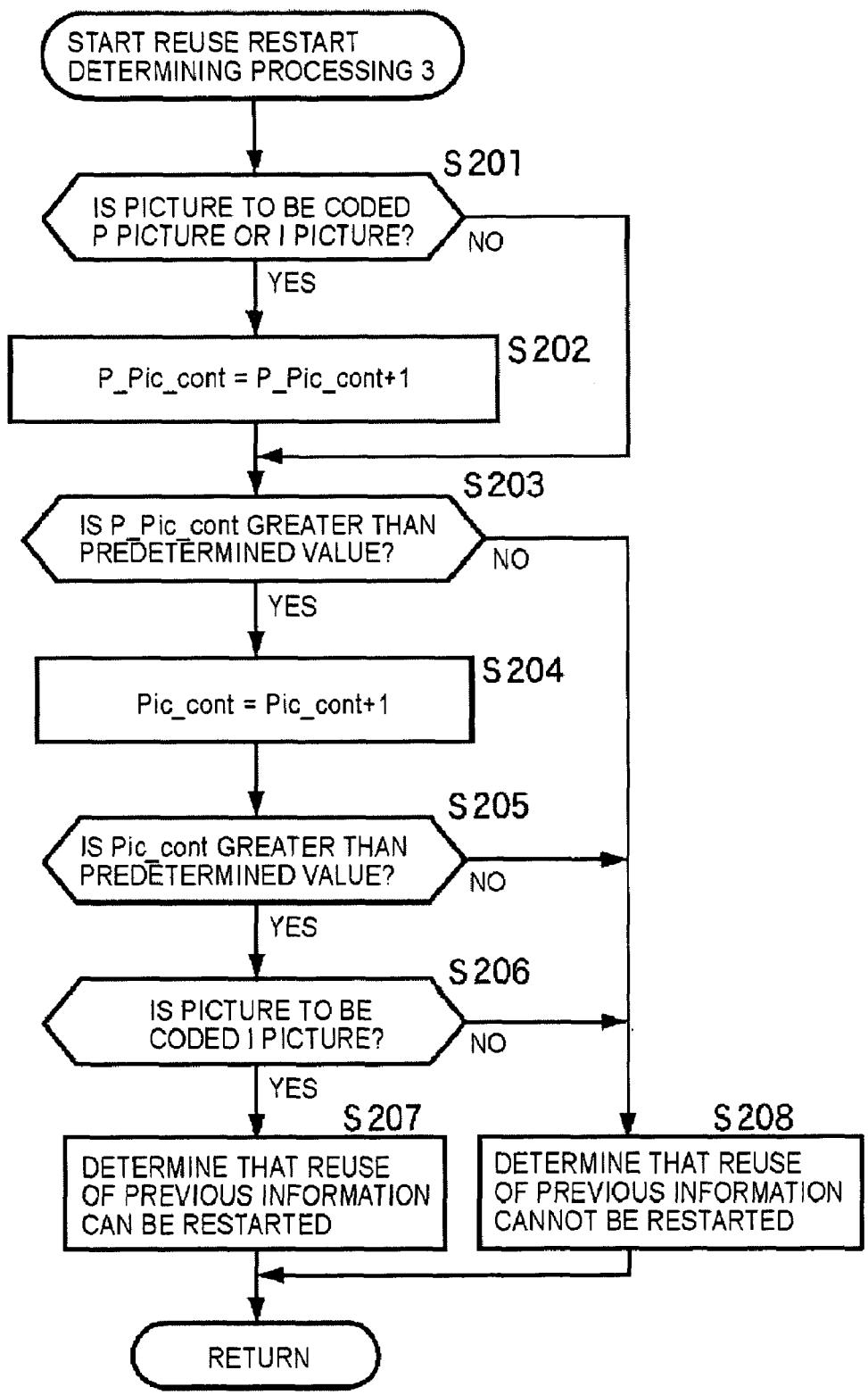
FIG. 26 is a flowchart illustrating reuse restart determining processing 3.

If it is determined in step S140 that the reuse stop flag is not OFF, i.e., the frame is during a reuse disable period, reuse restart determining processing, which is described below with reference to FIG. 22, 24, or 26, is performed in step S141.

If reuse restart determining processing 1 discussed below with reference to FIG. 22 is performed, the same type of processing is always executed in step S141. If reuse restart determining processing 2 discussed below with reference to FIG. 24 is performed, the same type of processing is always executed in step S141. If reuse restart determining processing 3 discussed below with reference to FIG. 26 is performed, the same type of processing is always executed in step S141. In other words, if the reuse restart determining processing 1 is executed, the reuse restart determining processing 2 or reuse restart determining processing 3 is not performed in step S141.

The controller 216 determines in step S142 as a result of the reuse restart determining processing in step S141 whether the reuse of the history information or the parameter information is restarted. If the result of step S142 is NO, the process proceeds to step S138 and step S138 and the subsequent steps are repeated.

If it is determined in step S142 that the reuse of the history information or the parameter information is restarted, the controller 216 turns OFF the reuse stop flag in the built-in register in step S143.

If it is determined in step S140 that the reuse stop flag is OFF, i.e., the frame is during a period other than the reuse disable period, or after step S143, the process proceeds to step S144. In step S144, the buffer 202 buffers the supplied pictures during a predetermined period (a period at least longer than the P picture interval), and then outputs them.

Figure 28:
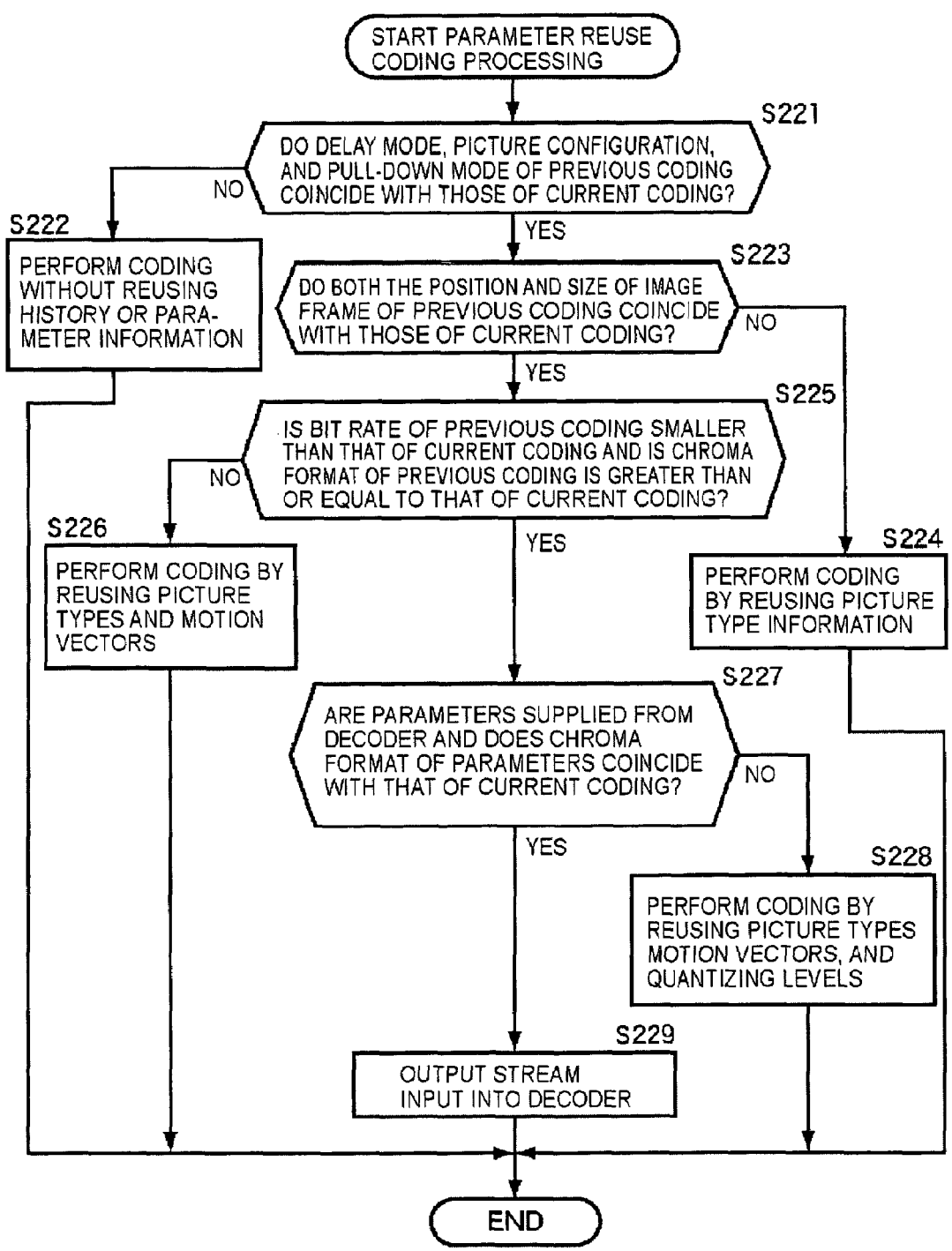
FIG. 28 is a flowchart illustrating parameter reuse coding processing.

In step S145, parameter reuse coding processing, which is described with reference to FIG. 28, is executed. The process then returns to step S132 and step S132 and the subsequent steps are repeated.

However, even if it is determined that the reuse stop flag is OFF, namely, the frame is during a period other than the reuse disable period, or that the reuse of the history information or the parameter information is started, a reuse disable period may be set in step S135 if an editing point is detected for subsequent several pictures. Accordingly, if it is determined in step S140 that the reuse stop flag is OFF, i.e., the frame is during a period other than the reuse disable period, or after step S143, pictures which are determined to be in a period other than the reuse disable period are temporarily buffered in the buffer 202 for a predetermined period. Then, only when an editing point has not been detected for subsequent several pictures, the images output from the buffer 202 are subjected to the parameter reuse coding processing, which is described below with reference to FIG. 28, in step S145.

According to the above-described processing, it can be determined whether the history information or parameter information is reused in the coding processing based on whether the frame is during the reuse disable period.

Figure 21:
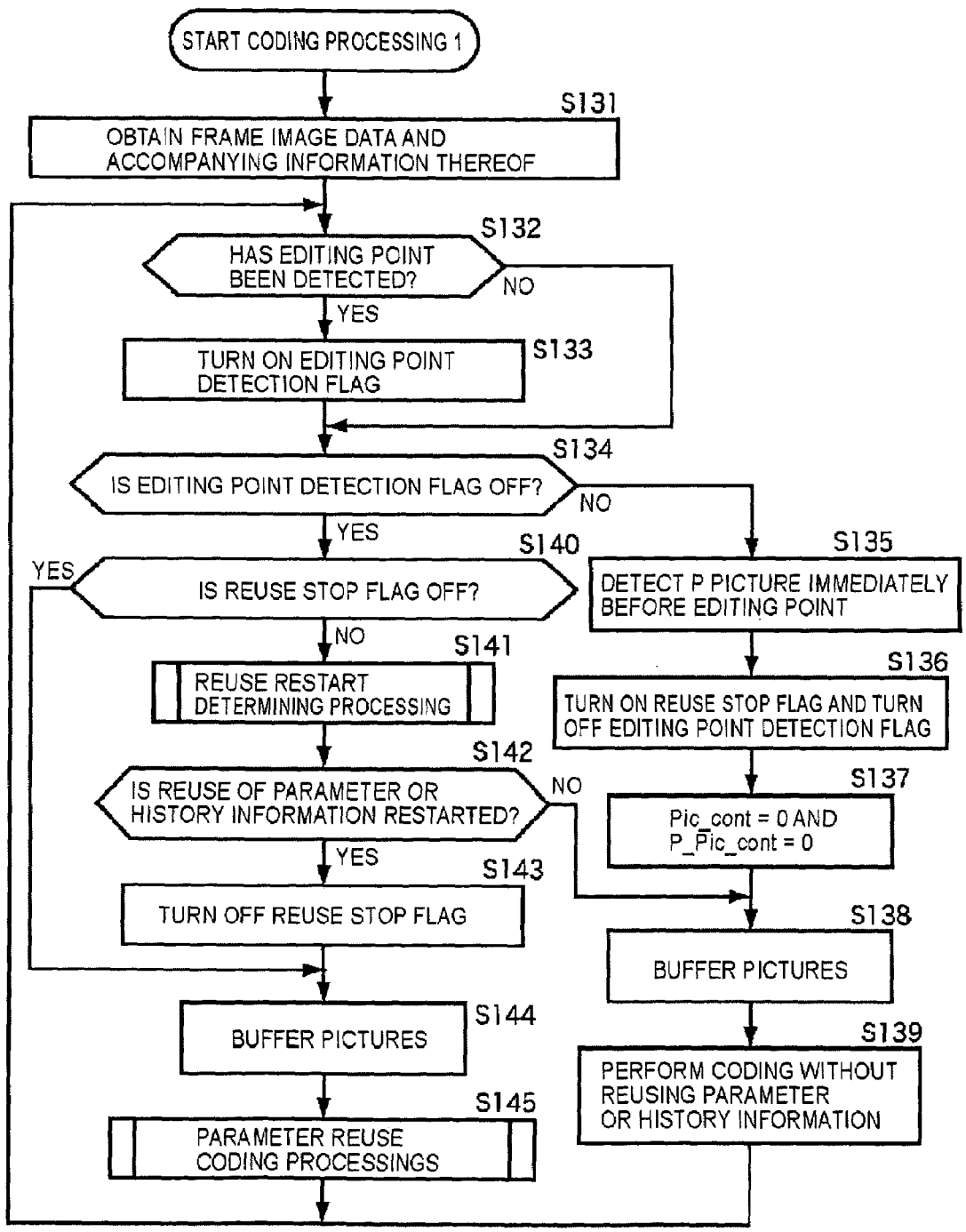
FIG. 21 is a flowchart illustrating coding processing 1.

The reuse restart determining processing 1 in step S141 of FIG. 21 is discussed below with reference to the flowchart of FIG. 22.

In step S161, the controller 216 sets the variable Pic_cont for counting the number of pictures to be Pic_cont+1.

In step S162, the controller 216 determines whether the variable Pic_cont is greater than a predetermined value n (for example, n=8).

If the result of step S162 is YES, the controller 216 determines in step S163 whether the picture to be coded in step S139 or S145 of FIG. 21 is an I picture.

If it is determined that in step S163 that the picture to be coded is an I picture, the controller 216 determines in step S164 that the reuse of history information or coding parameters can be restarted from this picture. The process then returns to step S142 of FIG. 21.

If step S164 is executed, it is determined in step S142 that the reuse of history information or parameters can be restarted. Thus, the reuse stop flag is turned OFF, and the parameter reuse coding processing in step S145 is performed.

If it is determined in step S162 that the variable Pic_cont is smaller than or equal to the predetermined value n, or if it is determined in step S163 that the picture to be coded is not an I picture, the process proceeds to step S165. In step S165, the controller 216 determines that the reuse of history information or coding parameters cannot be restarted from this picture, and the process returns to step S142 of FIG. 21.

If step S165 is executed, it is determined in step S142 that the reuse of history information or parameters is not restarted. Thus, the reuse stop flag remains ON and the parameter reuse coding processing in step S145 is not performed.

Figure 23:
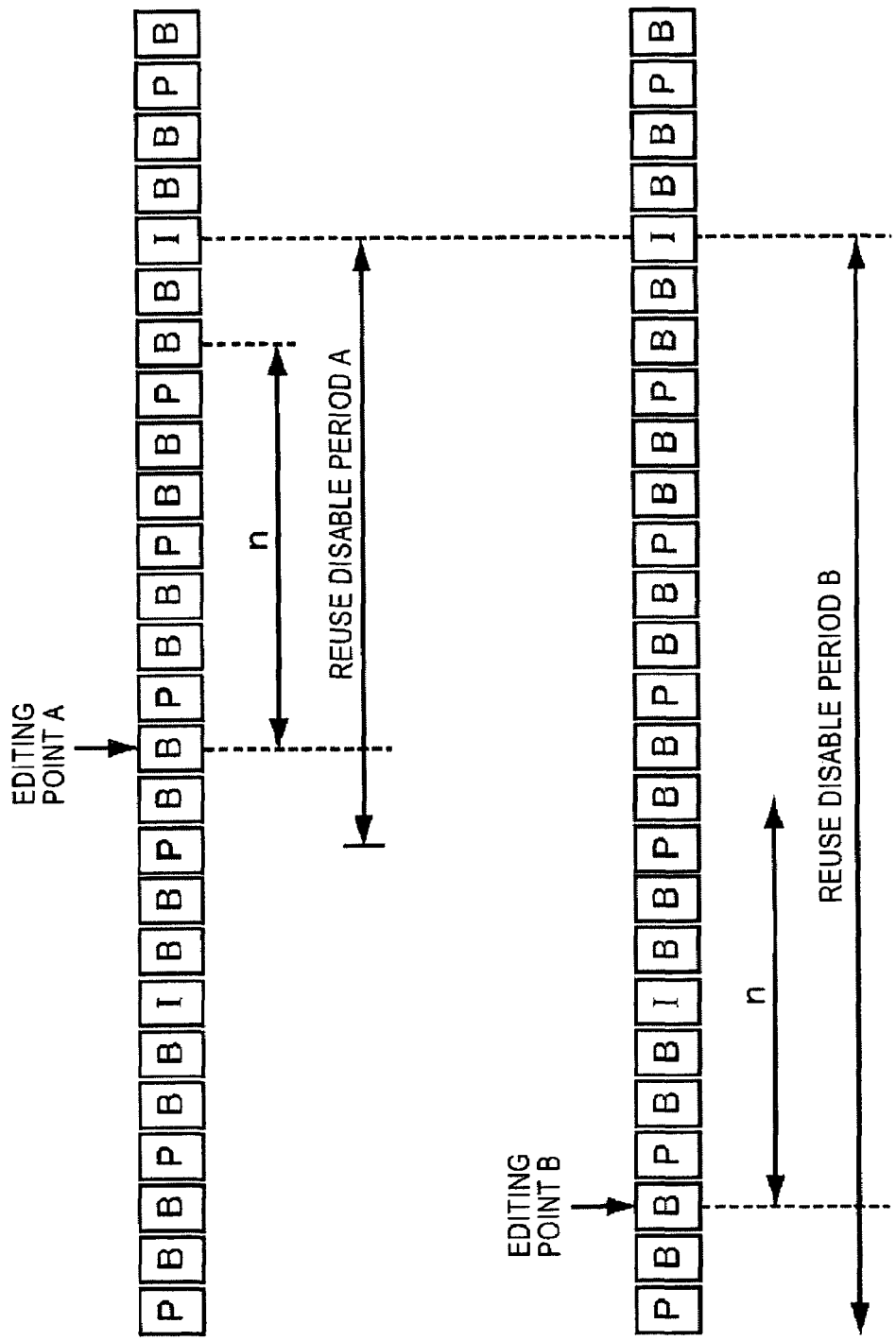
FIG. 23 illustrates reuse disable periods when the reuse restart determining processing 1 is performed.

According to this processing, the picture at which the reuse of history information or parameters is restarted can be determined. For example, as shown in FIG. 23, a reuse disable period A starts from the P picture which is temporally one picture before the editing point A to the first I picture after the picture subsequent to editing point A for a predetermined number n (for example, n=8) of pictures. If, as editing point B, the first I picture is positioned close to an editing point only for a few pictures, the reuse of history information or parameters is not restarted from this I picture, but is restarted from the I picture positioned after the picture subsequent to the editing point B for a predetermined number n of pictures (for example, n=8).

If it is determined in step S164 that the reuse of previous coding information can be restarted, the coder 161 may supply information concerning the reuse disable period to the history information generator 218, and the history information generator 218 may add this information to history information to be generated. Accordingly, a coding device that cannot detect editing points or set reuse disable periods can perform coding without reusing history information, thereby preventing the overflow or underflow of the VBV buffer or the deterioration of the image quality.

Reuse restart determining processing 2 executed in step S141 of FIG. 21 is now discussed with reference to the flowchart of FIG. 24.

In step S181, the controller 216 determines whether the picture to be coded in step S139 or S145 of FIG. 21 is a P picture or an I picture.

If the outcome of step S181 is YES, the process proceeds to step S182 in which the controller 216 sets the variable P_Pic_cont for counting the number of P pictures is set to P_Pic_cont+1.

Then, in step S183, the controller 216 determines whether P_Pic_cont is greater than a predetermined value m (for example, m=3).

If the result of step S183 is YES, the process proceeds to step S184. In step S184, the controller 216 determines that the reuse of history information or coding parameters can be restarted from this picture, and the process returns to step S142 of FIG. 21.

If step S184 is executed, it is determined in step S142 that the reuse of history information or parameters is restarted. Accordingly, the reuse stop flag is turned OFF, and the parameter reuse coding processing is performed.

If it is determined in step S181 that the picture to be coded is not a P picture or an I picture, or if it is determined in step S183 that P_Pic_cont is smaller than or equal to the predetermined value m, the process proceeds to step S185. In step S185, the controller 216 determines that the reuse of history information or coding parameters should not be restarted from this picture. The process then returns to step S142 of FIG. 21.

If step S185 is executed, it is determined in step S142 that the reuse of history information or parameters is not restarted. Accordingly, the reuse stop flag remains ON, and the parameter reuse coding processing is not performed.

Figure 25:
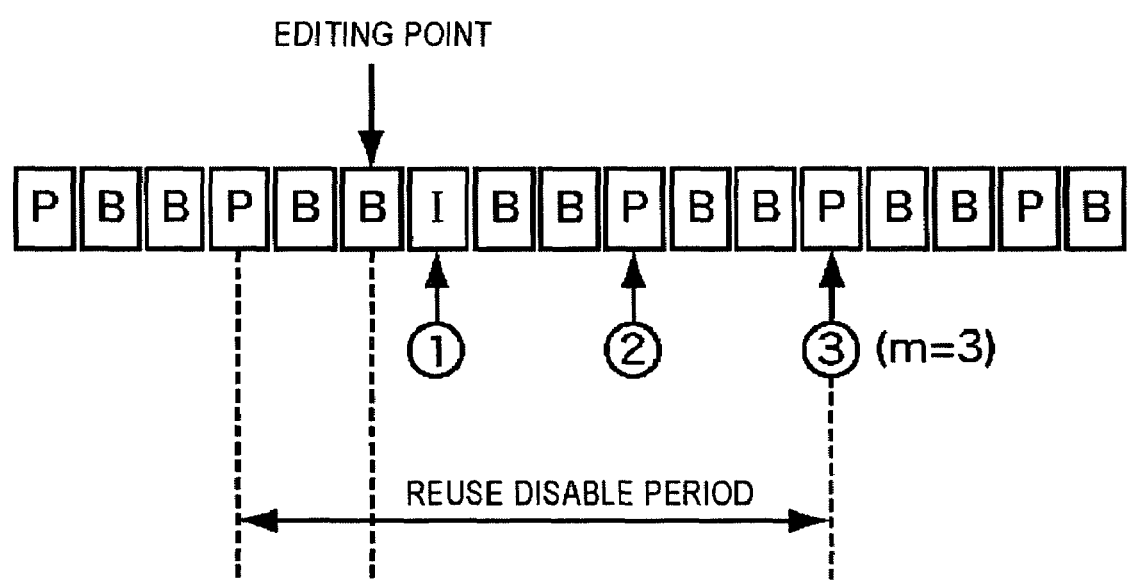
FIG. 25 illustrates a reuse disable period when the reuse restart determining processing 2 is performed.

According to this processing, the picture at which the reuse of history information or parameters is restarted can be determined. For example, as shown in FIG. 25, a reuse disable period starts from the P picture which is temporally positioned one picture before the editing point to the I picture or P picture after the editing point for a predetermined number m (for example, m=3) of frames.

In this processing, if it is determined in step S184 that the reuse of the previous coding information can be restarted, the controller 216 may supply information concerning the reuse disable period to the history information generator 218, and the history information generator 218 may add this information to history information to be generated. Accordingly, a coding device that cannot detect editing points or set reuse disable periods can perform coding without reusing history information, thereby preventing the overflow or underflow of the VBV buffer or the deterioration of the image quality.

Reuse restart determining processing 3 executed in step S141 of FIG. 21 is now discussed with reference to the flowchart of FIG. 26.

In step S201, the controller 216 determines whether the picture to be coded in step S139 or S145 of FIG. 21 is a P picture or an I picture.

If the result of step S201 is YES, the process proceeds to step S202 in which the controller 216 sets the variable P_Pic_cont for counting the number of P pictures to P_Pic_cont+1.

If it is determined in step S201 that the picture to be coded is not a P picture or an I picture, or after step S202, the controller 216 determines in step S203 whether P_Pic_cont is greater than a predetermined value m (for example, m=3).

If the result of step S203 is YES, the process proceeds to step S204 in which the controller 216 sets the variable Pic_cont for counting the number of pictures to Pic_cont+1.

Then, in step S205, the controller 216 determines whether the variable Pic_cont is greater than a predetermined value n (for example, n=8).

If the outcome of step S205 is YES, the controller 216 determines in step S206 whether the picture to be coded in step S139 or step S145 of FIG. 21 is an I picture.

If it is determined in step S206 that the picture to be coded is an I picture, the process proceeds to step S207. In step S207, the controller 216 determines that the reuse of history information or coding parameters can be restarted from this picture, and the process returns to step S142 of FIG. 21.

If step S207 is executed, it is determined in step S142 that the reuse of history information or parameters can be restarted. Accordingly, the reuse stop flag is turned OFF, and the parameter reuse coding processing is performed.

If it is determined in step S203 that P_Pic_cont is smaller than or equal to the predetermined value m, or if it is determined in step S205 that Pic_cont is smaller than or equal to the predetermined value n, or if it is determined in step S206 that the picture to be coded is not an I picture, the process proceeds to step S208. In step S208, the controller 216 determines that the reuse of history information or parameters cannot be restarted from this picture, and the process returns to step S142 of FIG. 21.

If step S208 is executed, it is determined in step S142 that the reuse of history information or parameters cannot be restarted. Accordingly, the reuse stop flag remains ON, and the parameter reuse coding processing is not performed.

Figure 27:
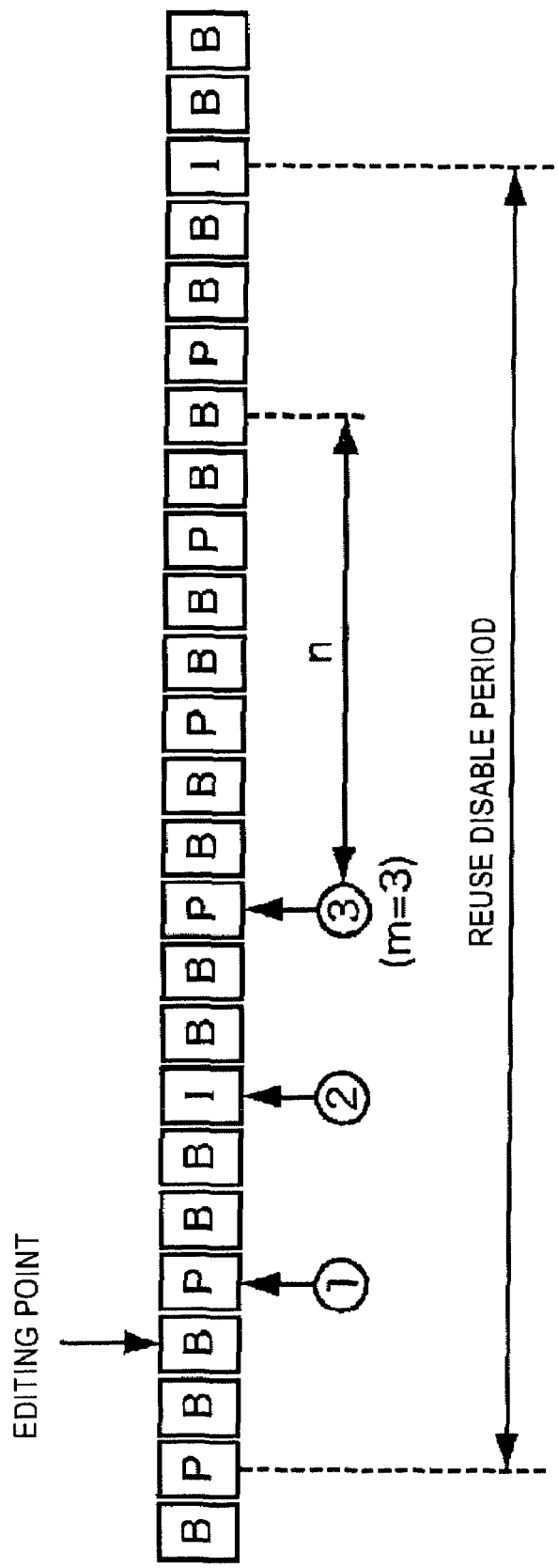
FIG. 27 illustrates a reuse disable period when the reuse restart determining processing 3 is performed.

According to this processing, the picture at which the reuse of history information or parameters is restarted can be determined. For example, as shown in FIG. 27, the reuse disable period starts from the P picture which is temporally one picture before the editing point to the I picture after the picture counted from, for the predetermined number n (for example, n=8) of pictures, the I picture or P picture which is subsequent to the editing point for the predetermined number m (for example, m=3) of pictures.

If it is determined in step S207 that the reuse of the previous coding information can be restarted, the coder 161 may supply information concerning the reuse disable period to the history information generator 218, and the history information generator 218 may add this information to history information to be generated. Accordingly, a coding device that cannot detect editing points or set reuse disable periods can perform coding without reusing history information, thereby preventing the overflow or underflow of the VBV buffer or the deterioration of the image quality.

With reference to the flowchart of FIG. 28, a description is given below of the parameter reuse coding processing in step S145 of FIG. 21 performed by the coder 161 shown in FIG. 12 or the coder 241 shown in FIG. 17.

In step S221, the controller 216 receives history information from the history information extracting unit 171 or parameter information from the parameter input unit 251, and determines whether the delay mode, picture configuration, and pull-down mode of the previous coding coincide with those of the current coding by checking the picture_structure, top_field_first, and repeat_firt_field of the low_delay and picture_coding_extension ( ) function of the sequence_extension ( ) function of SMPTE 329M contained in the history information or similar items of information contained in the parameter information.

If it is determined in step S221 that the delay mode, picture configuration, and pull-down mode of the previous coding do not coincide with those of the current coding, the process proceeds to step S222. In step S222, the controller 216 controls the individual elements of the coder 161 or the coder 241 to perform coding without reusing the history information or parameters, and the process is then terminated.

If it is determined in step S221 that the delay mode, picture configuration, and pull-down mode of the previous coding coincide with those of the current coding, the process proceeds to step S223. In step S223, the controller 216 determines whether both the position and the size of the image frame in the previous coding coincide with those in the current coding by checking horizontal_size_value and vertical_size_value indicated in the sequence_header ( ) function of SMPTE 329M and v_phase and h_phase of SMPTE 329M and similar items of information contained in the parameter information.

If it is determined in step S223 that at least one of the position and the size of the image frame of the previous coding is different from that of the current coding, the process proceeds to step S224. In step S224, the controller 216 determines that coding is performed by reusing the information concerning the picture type (picture_coding_type), and controls the image rearranging unit 203 to rearrange the images by reusing the information of the picture type and controls the other elements to perform coding. The processing is then completed.

If it is determined in step S223 that both the position and the size of the image frame of the previous coding are the same as those of the current coding, the process proceeds to step S225. In step S225, the controller 216 determines whether the bit rate of the previous coding is smaller than that of the current coding and whether the chroma format of the previous coding is greater than or equal to that of the current coding by checking the bit_rate_value of the user_data (2) in the extension_and_user_data (2) of SMPTE 329M contained in the history information and the chroma_format of the sequence_header ( ) function and similar items of information contained in the parameter information.

If it is determined in step S225 that the bit rate of the previous coding is greater than or equal to that of the current coding or that the chroma format of the previous coding is smaller than that of the current coding, the process proceeds to step S226. In step S226, the controller 216 determines that coding is performed by reusing the picture types and motion vectors (motion_vectors information), and controls the image rearranging unit 203 to rearrange the images by reusing the picture type information and controls the motion vector detector 205 to reuse the motion vector information of the previous coding, and also controls the other elements to perform coding. The process is then completed.

If it is determined in step S225 that the bit rate of the previous coding is smaller than that of the current coding and that the chroma format of the previous coding is greater than or equal to that of the current coding, the process proceeds to step S227. In step S227, the controller 216 determines whether the parameters are supplied from the decoder 141 (that is, coding is performed by reusing the parameter information rather than the history information), and determines whether the chroma format of the parameters coincides with that of the current coding by checking information similar to the chroma_format of the sequence_header ( ) function of SMPTE 329M. That is, if, for example, the transcoder 231 containing the coder 241 converts the 4:2:0 format into the 4:2:2: format, it is determined that the two chroma formats are not the same.

If it is determined in step S227 that the history information is supplied from the decoder 161 rather than the parameters from the decoder 141, or that the chroma format of the parameter information does not coincide with that of the current coding, the process proceeds to step S228. In step S228, the controller 216 determines that coding is performed by reusing the picture types, motion vectors, and quantizing levels (q_scale). More specifically, the controller 216 controls the image rearranging unit 203 to rearrange the images by reusing the picture type information, the motion vector detector 205 to reuse the motion vector information of the previous coding, and controls the quantizing level determining unit 208 to supply the quantizing levels contained in the history information or parameter information to the quantizer 207 and to allow the quantizer 207 to perform quantization, and also controls the other elements to perform coding. The process is then completed.

If it is determined in step S227 that the parameters are supplied from the decoder 141 and that the chroma format of the parameter information is the same as that of the current coding, the process proceeds to step S229. In step S229, the controller 216 controls the stream switch 219 to output the stream data input into the decoder 141, and the process is then completed.

According to this processing, after comparing the factors of the previous coding with those of the current coding, items of the coding information that can be reused can be selected based on whether certain conditions are satisfied. With this arrangement, even if decoding and coding is repeatedly performed, the image quality can be maintained.

According to the processing discussed with reference to the flowchart in FIG. 28, it is determined in steps S221, S223, S225, and S227 whether the predetermined conditions are satisfied by comparing the coding parameters of the previous coding with those of the current coding. If, however, in a data transmission system, some parameters are fixed, the determination processing for such parameters may be omitted.

That is, in a data transmission system, if predetermined conditions are satisfied, for example, many parameters are fixed, recoding may be performed by reusing information concerning the previous coding, i.e., the history information or parameter information, without performing determining processing, such as in step S221, S223, S225, or S227.

In the processing described with reference to FIGS. 21 through 28, a determination as to whether history information or parameters can be reused is made by determining whether the frame is in the reuse disable period. However, in addition to the reuse disable period, a partial-reuse able period can be provided. More specifically, after the reuse disable period, a period in which part of history information or parameters can be reused can be provided, and then, coding can be performed by reusing the history information or parameters. In this case, instead of the reuse stop flag, the controller 216 has a reuse entire stop flag and a reuse partial stop flag in a built-in register.

Coding processing performed by using the partial-reuse able period is described below with reference to the flowchart of FIG. 29.

Steps S241 through S245 are similar to steps S131 through S135, respectively, of FIG. 21.

More specifically, in step S241, frame image data and accompanying information thereof are obtained. It is then determined in step S242 whether an editing point has been detected. If it is found that an editing point has been detected, an editing point detection flag is turned ON in step S243. If it is found that an editing point has not been detected or after step S243, the built-in register is checked to determine whether the editing point detection flag is OFF in step S244. If it is found that the editing point detection flag is not OFF, the P picture immediately before the editing point is detected from stream data stored in the buffer 202, and a reuse disable period is set from this P picture.

In step S246, the controller 216 turns ON the reuse entire stop flag and also turns ON the reuse partial stop flag, and turns OFF the editing point detection flag in the built-in register.

Steps S247 through S249 are similar to steps S137 through S139, respectively, of FIG. 21.

More specifically, in step S247, the variable Pic_cont for counting the number of pictures and the variable P_Pic_cont for counting the number of P pictures are set to 0. Then, in step S248, the supplied pictures are buffered for a predetermined period (a period at least longer than the P picture interval), and are then output. In step S249, coding is performed without reusing the history information or parameters. The process then returns to step S242 and step S242 and the subsequent steps are repeated.

If it is determined in step S244 that the editing point detection flag is OFF, the controller 216 determines in step S250 whether the reuse entire stop flag and the reuse partial stop flag in the built-in register are OFF. If the outcome of step S250 is YES, the process proceeds to step S258.

Figure 30:
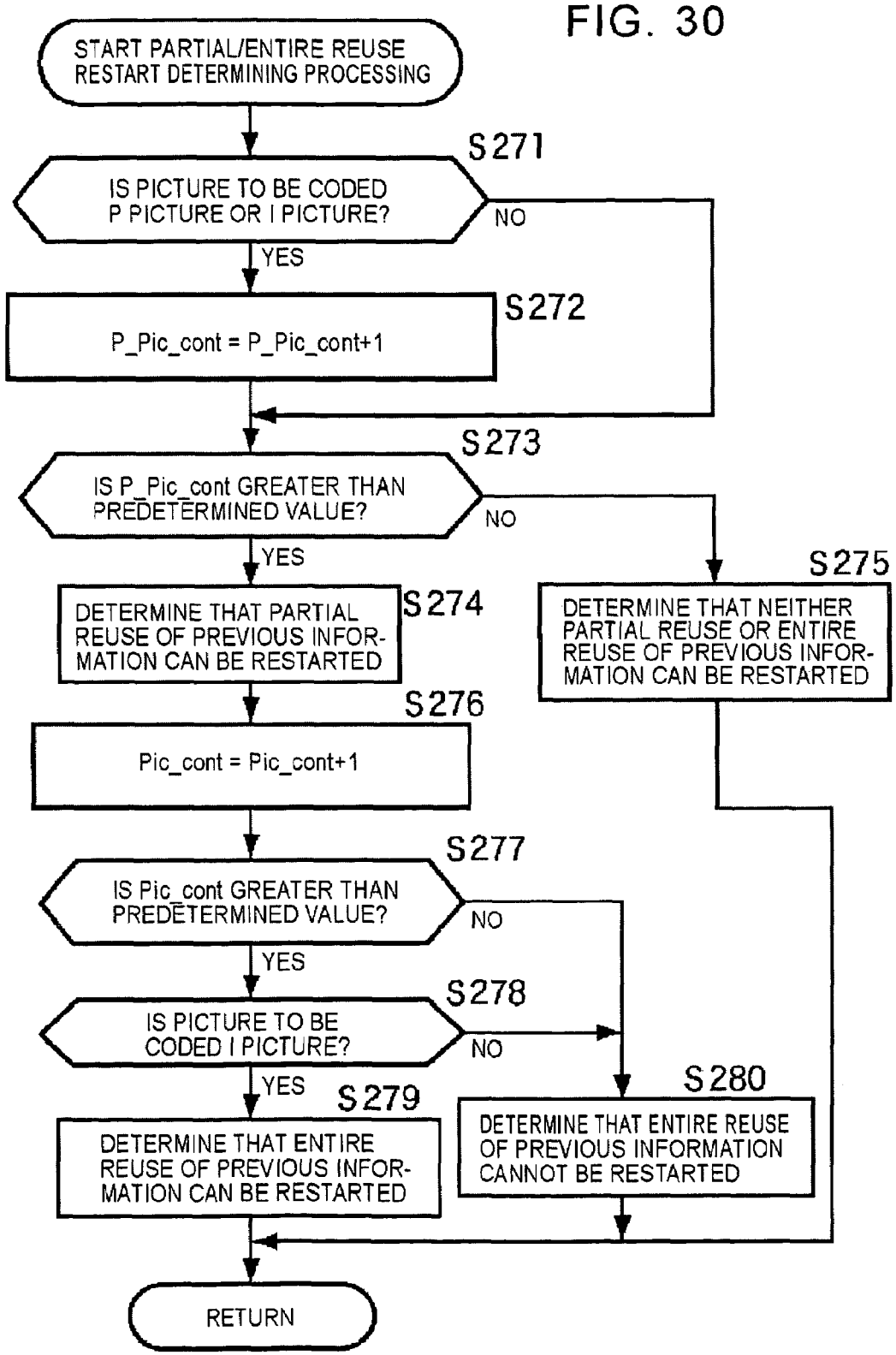
FIG. 30 is a flowchart illustrating partial/entire reuse restart determining processing.

If it is determined in step S250 that at least one of the reuse entire stop flag or the reuse partial stop flag is not OFF, partial/entire reuse restart determining processing, which is described below with reference to FIG. 30, is performed in step S251.

In step S252, the controller 216 determines as a result of the partial/entire reuse restart determining processing in step S251 whether the entire reuse of parameters or history information is restarted. If the outcome of step S252 is YES, the process proceeds to step S257.

If it is determined in step S252 that the entire reuse of parameters or history information is not restarted, the controller 216 determines in step S253 as a result of the partial/entire reuse restart determining processing in step S251 whether the partial reuse of parameters or history information is restarted. If the result of step S253 is NO, the process proceeds to step S248.

If it is determined in step S253 that the partial reuse of parameters or history information is restarted, the controller 216 turns OFF the reuse partial stop flag in step S254.

Then, in step S255, the buffer 202 buffers the supplied pictures for a predetermined period (a period at least longer than the P picture interval), and then output them. However, pictures for which the parameters or history information can be partially reused are buffered in the buffer 202 for a predetermined period, and only if an editing point is not detected for several number of pictures, the process proceeds to step S256.

Figure 32:
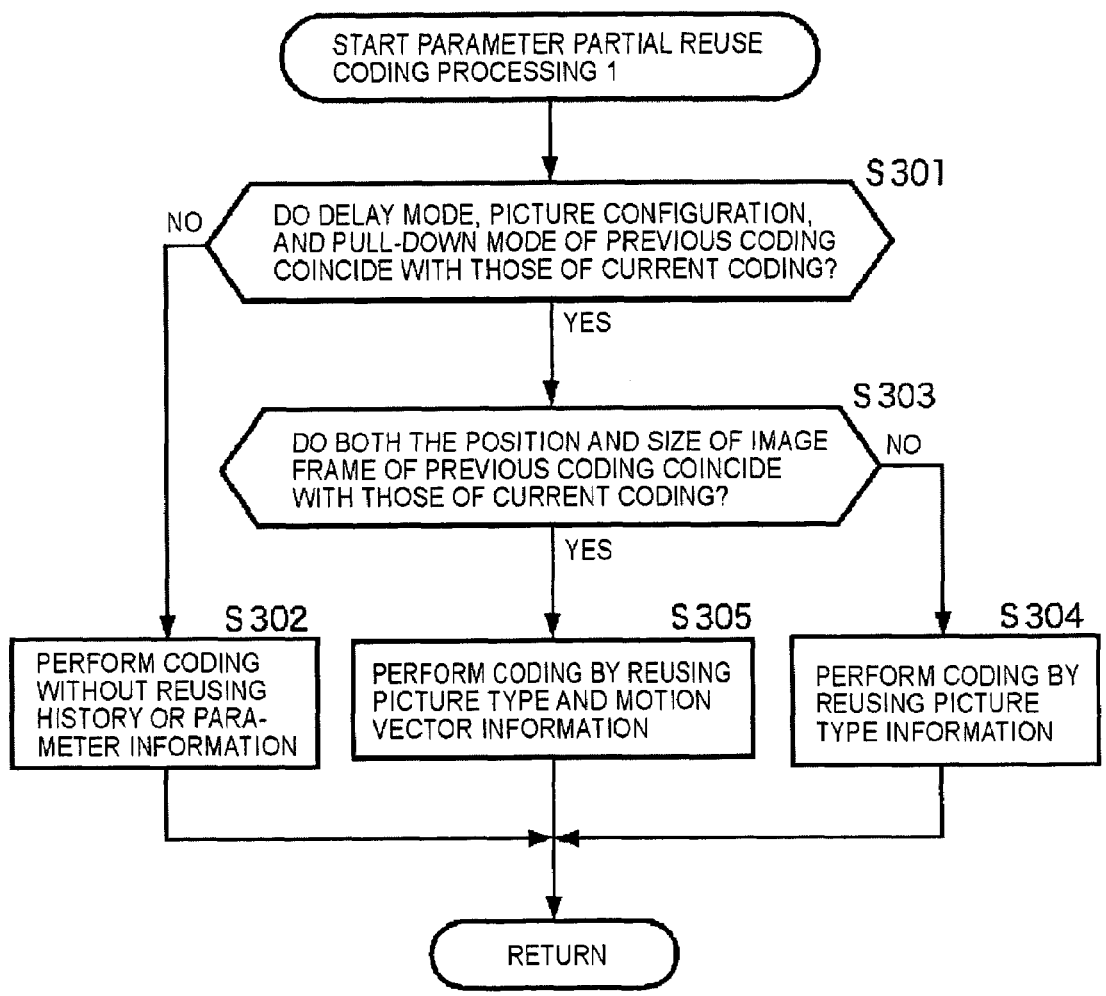
FIG. 32 is a flowchart illustrating parameter partial-reuse coding processing 1.
Figure 33:
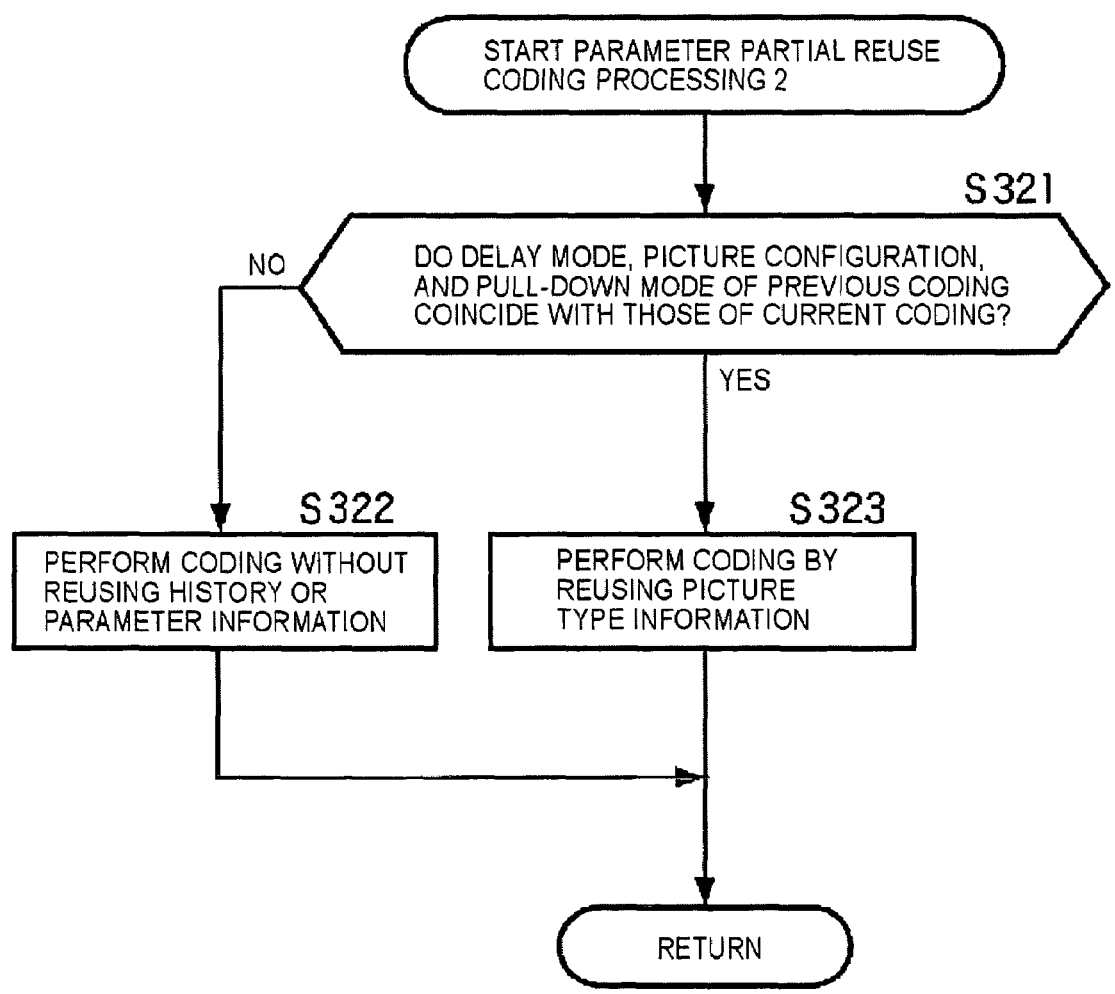
FIG. 33 is a flowchart illustrating parameter partial-reuse coding processing 2.

In step S256, parameter partial reuse restart coding processing, which is described below with reference to FIG. 32 or 33, is executed. The process then returns to step S242, and step S242 and the subsequent steps are repeated.

If it is determined in step S252 that the entire reuse of parameters or history information is restarted, the controller 216 turns OFF the reuse entire stop flag in the built-in register in step S257.

If it is determined in step S250 that the reuse entire stop flag and the reuse partial stop flag are OFF, or after step S257, the process proceeds to step S258. In step S258, the supplied pictures are buffered in the buffer 202 for a predetermined period (a period at least longer than the P picture interval), and are then output. However, pictures for which the parameters or history information can be entirely reused are buffered in the buffer 202 for a predetermined period, and only when an editing point is not detected for several number of pictures, the process proceeds to step S259.

Then, in step S259, the parameter reuse coding processing described with reference to FIG. 28 is performed. The process then returns to step S242 and step S242 and the subsequent steps are repeated.

According to this processing, it is determined whether the reuse of parameters or history information can be entirely or partially restarted based on whether the frame is in the reuse disable period or in the partial-reuse able period.

Figure 29:
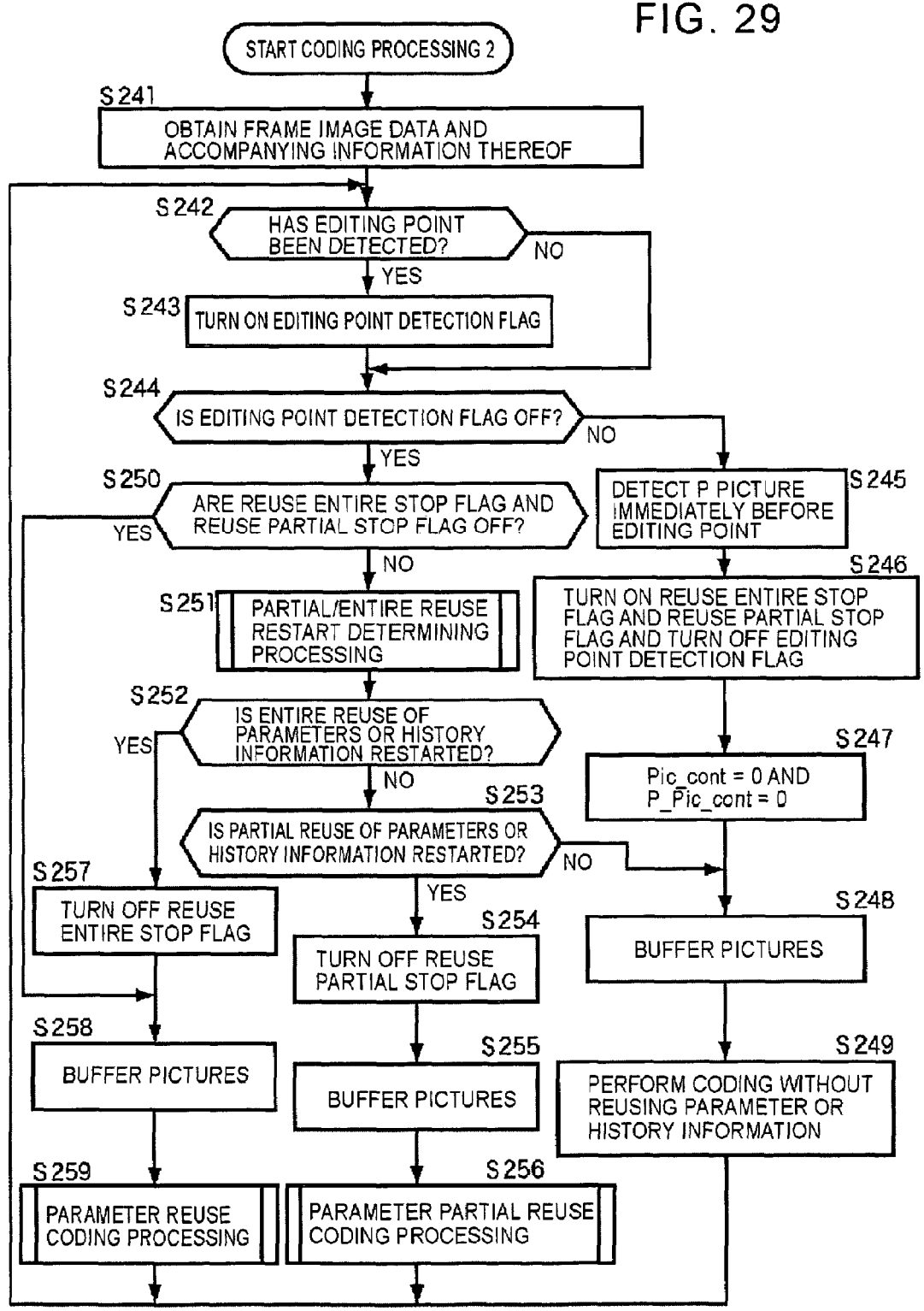
FIG. 29 is a flowchart illustrating coding processing 2.

With reference to the flowchart of FIG. 30, a description is now given of the partial/entire reuse restart determining processing in step S251 of FIG. 29.

In step S271, the controller 216 determines whether the picture to be coded in step S249, S256, or S259 of FIG. 29 is a P picture or an I picture.

If the outcome of step S271 is YES, the process proceeds to step S272 in which the controller 216 sets the variable P_Pic_cont for counting the number of P pictures to P_Pic_cont+1.

If it is determined in step S271 that the picture to be coded is not a P picture or an I picture, or after step S272, the controller 216 determines in step S273 whether P_Pic_cont is greater than a predetermined value m (for example, m=3).

If the result of step S273 is YES, the process proceeds to step S274. In step S274, the controller 216 determines that the partial reuse of history information or parameters can be restarted for this picture, and the process then returns to step S252 of FIG. 29.

If step S274 is executed, it is determined in step S252 of FIG. 29 that the entire reuse of parameter or history information is not restarted, but it is determined in step S253 that the partial reuse of parameter or history information can be restarted. Thus, at least the reuse partial stop flag is turned OFF, and the parameter partial-reuse coding processing is performed.

If it is determined in step S273 that P_Pic_cont is smaller than or equal to the predetermined value m, the process proceeds to step S275. In step S275, the controller 216 determines that the reuse of history information or parameters cannot be restarted entirely or partially from this picture. The process returns to step S252 of FIG. 29.

If step S275 is executed, it is determined in step S252 of FIG. 29 that the entire reuse of parameters or history information cannot be restarted, and it is then determined in step S253 that the partial reuse of parameters or history information cannot be restarted. Accordingly, in step S249, coding is performed without reusing the parameters or history information.

In step S276, the controller 216 sets the variable Pic_cont for counting the number of pictures to Pic_cont+1.

Then, in step S277, the controller 216 determines whether the variable Pic_cont is greater than a predetermined value n (for example, n=8).

If the outcome of step S277 is YES, the controller 216 determines in step S278 whether the picture to be coded in step S249, S256, or S259 of FIG. 29 is an I picture.

If it is determined in step S278 that the picture to be coded is an I picture, the controller 216 determines in step S279 that the entire reuse of the history information or parameters can be restarted from this picture. The process then returns to step S252 of FIG. 29.

If step S279 is executed, it can be determined in step S252 of FIG. 29 that the entire reuse of parameters or history information can be restarted. Accordingly, the reuse entire stop flag is turned OFF, and the parameter reuse coding processing is performed.

If it is determined in step S277 that the variable Pic_cont is smaller than or equal to the predetermined value n, or if it is determined in step S278 that the picture to be coded is not an I picture, the process proceeds to step S280. In step S280, the controller 216 determines that the entire reuse of history information or parameters cannot be restarted, and the process returns to step S252 of FIG. 29.

If step S280 is executed, it is determined in step S252 of FIG. 29 that the entire reuse of parameters or history information cannot be restarted, and it is then determined in step S253 that the partial reuse of parameters or history information can be restarted. Accordingly, the reuse partial stop flag is turned OFF, and the parameter partial-reuse coding processing is performed.

Figure 31:
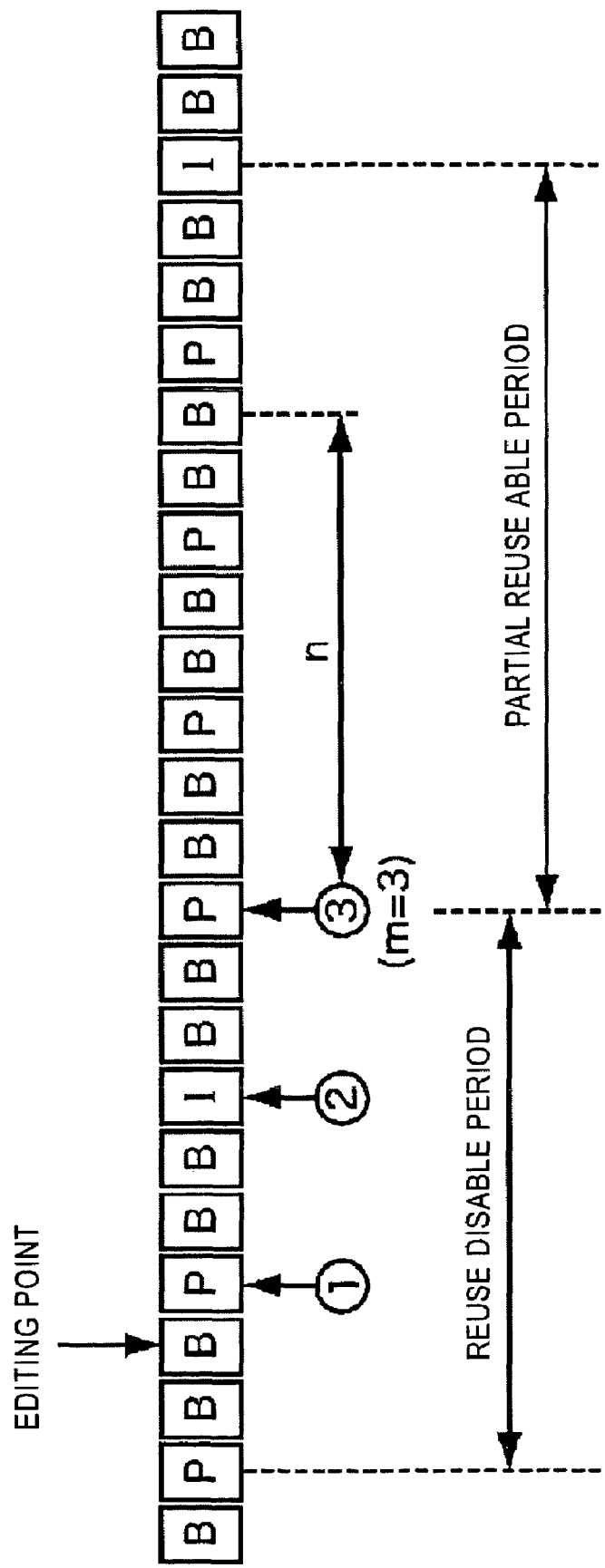
FIG. 31 illustrates a reuse disable period and a partial-reusable period when the partial/entire reuse restart determining processing shown in FIG. 30 is performed.

According to this processing, pictures for which parameters or history information can be partially restarted and pictures for which parameters or history information can be entirely restarted can be determined. For example, as shown in FIG. 31, the reuse disable period starts from the P picture, which is temporally one picture before the editing point, to the I picture or P picture subsequent to the editing point for a predetermined number m (for example, m=3) of pictures. During this period, coding is performed without referring to the history information or parameters. Then, the partial-reuse able period starts from the picture immediately after the reuse disable period to the first I picture after the picture subsequent to the end of the reuse disable period for a predetermined number n (for example, n=8) of pictures. During the partial-reuse able period, coding processing is executed by reusing part of the previous coding parameters, which is discussed below with reference to FIG. 32 or 33.

The controller 216 of the coder 161 may supply information concerning the reuse disable period and the partial-reuse able period, which is set by the processing shown in FIG. 30, to the history information generator 218, and the history information generator 218 may add this information to history information to be generated. With this arrangement, a coding device that cannot detect editing points or set reuse disable periods or partial reuse able periods can perform coding without reusing history information during the reuse disable period and can perform coding by reusing part of the history information during the partial reuse able period. Thus, the overflow or underflow of the VBV buffer and the deterioration of the image quality can be prevented.

In the parameter partial-reuse coding processing in step S256 of FIG. 29, coding is performed by reusing part of the coding parameters that can be reused in the parameter reuse coding processing. There are two types of processing: parameter partial-reuse coding processing 1 in which the picture types and motion vectors can be reused based on conditions; parameter partial-reuse coding processing 2 in which only the picture types are reused based on conditions.

The parameter partial-reuse coding processing 1 in step S256 of FIG. 29 is described below with reference to the flowchart of FIG. 32.

In step S301, the controller 216 receives history information from the history information extracting unit 171 or parameter information from the parameter input unit 251, and determines whether the delay mode, picture configuration, and pull-down mode of the previous coding coincide with those of the current coding by checking the picture_structure, top_field_first, and repeat_firt_field of the low_delay and picture_coding_extension ( ) function of the sequence_extension ( ) function of SMPTE 329M contained in the history information or similar items of information contained in the parameter information.

If it is determined in step S301 that the delay mode, picture configuration, and pull-down mode of the previous coding do not coincide with those of the current coding, the process proceeds to step S302. In step S302, the controller 216 controls the individual elements of the coder 161 or the coder 241 to perform coding without reusing the history information or parameters, and the process then returns to step S242 of FIG. 29.

If it is determined in step S301 that the delay mode, picture configuration, and pull-down mode of the previous coding coincide with those of the current coding, the process proceeds to step S303. In step S303, the controller 216 determines whether both the position and the size of the image frame in the previous coding coincide with those in the current recoding by checking the horizontal_size_value and vertical_size_value indicated in the sequence_header ( ) function of SMPTE 329M and the v_phase and h_phase of SMPTE 329M or similar items of information contained in the parameter information.

If it is determined in step S303 that at least one of the position and the size of the image frame of the previous coding is different from that of the current recoding, the process proceeds to step S304. In step S304, the controller 216 determines that coding is performed by reusing the information concerning the picture type (picture_coding_type), and controls the image rearranging unit 203 to rearrange the images by reusing the information of the picture type and controls the other elements to perform coding. The process then returns to step S242 of FIG. 29.

If it is determined in step S303 that both the position and the size of the image frame of the previous coding are the same as those of the current recoding, the process proceeds to step S305. In step S305, the controller 216 determines that coding is performed by reusing the information concerning the picture types (picture_coding_type) and motion vectors (motion_vectors information). The controller 216 then controls the image rearranging unit 203 to rearrange the images by reusing the information of the picture type and controls the motion vector detector 205 to reuse the motion vector information of the previous coding, and also controls the other elements to perform coding. The process then returns to step S242 of FIG. 29.

According to this processing, after comparing the factors of the previous coding with those of the current coding, items of the coding information that can be reused can be partially selected based on whether certain conditions are satisfied. With this arrangement, even if decoding and coding is repeatedly performed, the image quality can be maintained.

According to the processing discussed with reference to the flowchart in FIG. 32, it is determined in steps S301 and S303 whether the predetermined conditions are satisfied by comparing the coding parameters of the previous coding with those of the current coding. If, however, in a data transmission system, some parameters are fixed, the determination processing for such parameters may be omitted.

The parameter partial-reuse coding processing 2 in step S256 of FIG. 29 is described below with reference to the flowchart of FIG. 33.

In step S321, the controller 216 receives history information from the history information extracting unit 171 or parameter information from the parameter input unit 251, and determines whether the delay mode, picture configuration, and pull-down mode of the previous coding coincide with those of the current coding by checking the picture_structure, top_field_first, and repeat_firt_field of the low_delay and picture_coding_extension ( ) function of the sequence_extension ( ) function of SMPTE 329M contained in the history information or similar items of information contained in the parameter information.

If it is determined in step S321 that the delay mode, picture configuration, and pull-down mode of the previous coding do not coincide with those of the current coding, the process proceeds to step S322. In step S322, the controller 216 controls the individual elements of the coder 161 or the coder 241 to perform coding without reusing the history information or parameters, and the process then returns to step S242 of FIG. 29.

If it is determined in step S321 that the delay mode, picture configuration, and pull-down mode of the previous coding coincide with those of the current coding, the process proceeds to step S323. In step S323, the controller 216 determines that coding is performed by reusing the information concerning the picture type (picture_coding_type), and controls the image rearranging unit 203 to rearrange the images by reusing the information of the picture type and controls the other elements to perform coding. The process then returns to step S242 of FIG. 29.

According to this processing, after comparing the factors of the previous coding with those of the current coding, if certain conditions are satisfied, only the picture type is selected as the coding information that can be reused. With this arrangement, even if decoding and coding is repeatedly performed, the image quality can be maintained.

According to the processing discussed with reference to the flowchart in FIG. 33, it is determined in step S321 whether the predetermined conditions are satisfied by comparing the coding parameters of the previous coding with those of the current coding. If, however, in a data transmission system, some parameters are fixed, the determination processing for such parameters may be omitted.

The present invention is applicable to low delay encoding, which does not require reordering processing. In the low delay encoding, only P pictures are used without using B pictures, which cause a reordering delay, and I pictures which generate a large amount of code, and the P pictures are divided into several number of intra slices and remaining number of inter slices.

In the low delay encoding, only P pictures are used for each frame image, and, for example, in an image frame size of 24×45 macroblocks, 2 columns of macroblocks and 45 rows of macroblocks from the top of the image are assigned to one intra slice and the other macroblocks are assigned to inter slices. The present invention can be applied to this type of low delay encoding. In this case, the intra slice may be a size other than that described above; for example, one column of macroblock and 45 rows of macroblock may be assigned to the intra slice.

The present invention can also be used when images are coded by intra-frame compression.

Although in the above-described embodiment the coder 161 or 241 compresses images by the MPEG method, another type of image compression method may be used.

In the foregoing embodiment, each of the transcoders for converting stream data includes a decoder and a coder. In the present invention, however, the decoder and the coder may be individually formed as an independent decoding device and coding device, respectively.

Figure 34:
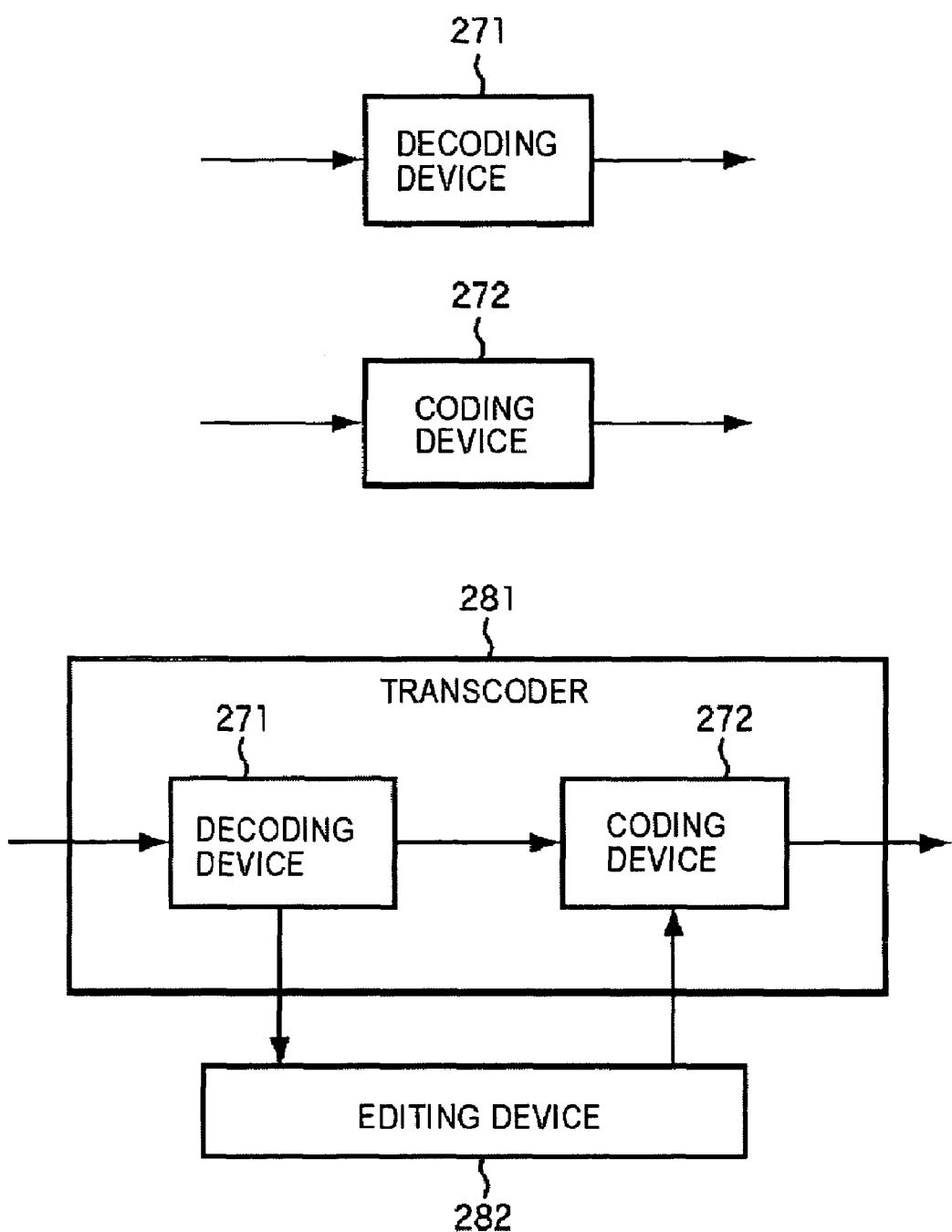
FIG. 34 is a block diagram illustrating another form of devices in a system to which the present invention can be applied.

More specifically, although in the above-described embodiment each transcoder converts stream data, a decoding device 271 for decoding stream data into a baseband signal and a coding device 272 for coding a baseband signal into stream data may be individually formed, as shown in FIG. 34. Alternatively, it is not essential that the decoding device 271 entirely decode the supplied stream data, in which case, the coding device 272 codes only the data decoded.

If, for example, the decoding device 271 decodes VLC code and performs dequantization without conducting inverse DCT processing, the coding device 272 performs quantization and VLC processing, but does not conduct DCT processing. The present invention can be used for determining whether the quantizing levels in the quantization processing performed by the coding device 272, which performs partial coding, are reused.

Alternatively, when the decoding device 271 entirely decodes stream data into a baseband signal, the coding device 272 may partially code the baseband signal (for example, the coding device 272 performs DCT processing and quantization without conducting VLC processing). When the decoding device 271 performs only partial decoding (for example, the decoding device 271 only decodes VLC code and performs dequantization without performing inverse DCT processing), the coding device 272 performs partial coding on the decoded data (for example, the coding device 272 performs quantization without performing VLC processing).

The present invention can be applied to a transcoder 281 including the decoding device 271 for performing partial decoding (executing part of the decoding processing steps) and the coding device 272 for performing partial coding (executing part of the coding processing steps). The transcoder 281 can be used with an editing device 282 for performing editing, for example, splicing.

The above-described series of processing may be executed by hardware or software. In this case, the transcoder 152 or 231 can be formed of a personal computer 301, such as that shown in FIG. 35.

In FIG. 35, a central processing unit (CPU) 311 executes various types of processing according to a program stored in a read only memory (ROM) 312 or a program loaded from a storage unit 318 to a random access memory (RAM) 313. In the RAM 313, data required for executing various types of processing by the CPU 311 are also stored.

The CPU 311, the ROM 312, and the RAM 313 are connected to each other via a bus 314. An input/output interface 315 is also connected to the bus 314.

The input/output interface 315 is also connected to an input unit 316 including a keyboard and a mouse, an output unit 317 including a display and a speaker, the storage unit 318 including a hard disk, and a communication unit 319 including a modem and a terminal adapter. The communication unit 319 performs communication processing via a network, for example, the Internet.

A drive 320 is also connected to the input/output interface 315, and a magnetic disk 331, an optical disc 332, a magneto-optical disk 333, or a semiconductor memory 334 can be installed in the drive 320, and a computer program read from such a recording medium can be installed into the storage unit 318.

If software is used for executing the above-described series of processing, a corresponding software program is installed from a recording medium or via a network into a computer built into dedicated hardware or a general-purpose computer that can install various types of programs therein to perform various types of functions.

This recording medium may be formed of a package medium storing the program therein, which is distributed separately from the apparatus to provide the program to the user, for example, the magnetic disk 331 (including a floppy disk), the optical disc 332 (including a compact disc read only memory (CD-ROM) and a digital versatile disk (DVD)), the magneto-optical disk 333 (including a Mini-Disk (MD) (trademark)), or the semiconductor memory 334. The recording medium may be formed of the ROM 312 storing the program or a hard disk contained in the storage unit 318, which is supplied to the user while being integrated into the apparatus.

The additional coding information may be added to a field, adjacent frames having the same picture type, or a GOP rather than to each frame. Additionally, editing points may be detected in units of fields rather than frames. Alternatively, one frame may be selected from adjacent frames having the same picture type or GOPs so as to detect editing points in adjacent frames having the same picture type or in a GOP.

In this specification, steps forming the program stored in the storage medium may be executed in chronological order described in the specification. Alternatively, the steps may be executed concurrently or individually.

In this specification, the system indicates the entire apparatus consisting of a plurality of devices.

What is claimed is:

1. An image processing apparatus for performing at least part of coding processing on image data, comprising:
    data conversion means for performing at least part of the coding processing on the image data;
    detection means for detecting an editing point of the image data, the editing point detected based on at least one factor indicating discontinuity between frames of the image data, wherein the at least one factor includes additional coding information added to the image data; and
    control means for determining, based on the editing point detected by the detection means, a reuse disable period in which information concerning previous coding processing performed on the image data is not reusable when the data conversion means performs at least part of the coding processing, wherein the control means:
    detects first image data corresponding to a P picture which is positioned temporally after the frame at the editing point detected by the detection means for a predetermined number of frames, and
    detects second image data corresponding to a frame which is positioned temporally after the first image data by a predetermined number of frames, and
    controls third image data corresponding to a frame one frame before an I picture positioned after and closest to the frame corresponding to the second image data to be an end position of the reuse disable period.

2. The image processing apparatus according to claim 1, wherein the detection means detects the editing point based on flag information indicating the editing point contained in the image data.

3. The image processing apparatus according to claim 1, further comprising:
    acquiring means for acquiring from the image data the information concerning the previous coding processing on the image data,
    wherein the detection means detects the editing point based on the information concerning the previous coding processing acquired by the acquiring means.

4. The image processing apparatus according to claim 3, wherein,
    when detecting, based on the information concerning the previous coding processing acquired by the acquiring means, at least one of that:
    count numbers added to predetermined units forming the image data are not continuous;
    start points at which the previous coding processing is started are different between the units forming the image data; and
    coding devices that performed the previous coding processing are different between the units forming the image data, the detection means sets a point of the image data detected between the units to be the editing point.

5. The image processing apparatus according to claim 3, wherein,
    when detecting that count numbers added to the units forming the image data are not continuous, the detection means sets a point of the image data detected between the units to be the editing point.

6. The image processing apparatus according to claim 3, wherein,
    when detecting that start points at which the previous coding processing is started are different between the units forming the image data, the detection means sets a point of the image data detected between the units to be the editing point.

7. The image processing apparatus according to claim 3, wherein,
    when detecting that coding devices that performed the previous coding processing are different between the units forming the image data, the detection means sets a point of the image data detected between the units to be the editing point.

8. The image processing apparatus according to claim 1, further comprising:
acquiring means for acquiring, separately from the image data, the information concerning the previous coding performed on the image data,
wherein the detection means detects the editing point based on the information concerning the previous coding processing acquired by the acquiring means.

9. The image processing apparatus according to claim 8, wherein,
when detecting, based on the information concerning the previous coding processing acquired by the acquiring means, at least one of that: count numbers added to the predetermined units forming the image data are not continuous;
start points at which the previous coding processing is started are different between the units forming the image data; and
coding devices that performed the previous coding processing are different between the units forming the image data, the detection means sets a point of the image data detected between the units to be the editing point.

10. The image processing apparatus according to claim 8, wherein,
when detecting that count numbers added to predetermined units forming the image data are not continuous, the detection means sets a point of the image data detected between the units to be the editing point.

11. The image processing apparatus according to claim 8, wherein,
when detecting that start points at which the previous coding processing is started are different between predetermined units forming the image data, the detection means sets a point of the image data detected between the units to be the editing point.

12. The image processing apparatus according to claim 8, wherein,
when detecting that coding devices that performed the previous coding processing are different between predetermined units forming the image data, the detection means sets a point of the image data detected between the units to be the editing point.

13. The image processing apparatus according to claim 4, wherein the unit includes a frame, a field, or adjacent frames of the same coding type of picture or GOP.

14. The image processing apparatus according to claim 1, wherein the control means controls a P picture of the image data which is temporally positioned immediately before the frame at the editing point detected by the detection means to be a start position of the reuse disable period.

15. The image processing apparatus according to claim 1, wherein the control means detects first image data corresponding to a frame which is positioned temporally after the frame at the editing point detected by the detection means for a predetermined number of frames, and controls second image data corresponding to a frame one frame before an I picture positioned after and closest to the frame of the first image data to be an end position of the reuse disable period.

16. The image processing apparatus according to claim 1, wherein the control means detects first image data corresponding to a P picture which is positioned temporally after the frame at the editing point detected by the detection means by a predetermined number of frames, and controls second image data corresponding to a frame one frame before the frame corresponding to the first image data to be an end position of the reuse disable period.

17. The image processing apparatus according to claim 1, wherein the control means determines, based on the editing point detected by the detection means, a reuse able period in which part of the information concerning the previous coding processing performed on the image data is usable when the data conversion means performs at least part of the coding processing;
the control means:
controls a P picture of the image data which is temporally positioned immediately before the frame at the editing point detected by the detection means to be a start position of the reuse disable period, and
detects first image data corresponding to the P picture which is positioned temporally after the frame at the editing point detected by the detection means for a predetermined number of frames, and
controls second image data corresponding to a frame one frame before the first image data to be an end position of the reuse disable period; and
the control means
controls the first image data to be a start position of the reuse able period, and
detects third image data corresponding to a frame which is positioned temporally after the frame corresponding to the first image data by a predetermined number of frames, and
controls fourth image data corresponding to a frame one frame before an I picture positioned after and closest to the frame corresponding to the third image data to be an end position of the reuse able period.

18. The image processing apparatus according to claim 1, wherein the control means controls at least part of the coding processing on the image data performed by the data conversion means based on the reuse disable period.

19. The image processing apparatus according to claim 1, wherein the control means determines, based on the editing point detected by the detection means, a reuse able period in which part of the information concerning the previous coding processing is usable when the data conversion means performs at least part of the coding processing; and
the control means controls at least part of the coding processing performed by the data conversion means based on the reuse disable period and the reuse able period.

20. The image processing apparatus according to claim 1, further comprising:
generating means for generating history information concerning part of the coding processing performed by the data conversion means,
wherein the generating means generates the history information containing information concerning the reuse disable period determined by the control means.

21. The image processing apparatus according to claim 1, further comprising:
generating means for generating history information concerning part of the coding processing performed by the data conversion means,
wherein the control means further determines, based on the editing point detected by the detection means,
a reuse able period in which part of the information concerning the previous coding processing is reusable when the data conversion means performs at least part of the coding processing; and the generating means generates the history information containing information concerning the reuse disable period and the reuse able period determined by the control means.

22. An image processing method for an image processing apparatus for performing at least part of coding processing on image data, the image processing method comprising:
a detection step of detecting an editing point of the image data, the editing point detected based on at least one factor indicating discontinuity between frames of the image data, wherein the at least one factor includes additional coding information added to the image data; and
a control step of determining, based on the editing point detected in the detection step, a reuse disable period in which information concerning previous coding processing is not reusable when at least part of the coding processing is performed, wherein the control step:
detects first image data corresponding to a P picture which is positioned temporally after the frame at the editing point detected by the detection means for a predetermined number of frames, and
detects second image data corresponding to a frame which is positioned temporally after the first image data by a predetermined number of frames, and
controls third image data corresponding to a frame one frame before an I picture positioned after and closest to the frame corresponding to the second image data to be an end position of the reuse disable period.

23. A recording medium storing therein a program for allowing a computer to execute an image processing method for performing at least part of coding processing on image data, the image processing method comprising:
a detection step of detecting an editing point of the image data, the editing point detected based on at least one factor indicating discontinuity between frames of the image data, wherein the at least one factor includes additional coding information added to the image data; and
a control step of determining, based on the editing point detected in the detection step, a reuse disable period in which information concerning previous coding processing is not reusable when at least part of the coding processing is performed wherein the control step:
detects first image data corresponding to a P picture which is positioned temporally after the frame at the editing point detected by the detection means for a predetermined number of frames, and
detects second image data corresponding to a frame which is positioned temporally after the first image data by a predetermined number of frames, and
controls third image data corresponding to a frame one frame before an I picture positioned after and closest to the frame corresponding to the second image data to be an end position of the reuse disable period.

24. An image processing apparatus for performing coding processing on image data, comprising:
data conversion means for performing at least part of the coding processing on the image data;
detection means for detecting an editing point of the image data, wherein the editing point is detected using coding information added to the image data; and
control means for determining, based on the editing point detected by the detection means, a reuse disable period in which information concerning previous coding processing performed on the image data is not reusable when the data conversion means performs at least part of the coding processing,
wherein the control means:
detects first image data corresponding to a P picture which is positioned temporally after the frame at the editing point detected by the detection means for a predetermined number of frames, and
detects second image data corresponding to a frame which is positioned temporally after the first image data by a predetermined number of frames, and
controls third image data corresponding to a frame one frame before an I picture positioned after and closest to the frame corresponding to the second image data to be an end position of the reuse disable period.

25. An apparatus comprising:
first determining means for determining a start position of a reuse disable period;
second determining means for determining an end position of the reuse disable period;
detecting means for detecting an editing point, based on a stream of data received by the apparatus or extracted history information;
wherein the detecting means detects a P picture sequentially preceding the editing point; and
control means for setting a reuse disable period starting time from the P picture before the editing point to a predetermined picture after the editing point wherein the control means:
detects first image data corresponding to the P picture which is positioned temporally after the frame at the editing point detected by the detection means for a predetermined number of frames, and
detects second image data corresponding to a frame which is positioned temporally after the first image data by a predetermined number of frames, and
controls third image data corresponding to a frame one frame before an I picture positioned after and closest to the frame corresponding to the second image data to be an end position of the reuse disable period,
wherein during the reuse disable period information concerning previous coding processing performed on the image data is not reusable, and
wherein during a non-reuse disable period, information concerning previous coding processing performed on the image data is not reusable.

26. The apparatus as claimed in claim 1, wherein the control means:
determines whether a delay mode, picture configuration and pull down mode of a previous coding coincide with a current coding,
wherein when the delay mode, picture configuration and pull down mode of a previous coding coincide with a current coding, the control means performs coding reusing picture type information,
wherein when the delay mode, picture configuration and pull down mode of a previous coding do not coincide with a current coding, the control means performs coding independent of history or parameter information.

27. The apparatus as claimed in claim 1, wherein the control means:
determines whether a delay mode, picture configuration and pull down mode of a previous coding coincide with a current coding,
wherein when the delay mode, picture configuration and pull down mode of a previous coding coincide with a current coding, the control means determines whether both a position and a size of an image frame of previous coding coincide with a position and a size of an image frame of current coding, when both a position and a size of an image frame of previous coding coincide with a position and a size of an image frame of current coding the control means performs coding reusing picture type information and motion vector information, when both a position and a size of an image frame of previous coding do not coincide with a position and a size of an image frame of current coding the control means performs coding reusing picture type information, wherein when the delay mode, picture configuration and pull down mode of a previous coding do not coincide with a current coding, the control means performs coding independent of history or parameter information.

* * * * *